(12) United States Patent
Huang et al.

(10) Patent No.: US 12,303,984 B2
(45) Date of Patent: May 20, 2025

(54) CHUCK WITH LOCK SLEEVE

(71) Applicants: Jacobs Chuck Manufacturing (Suzhou) Company, Ltd., Suzhou (CN); Apex Brands, Inc., Apex, NC (US)

(72) Inventors: Fei Huang, Suzhou (CN); Tingwei Zeng, Suzhou (CN); Jichun Zhou, Suzhou (CN)

(73) Assignees: JACOBS CHUCK MANUFACTURING (SUZHOU) COMPANY, LTD., Suzhou (CN); APEX BRANDS, INC., Apex, NC (US)

( * ) Notice: Subject to any disclaimer, the term of this patent is extended or adjusted under 35 U.S.C. 154(b) by 0 days.

(21) Appl. No.: 18/837,406

(22) PCT Filed: Feb. 11, 2022

(86) PCT No.: PCT/CN2022/075993
§ 371 (c)(1),
(2) Date: Aug. 9, 2024

(87) PCT Pub. No.: WO2023/151013
PCT Pub. Date: Aug. 17, 2023

(65) Prior Publication Data
US 2025/0108440 A1     Apr. 3, 2025

(51) Int. Cl.
*B23B 31/12* (2006.01)
(52) U.S. Cl.
CPC ........ *B23B 31/123* (2013.01); *B23B 31/1253* (2013.01); *Y10T 279/17615* (2015.01)
(58) Field of Classification Search
CPC ............... B23B 31/123; B23B 31/1253; Y10T 279/17615
See application file for complete search history.

(56) References Cited

U.S. PATENT DOCUMENTS

| | | | | |
|---|---|---|---|---|
| 5,435,578 A | * | 7/1995 | Rohm | .................. B23B 31/123 279/140 |
| 5,741,016 A | * | 4/1998 | Barton | .................. B23B 31/123 279/140 |

(Continued)

FOREIGN PATENT DOCUMENTS

| | | |
|---|---|---|
| CN | 2790644 Y | 6/2006 |
| CN | 201091926 Y | 7/2008 |

(Continued)

OTHER PUBLICATIONS

International Search Report and Written Opinion of corresponding International Application No. PCT/CN2022/075993, mailed on Jul. 28, 2022, all enclosed pages cited herein.

*Primary Examiner* — Eric A. Gates
*Assistant Examiner* — Eric Daniel Whitmire
(74) *Attorney, Agent, or Firm* — BURR & FORMAN LLP

(57) ABSTRACT

A chuck (300) may include a lock disk (380), a ball retainer (350), a lock sleeve (360), a wedge pin (371), and a pin drive spring (320). When the lock sleeve (360) is disposed in the locked position, the wedge pin (371) may be positioned by the pin drive spring (320) in a wedged engagement between a pin engaging surface of the ball retainer (350) and a lock disk wall (381) of the lock disk (380) to prevent rotation of a first sleeve (30) and a nut (40) relative to a body (41) in a first rotational direction but permit rotation in a second rotational direction. When the lock sleeve (360) is disposed in the unlocked position, the wedge pin (371) may be positioned by the pin drive spring (320) such that the wedge pin (371) is not in the wedged engagement to permit rotation of the first sleeve (30) and the nut (40) in the first rotational direction and second rotational direction.

20 Claims, 30 Drawing Sheets

(56) References Cited

U.S. PATENT DOCUMENTS 11,123,806 B2   9/2021  Zhou et al.
2002/0130007 A1* 9/2002  Nakamura .............. B25B 21/00
                                                        173/217

FOREIGN PATENT DOCUMENTS

| CN | 101648284 A | 2/2010 |
| CN | 108349018 A | 7/2018 |
| CN | 209969608 U | 1/2020 |
| JP | 2022122236 A | 8/2022 |
| WO | 2013078381 A1 | 5/2013 |

* cited by examiner

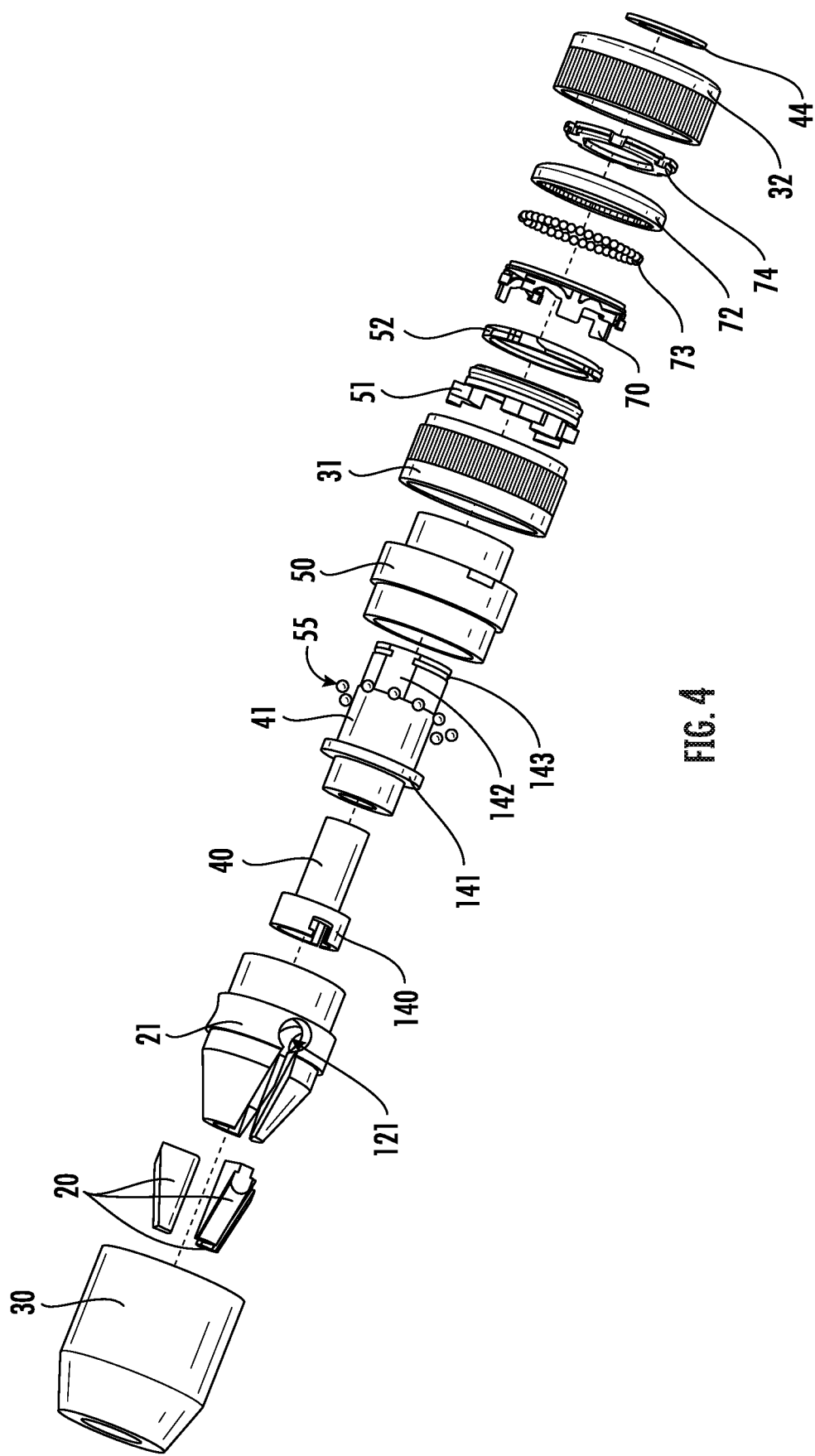

CHUCK WITH LOCK SLEEVE

TECHNICAL FIELD

Example embodiments generally relate to chucks for use with power drivers including power drills, and more particularly, relate to chucks having features to counteract the effects of inertial forces generated by the rotation and sudden stopping of the chuck.

BACKGROUND

Power drivers with rotating drive spindles are often operably coupled to a chuck that includes an adjustable opening that can clamp onto various working bits, such as drill bits or other tools, that are rotated with the chuck by the drive spindle of the power driver. Chucks typically employ moveable jaws that are operable to adjust a size of the opening in the chuck for receiving a working bit. In many instances these jaws are held in place while the power driver is in a working mode (e.g., drilling a hole, driving or removing a fastener, etc.) by a nut with a threaded engagement. A frictional engagement of the threading on the nut may be the means by which the threading causes the jaws to remain securely engaged with the working bit. In some instances, however, due to inertia created by rotation of chuck, the nut can be forced to move unintentionally while performing a working operation, such as, drilling a hole, driving or removing a fastener, or the like. In this regard, substantial inertial forces in, for example, the chuck sleeve cause the nut to rotate due to sudden stopping of the spindle. Such movement of the nut can lead to unexpected and undesired movement of the nut that, in some instances, may cause the jaws to loosen the clamping force on the working bit. Such loosening of jaws may, in some instances, cause the working bit to no longer be secured to the chuck and the working bit may slid out of the opening in the chuck and fall. As such, innovation in the area of preventing unexpected and undesired movement of the nut is needed to maintain and control the clamping forces on the working bit even in the presence of inertial forces that might affect the nut.

Summary of Some Examples

According to some example embodiments, a chuck for use with a power driver having a rotatable drive spindle is provided. The chuck may comprise a plurality of jaws, a body configured to rotate with the drive spindle, and a nut. The nut may be operably coupled to the jaws such that rotation of the nut relative to the body moves the jaws relative to the body in an opening or closing direction. The chuck may also comprise a first sleeve operably coupled to the nut to rotate with the nut in response to the first sleeve being rotated, and a lock disk coupled to the body such that the lock disk rotates with the body. The lock disk may comprise a lock disk wall. The chuck may further comprise a ball retainer coupled to the first sleeve such that the ball retainer rotates with the first sleeve. In this regard, the ball retainer may comprise a pin engaging surface. The chuck may also comprise a lock sleeve that is rotatable relative to the ball retainer into a locked position and an unlocked position, and a wedge pin in contact with the pin engaging surface of the ball retainer. Further, the chuck may comprise a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. In this regard, when the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the body in the a first rotational direction, but permit rotation of the first sleeve and the nut relative to the body in a second rotational direction. The first rotational direction may be opposite the second rotational direction. Further, when the lock sleeve is disposed in the unlocked position, the wedge pin may be positioned by the pin drive spring such that the wedge pin is not in the wedged engagement to permit rotation of the first sleeve and the nut in the first rotational direction and second rotational direction.

According to some example embodiments, another embodiment of a chuck for use with a power driver having a rotatable drive spindle is provided. The chuck may comprise a plurality of jaws, a lock disk comprising a lock disk wall, and a nut operably coupled to the jaws such that rotation of the nut relative to the lock disk moves the jaws in the opening or closing direction. The chuck may further comprise a first sleeve operably coupled to the nut, a ball retainer operably coupled to the first sleeve such that the ball retainer rotates with the first sleeve. The ball retainer may comprise a pin engaging surface. The chuck may further comprise a lock sleeve that is rotatable relative to the ball retainer into a locked position and an unlocked position, a wedge pin in contact with the pin engaging surface of the ball retainer, and a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. When the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the lock disk in the a first rotational direction, but permit rotation of the first sleeve and the nut relative to the lock disk in a second rotational direction. The first rotational direction may be opposite the second rotational direction. Further, when the lock sleeve is disposed in the unlocked position, the wedge pin is positioned by the pin drive spring such that the wedge pin is not in the wedged engagement to permit rotation of the first sleeve and the nut in the first rotational direction and second rotational direction.

According to some example embodiments, another embodiment of a chuck for use with a power driver having a rotatable drive spindle is provided. The chuck may comprise a plurality of jaws, a body configured to rotate with the drive spindle, and a nut operably coupled to the jaws and in threaded engagement with an interior cavity of the body such that rotation of the nut relative to the body moves the jaws relative to the body in an opening or closing direction. The chuck may also comprise a first sleeve operably coupled to the nut to rotate the nut when the first sleeve is rotated, and a lock disk coupled to the body such that the lock disk rotates with the body. The lock disk may comprise a lock disk wall. The chuck may further comprise a ball retainer coupled to the first sleeve such that the ball retainer rotates with the first sleeve. The ball retainer may comprise a pin engaging surface. The chuck may also comprise a lock sleeve that is rotatable relative to the ball retainer into a locked position and an unlocked position. The wedge pin may be in contact with the pin engaging surface of the ball retainer. The chuck may further comprise a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. When the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the body in the a first rotational direction but permit rotation of the first sleeve and the nut relative to the body in a second rotational direction. The first rotational direction may be opposite the second rotational direction. When the lock sleeve is disposed in the unlocked position, the wedge pin may be positioned by the pin drive spring such that the wedge pin is not in the wedged engagement to permit rotation of the first sleeve and the nut in the first rotational direction and second rotational direction.

BRIEF DESCRIPTION OF THE DRAWINGS

Figure 1:
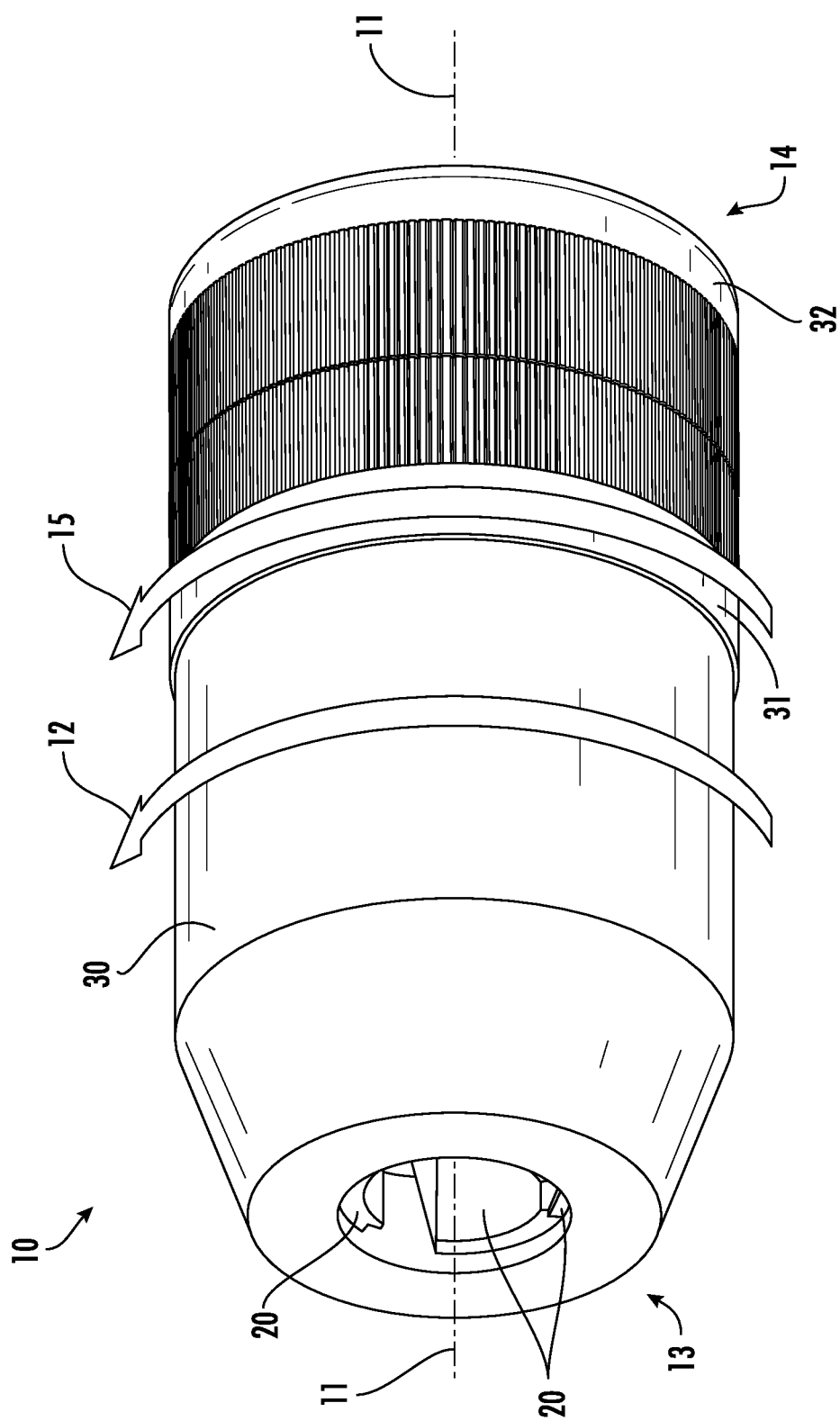
Figure 2:
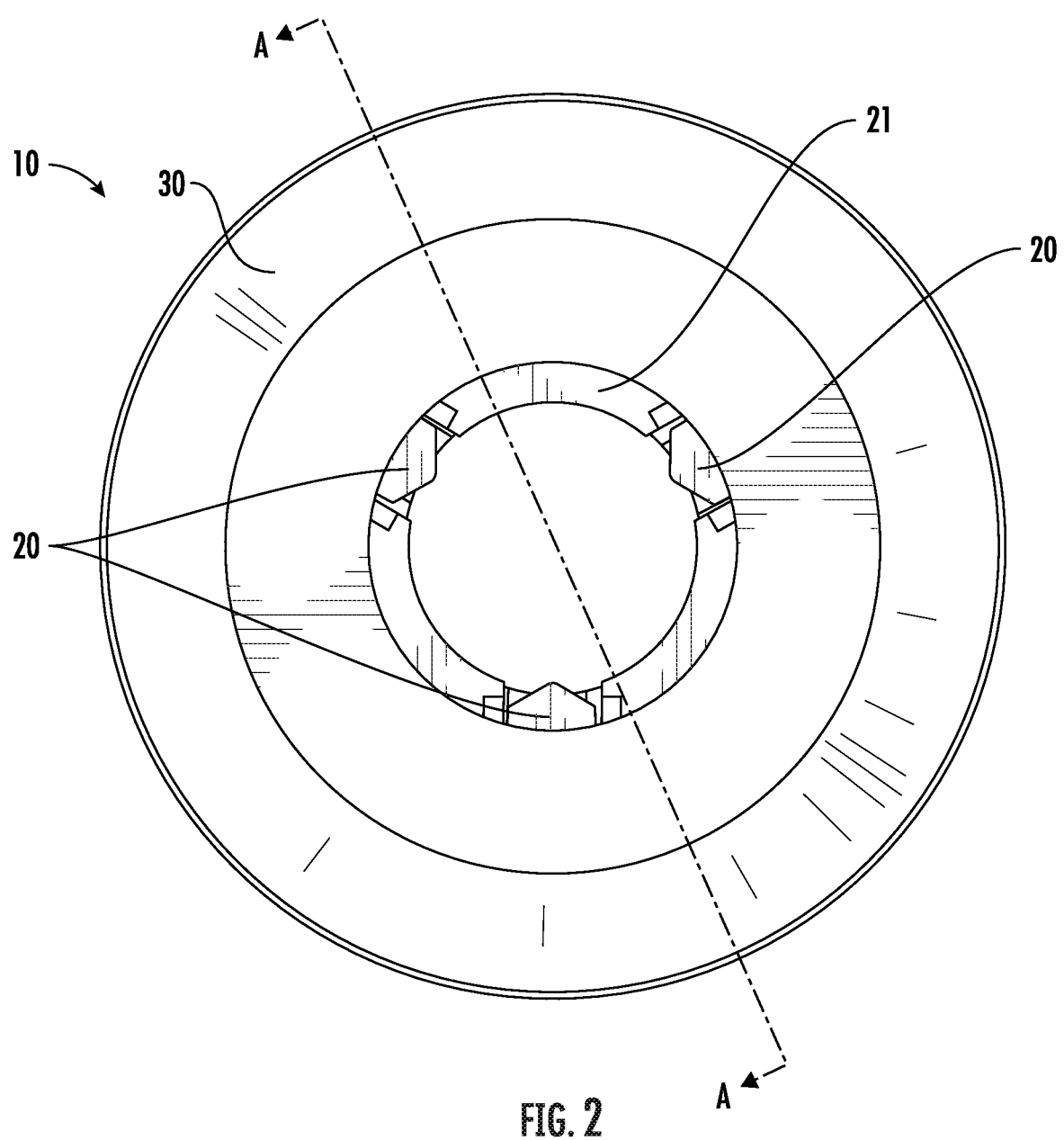
Figure 3:
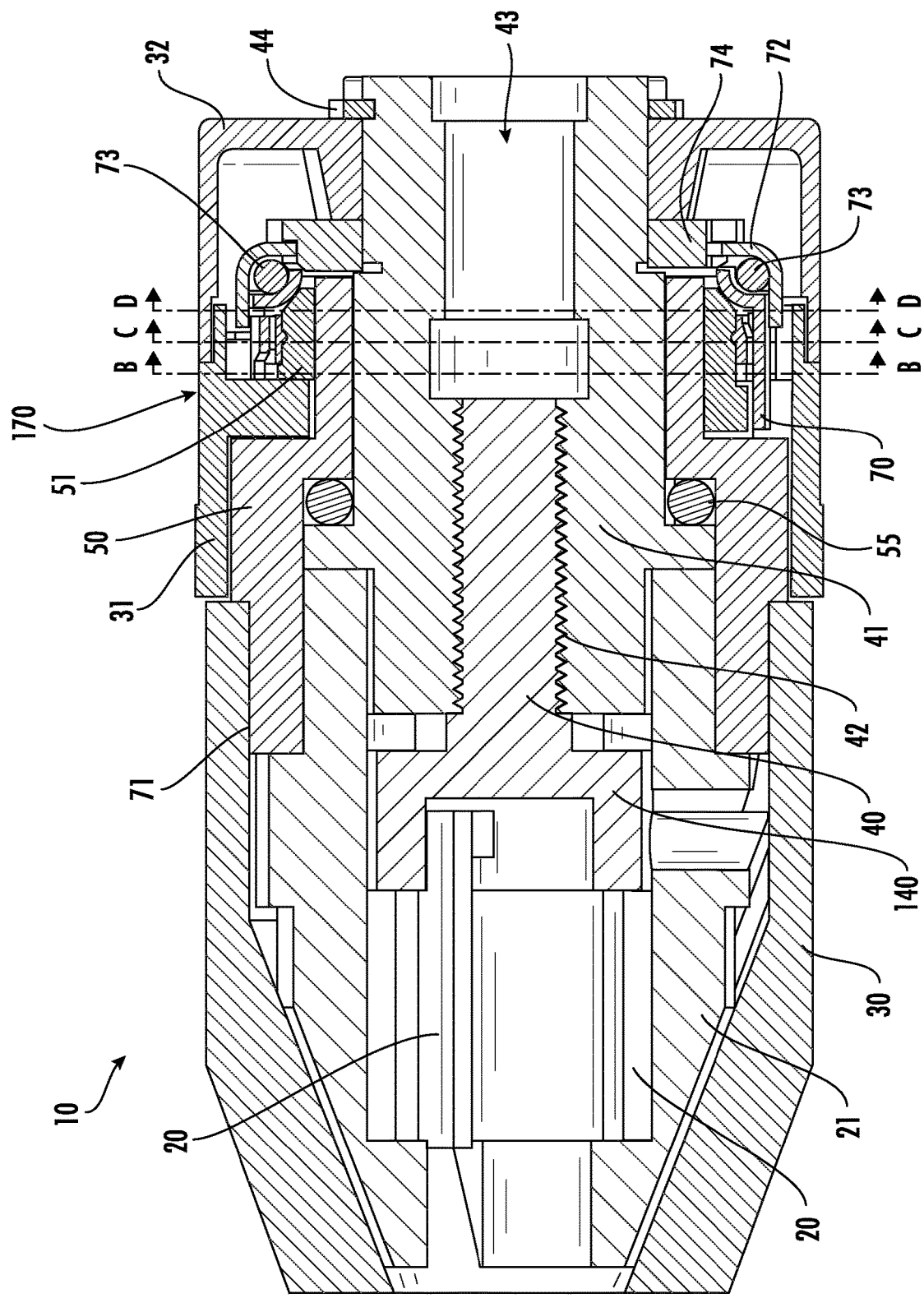
Figure 5A:
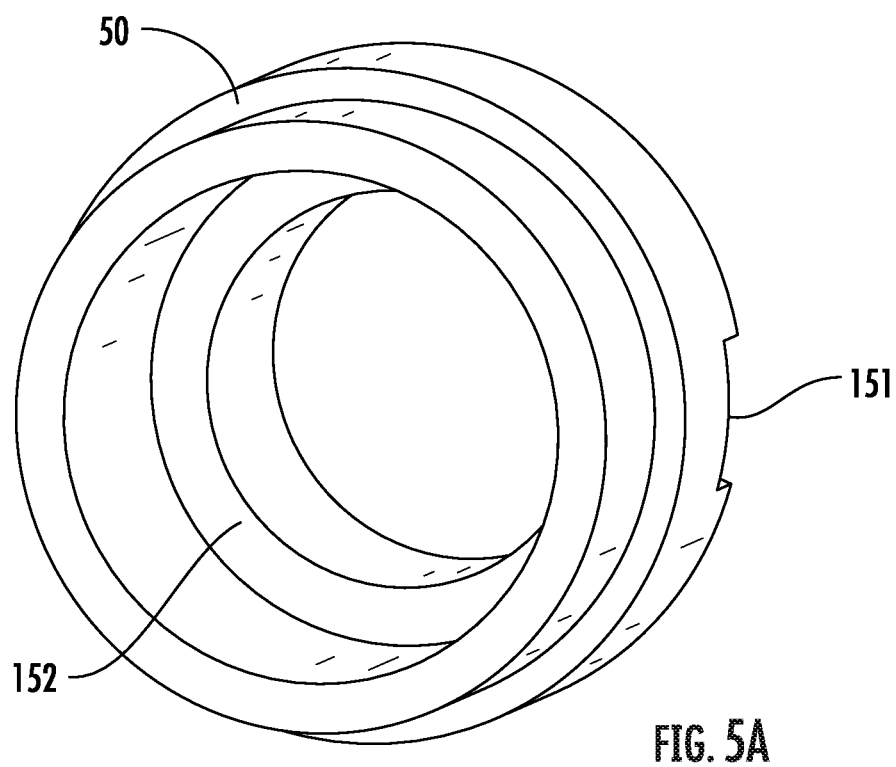
Figure 5B:
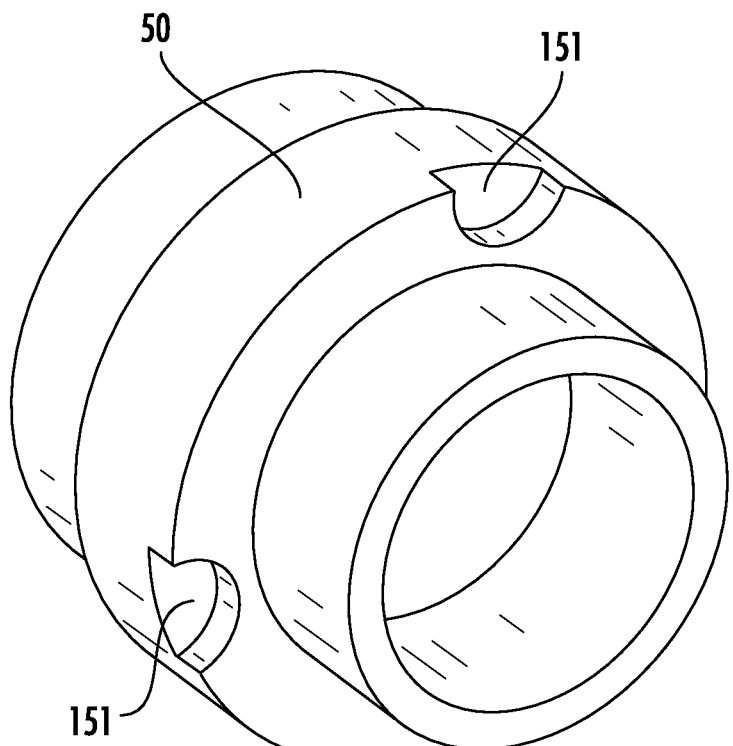
Figure 6:
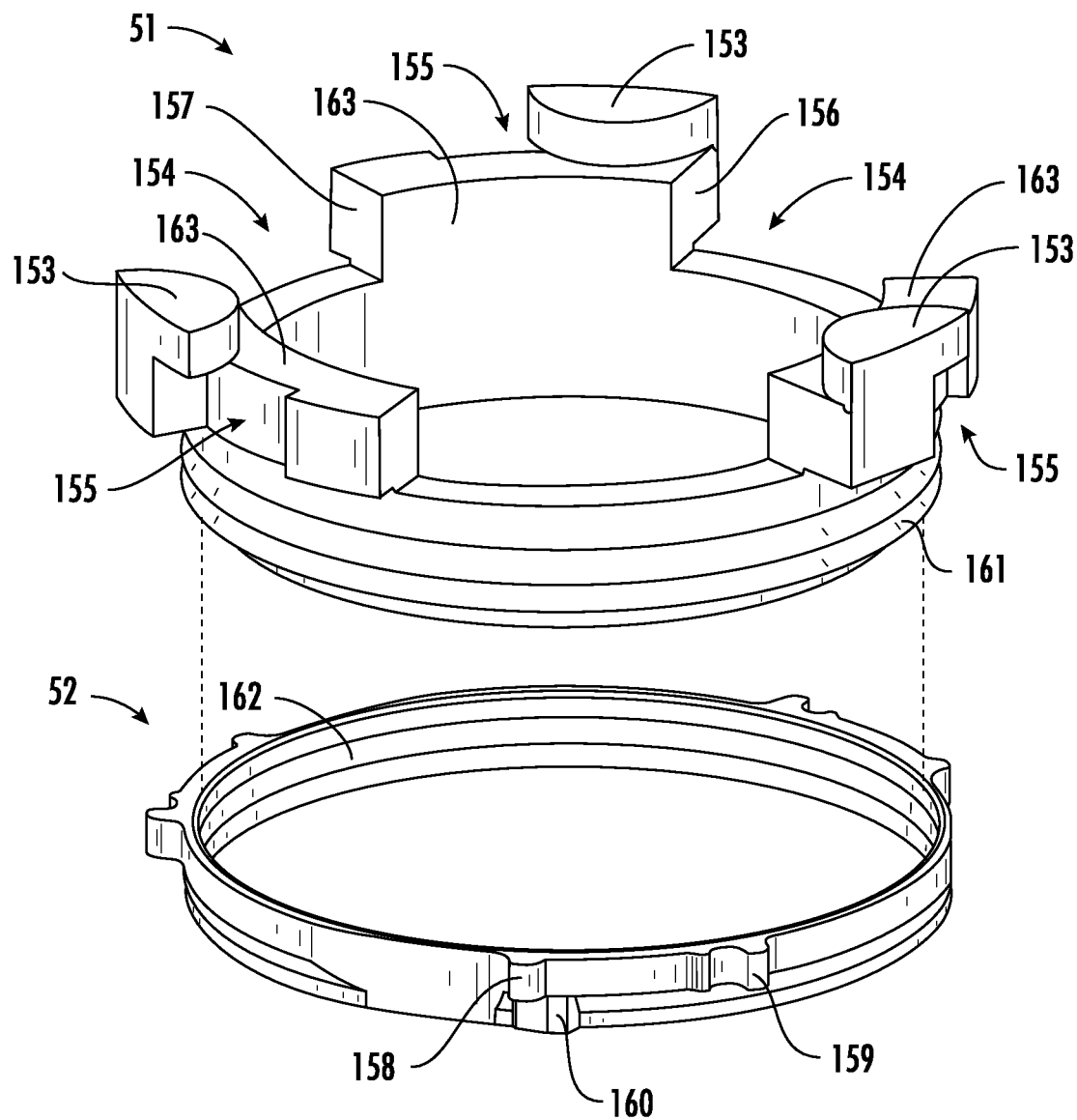
Figure 7:
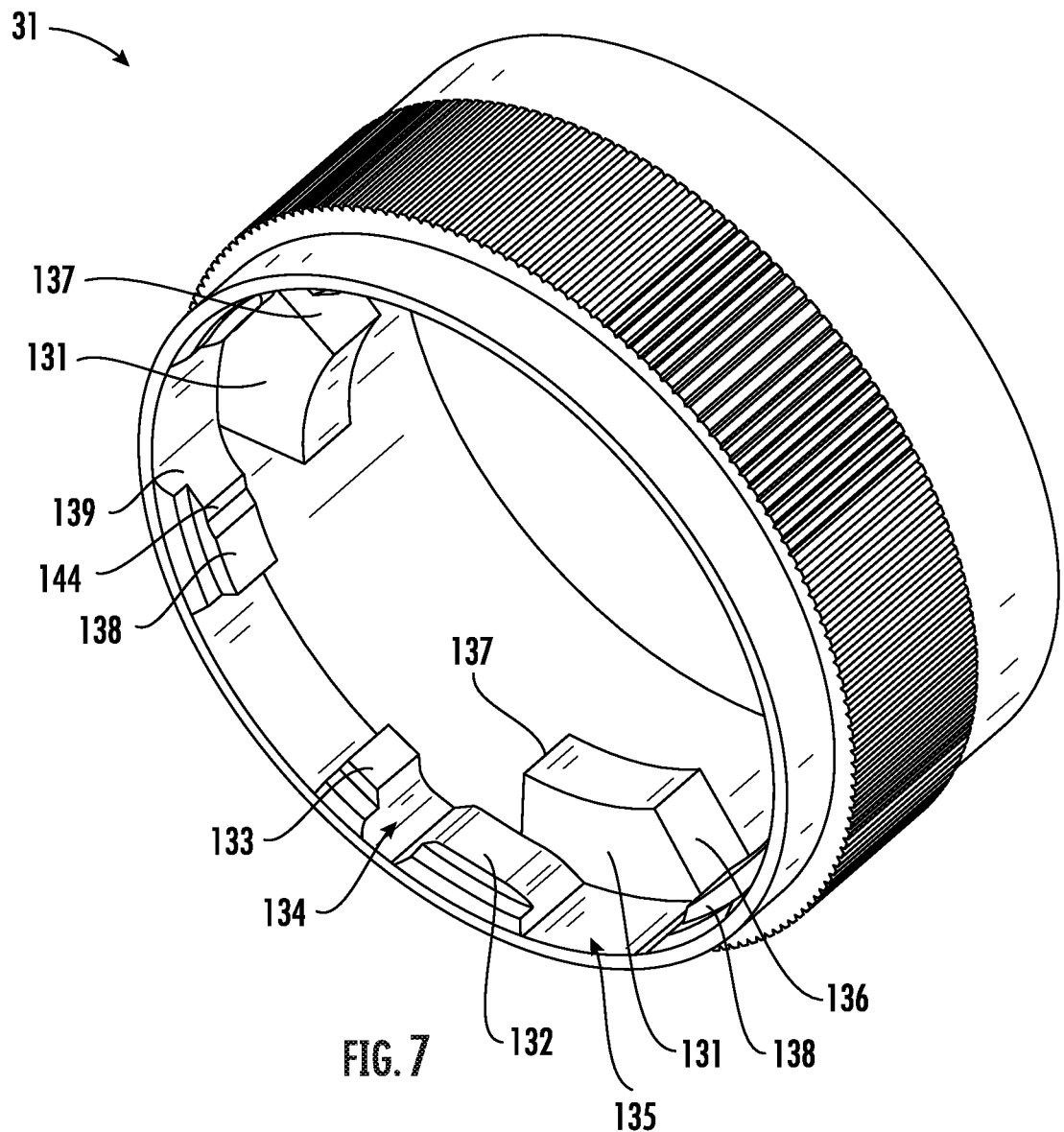
Figure 8:
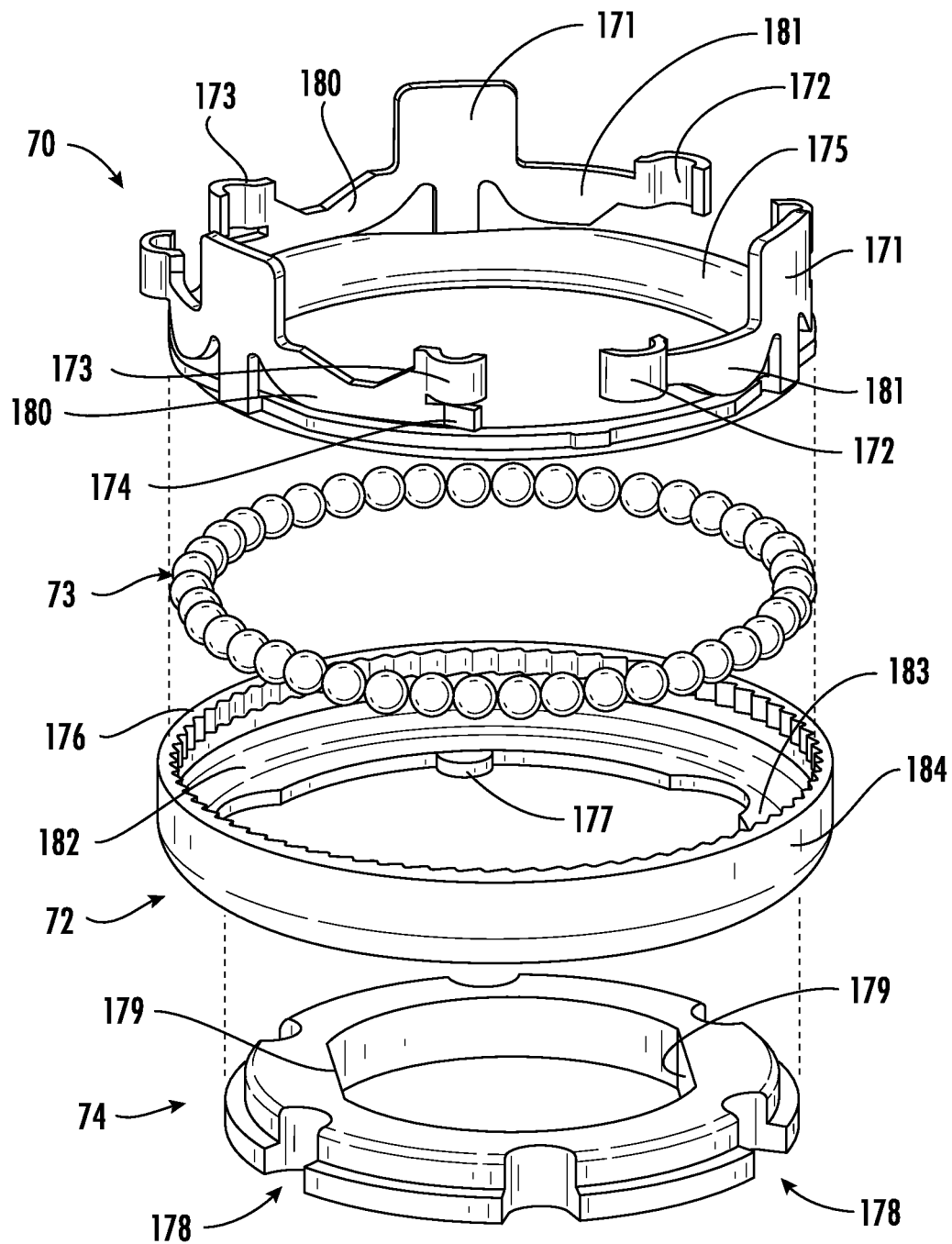
Figure 9:
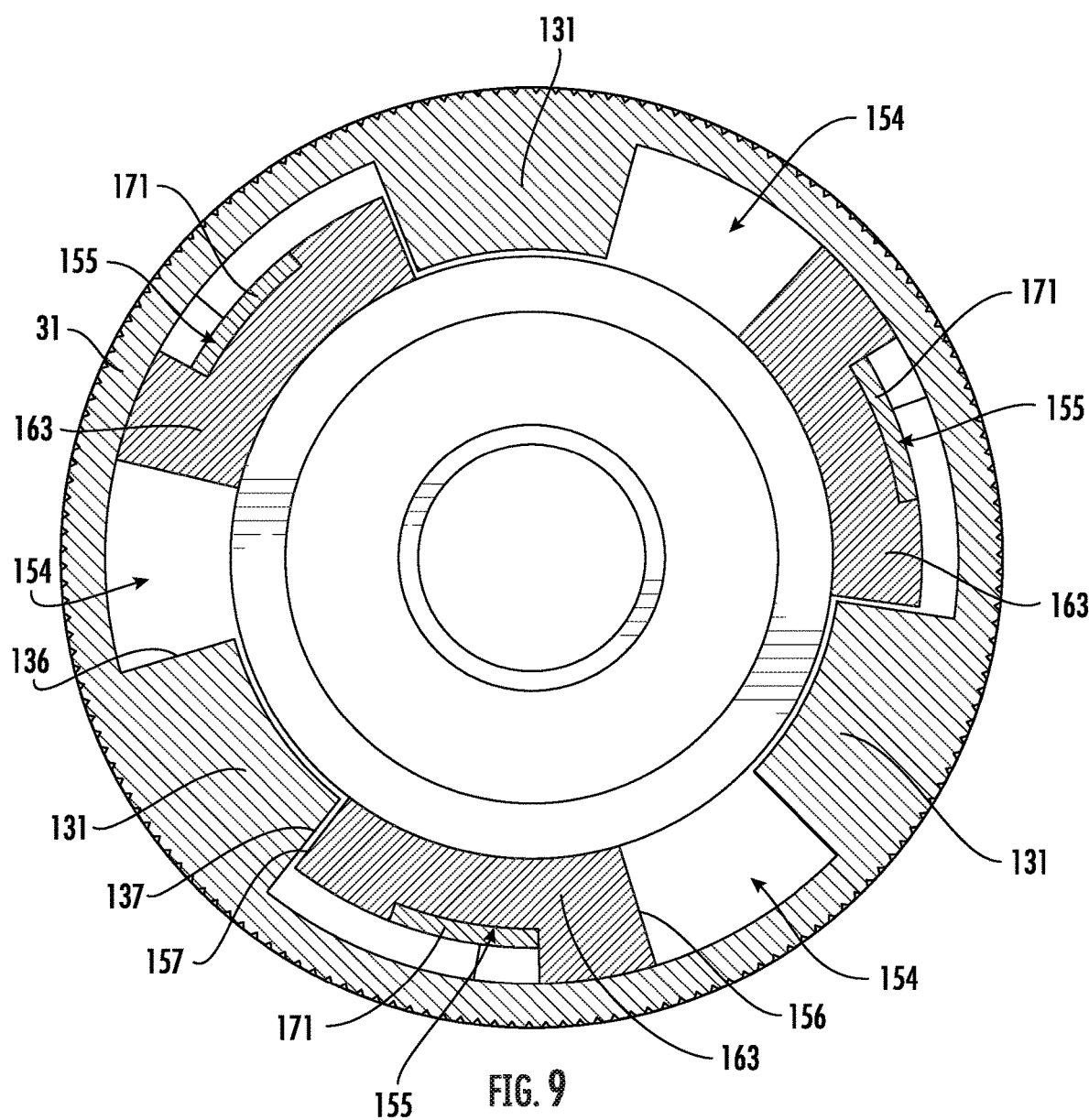
Figure 10:
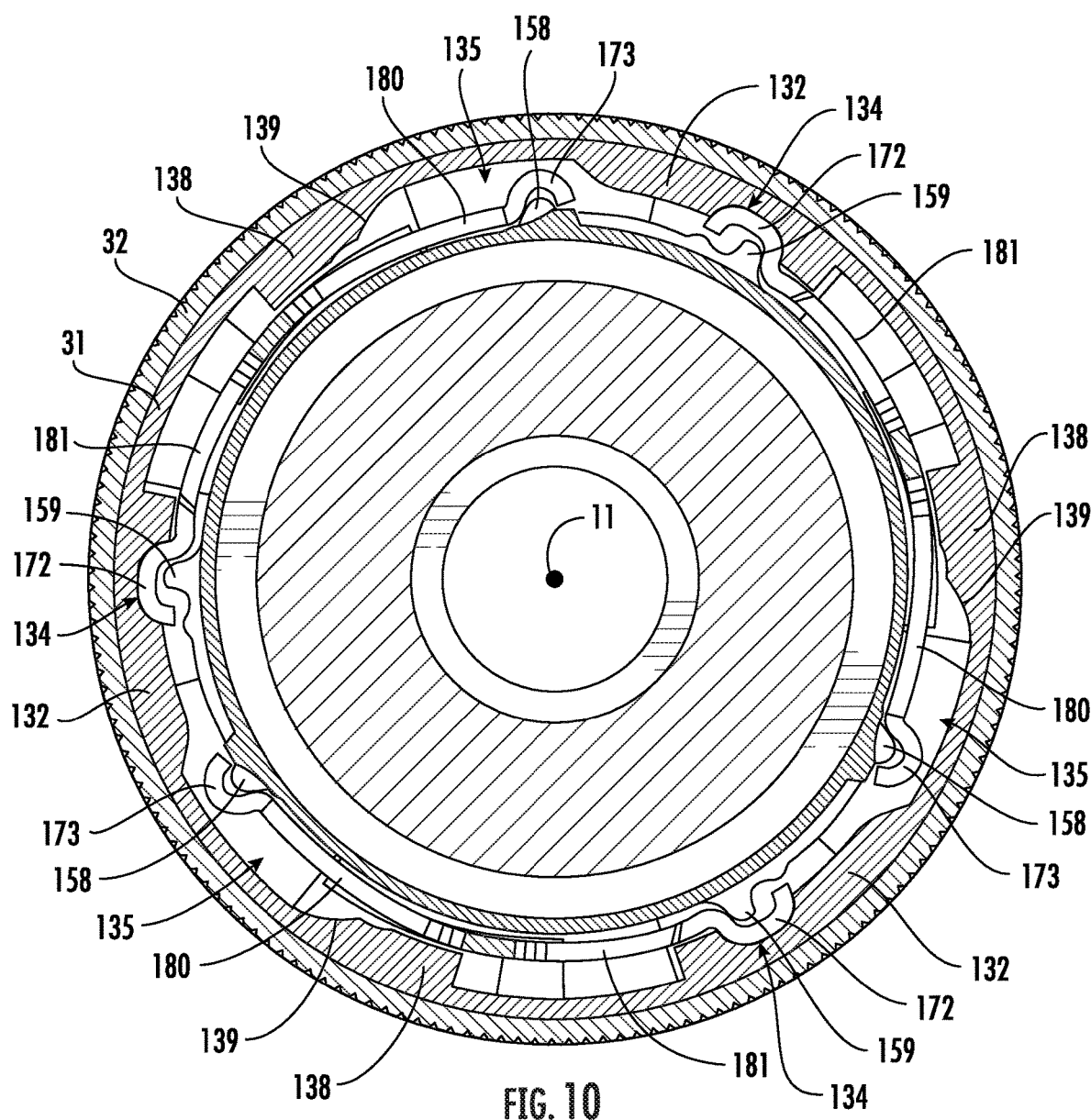
Figure 11:
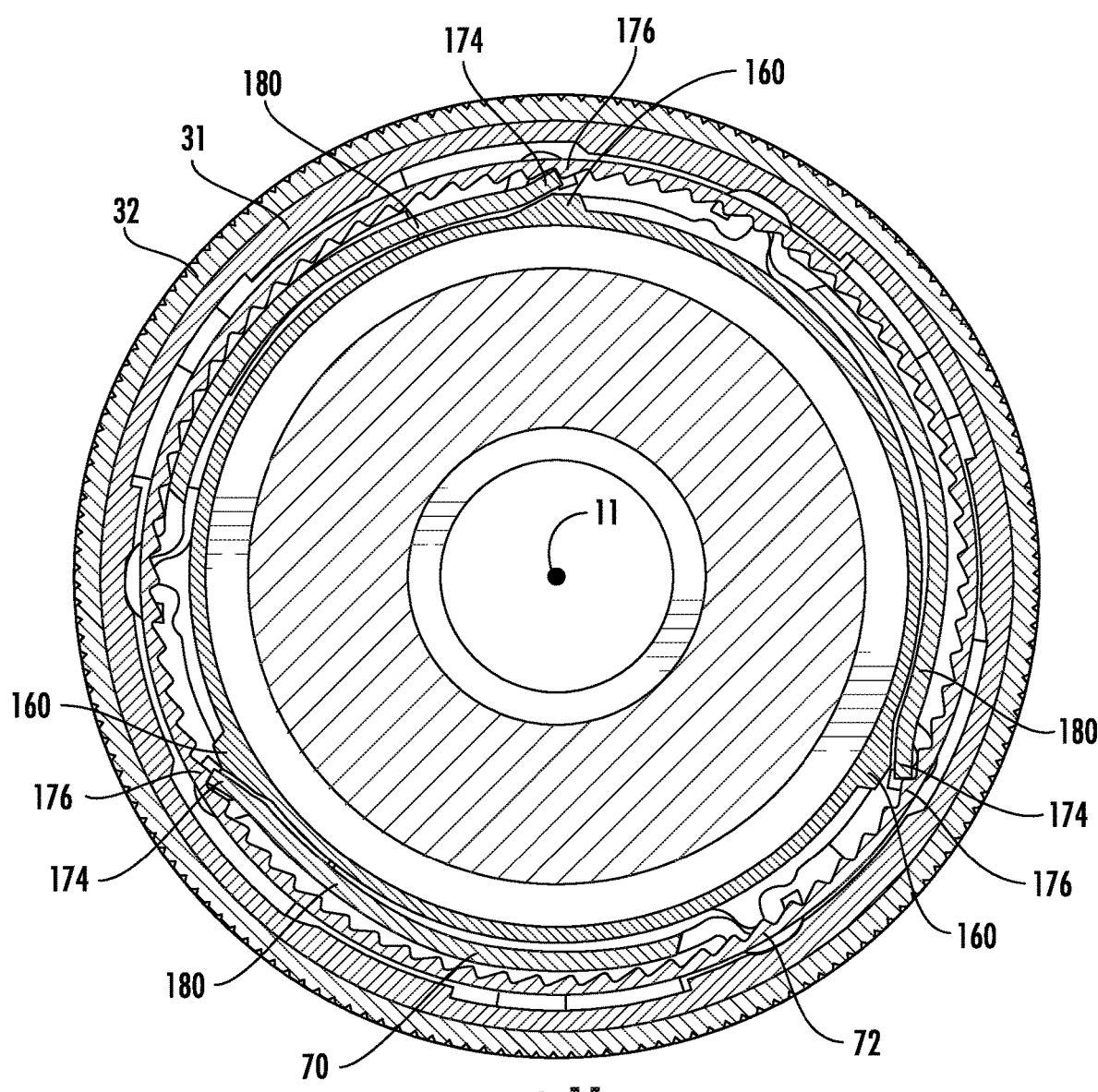
Figure 12A:
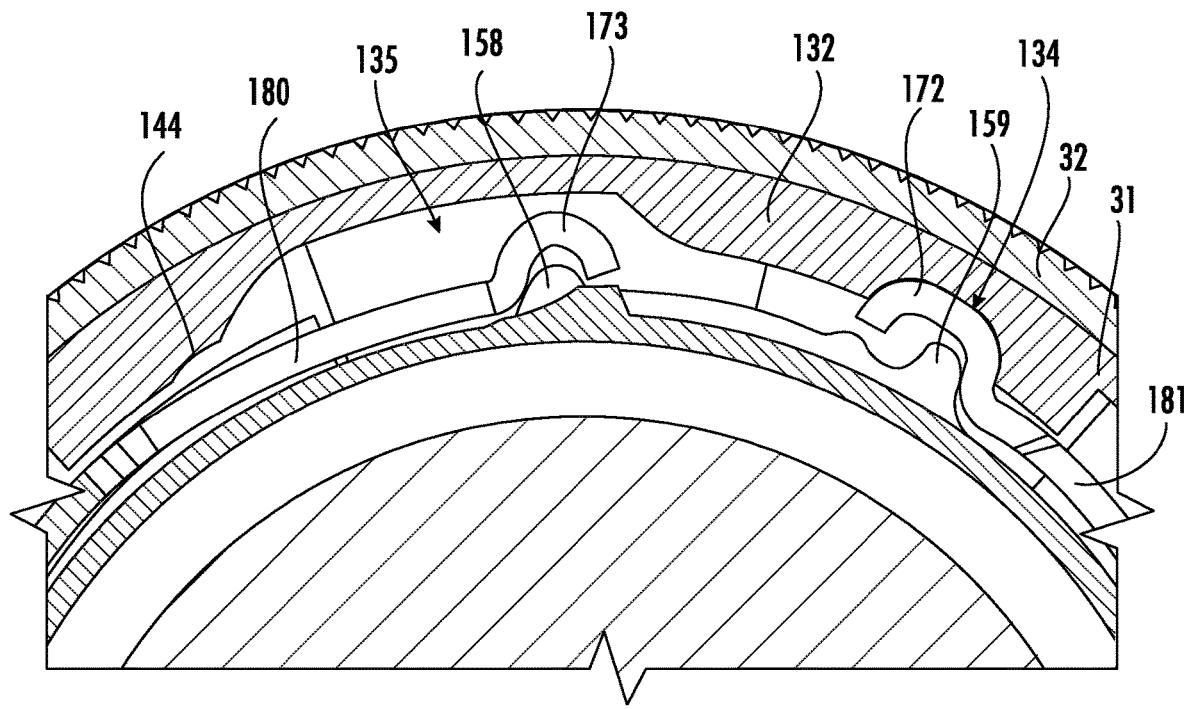
Figure 12B:
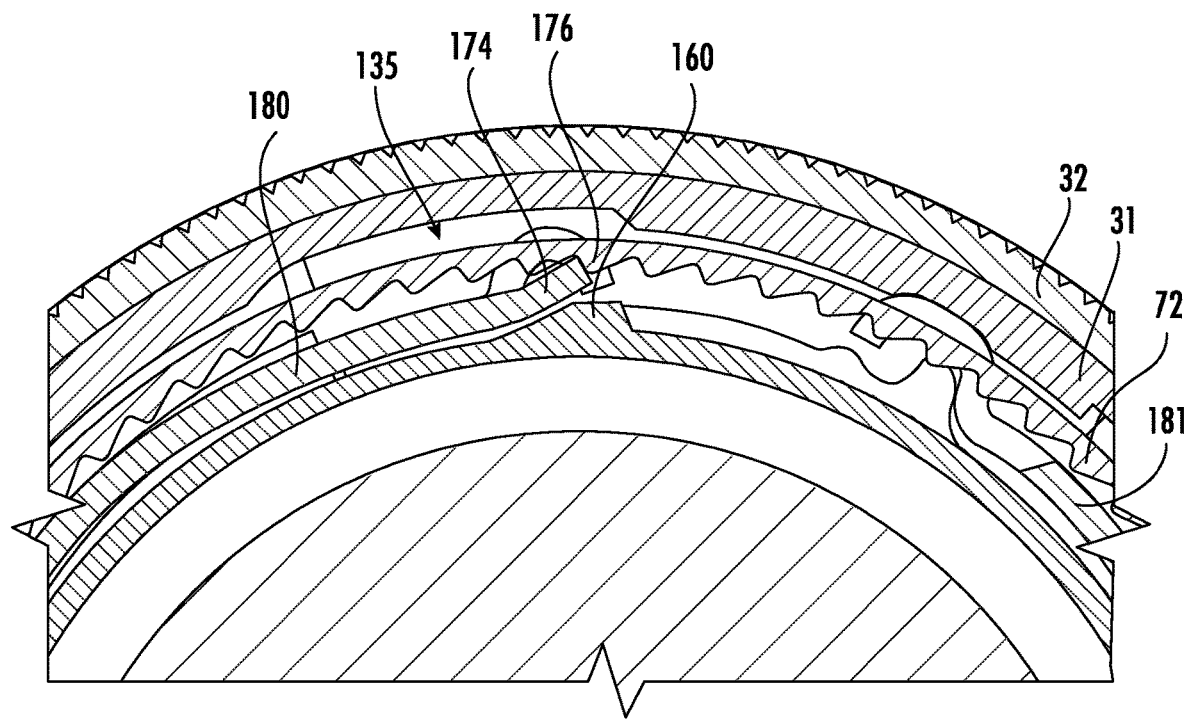
Figure 13A:
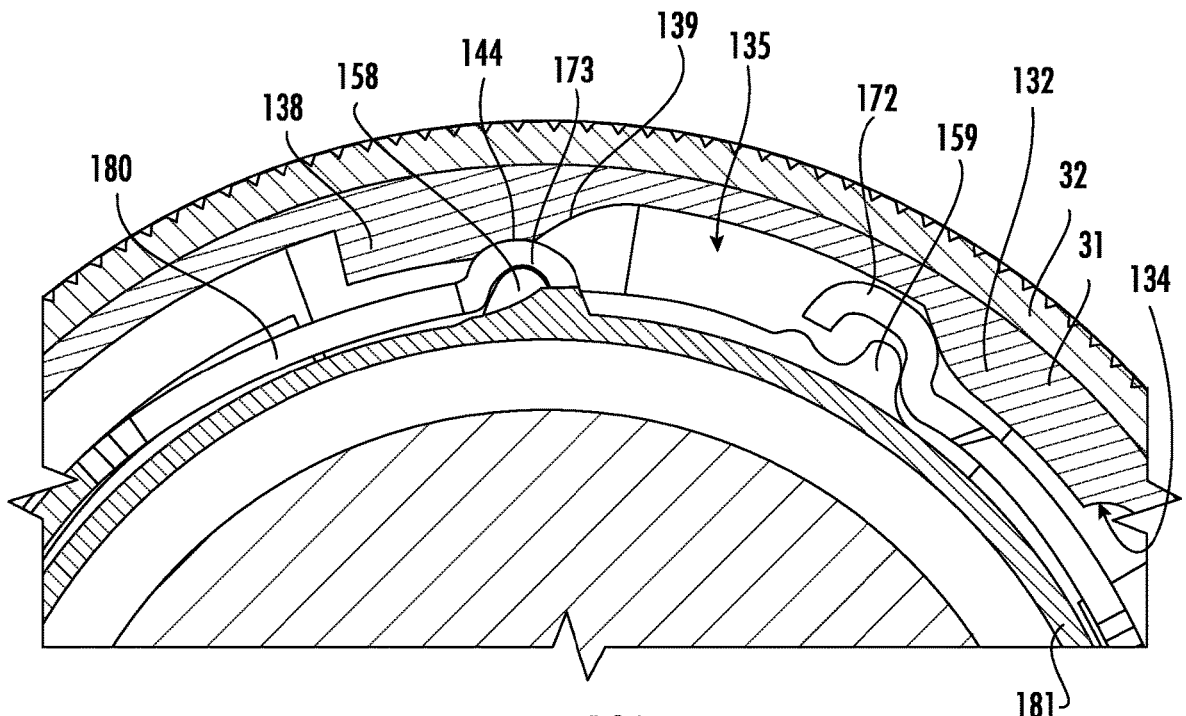
Figure 13B:
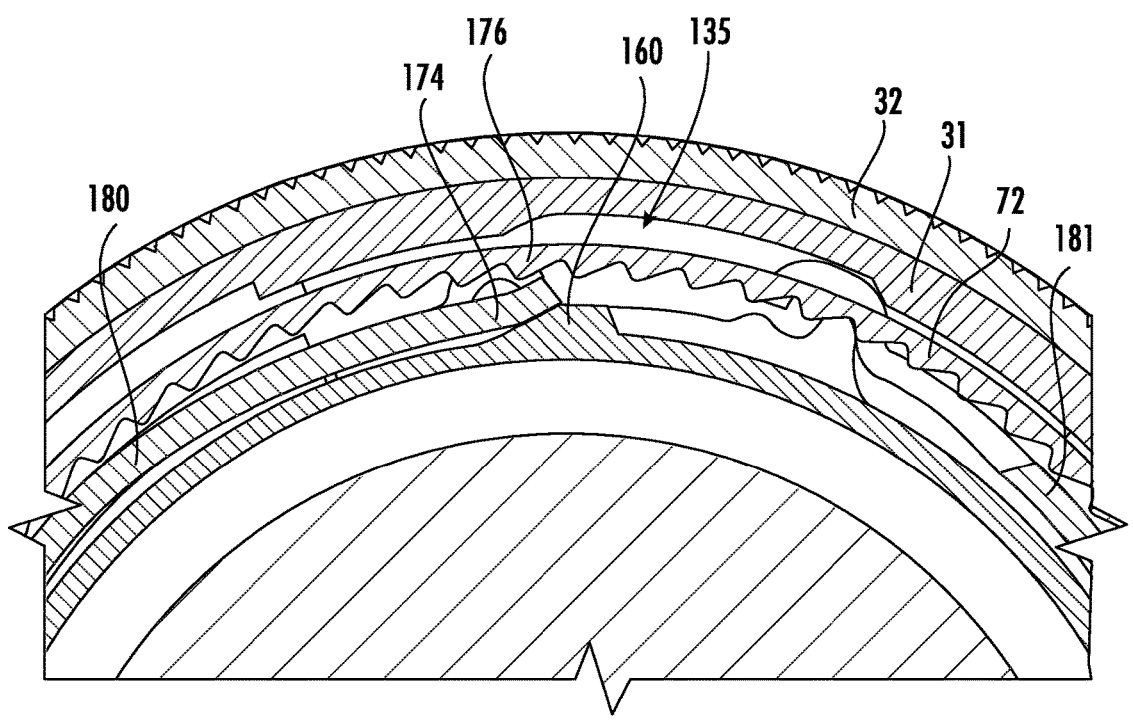
Figure 14:
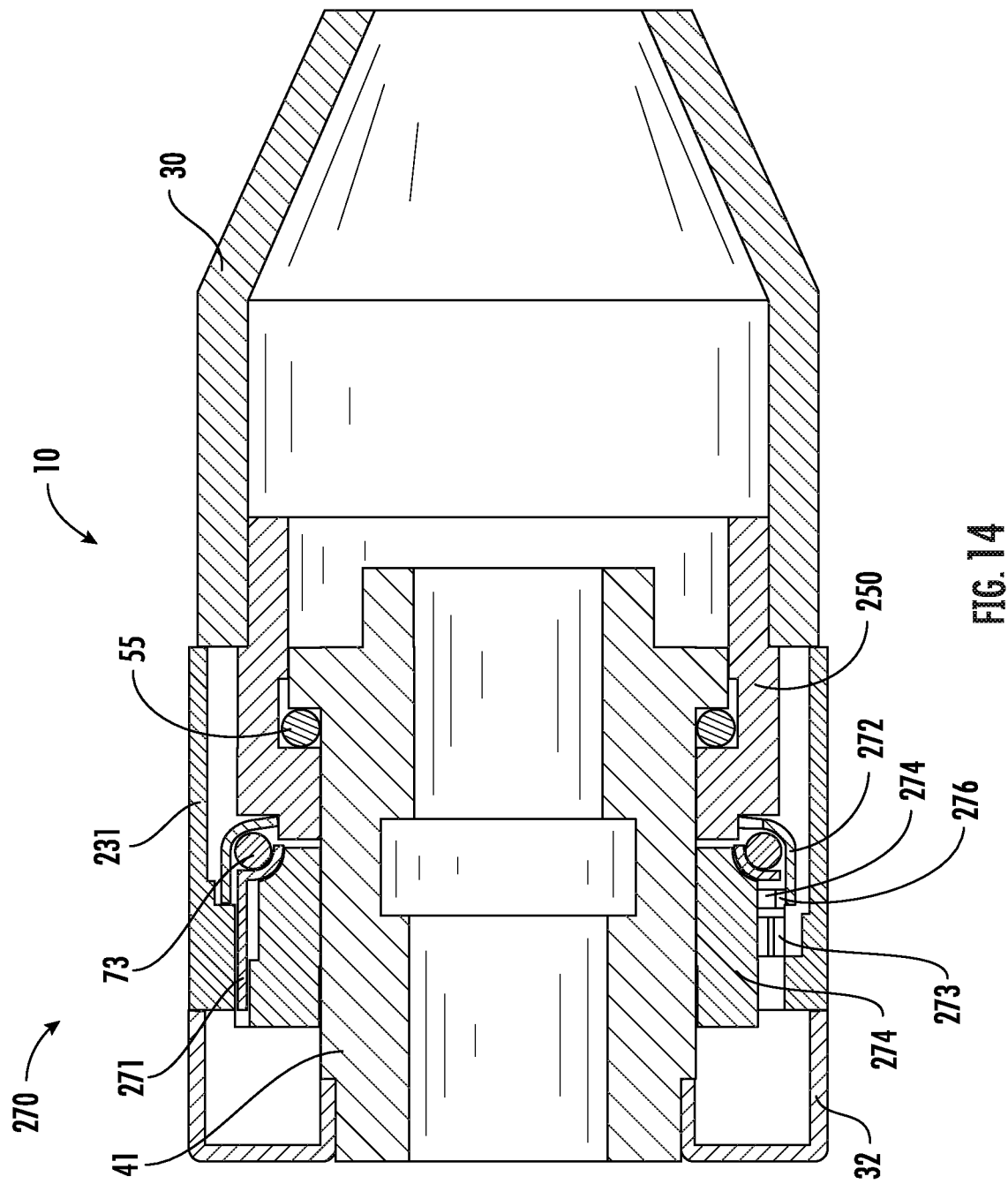
Figure 15:
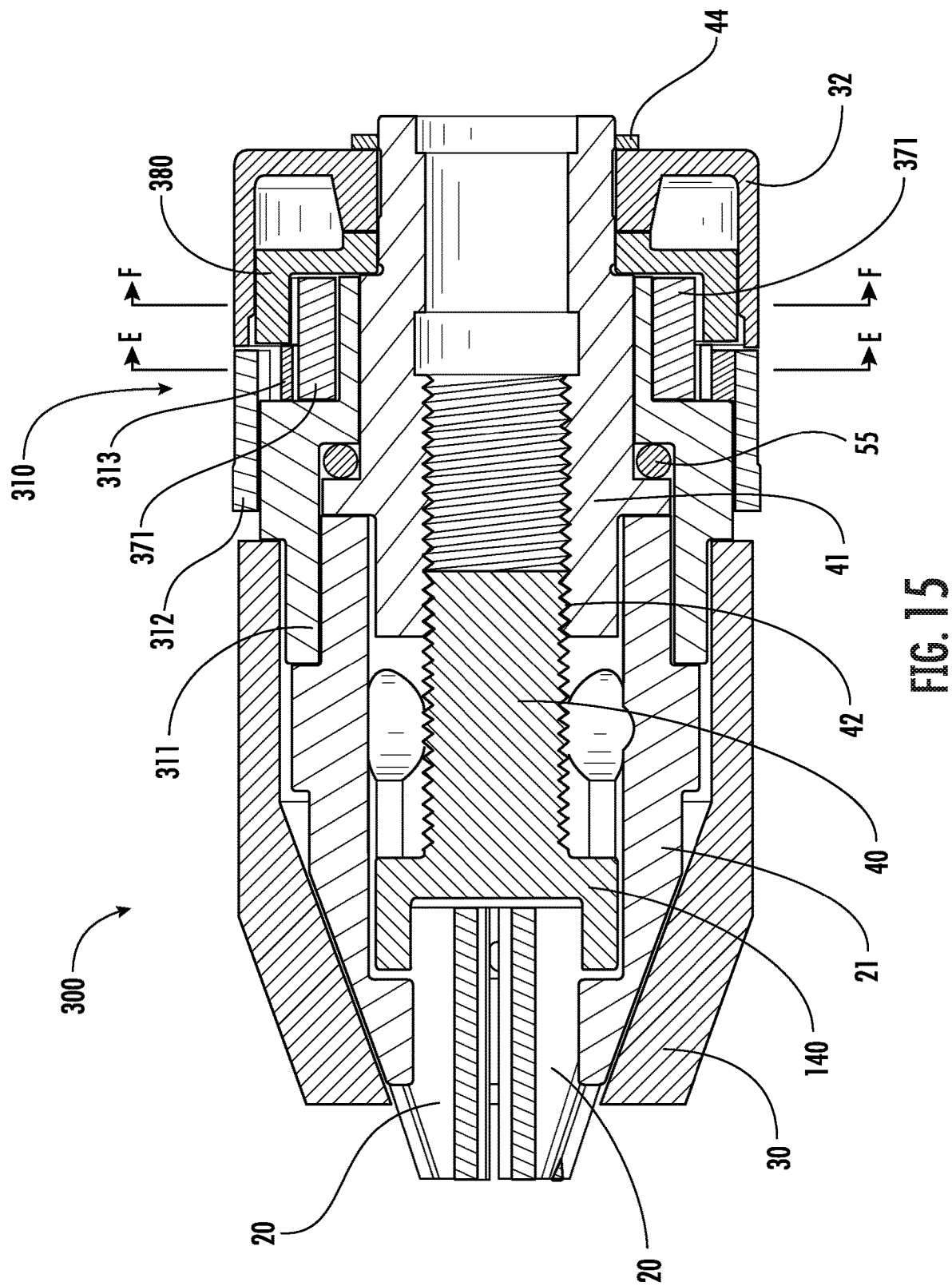
Figure 16:
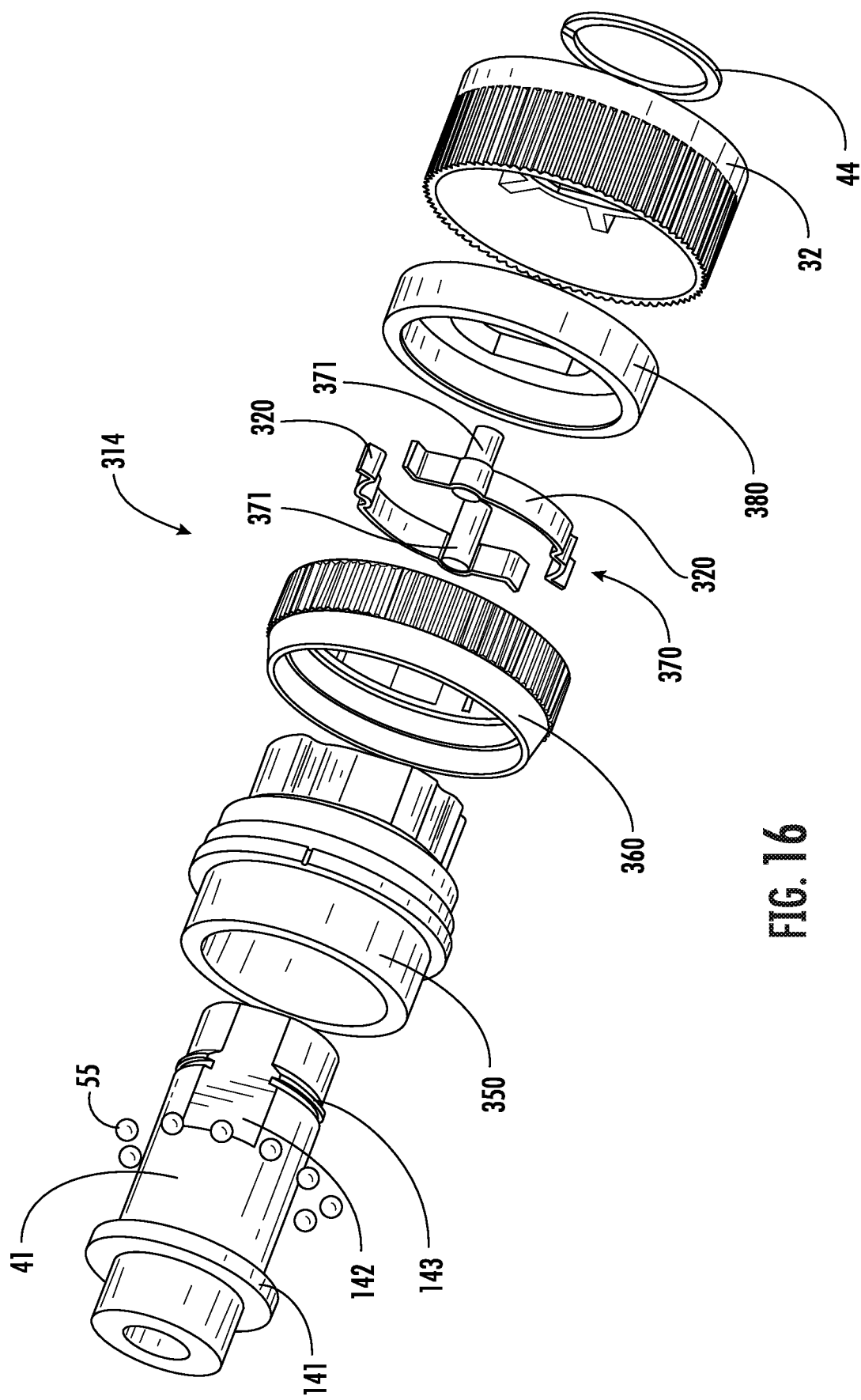
Figure 17B:
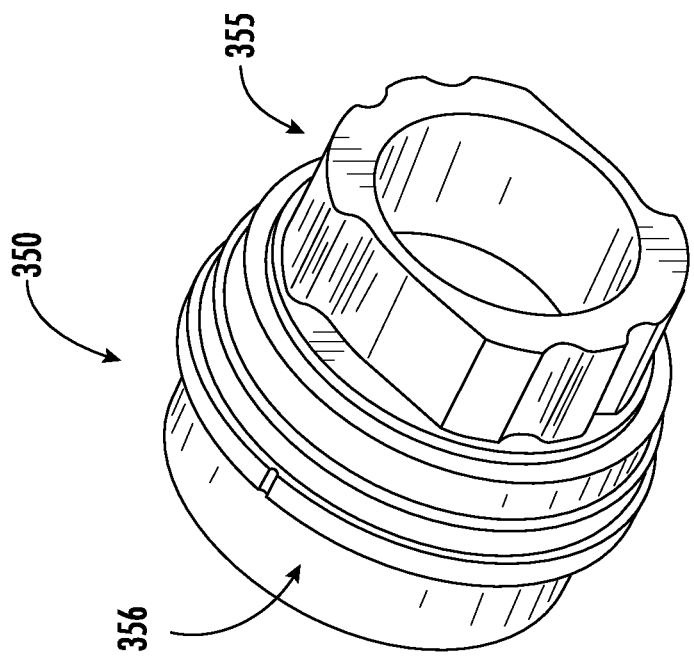
Figure 17A:
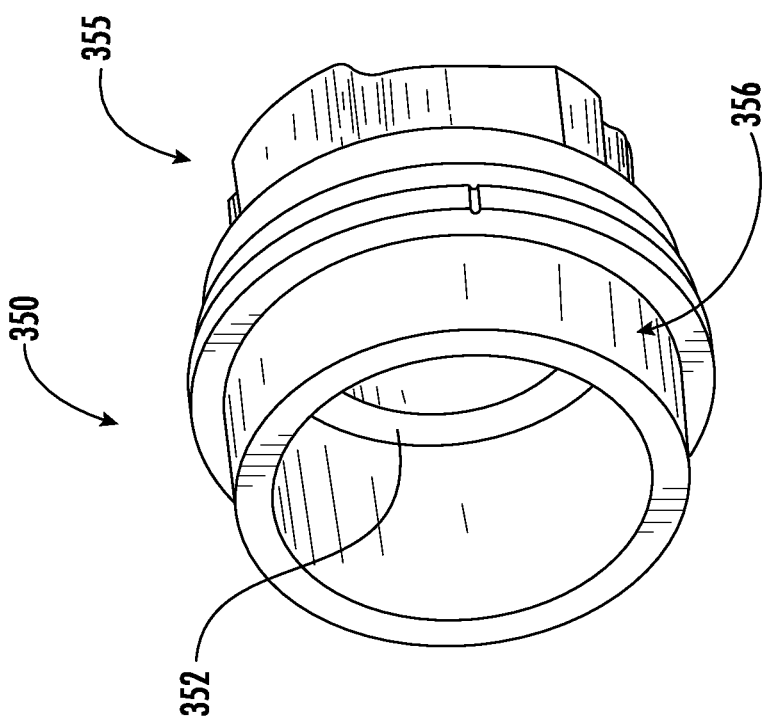
Figure 18:
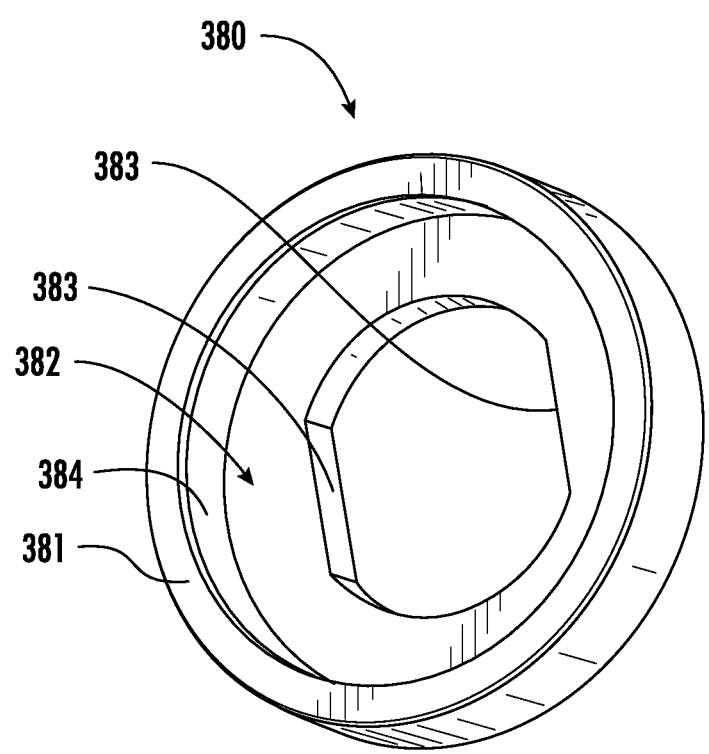
Figure 19A:
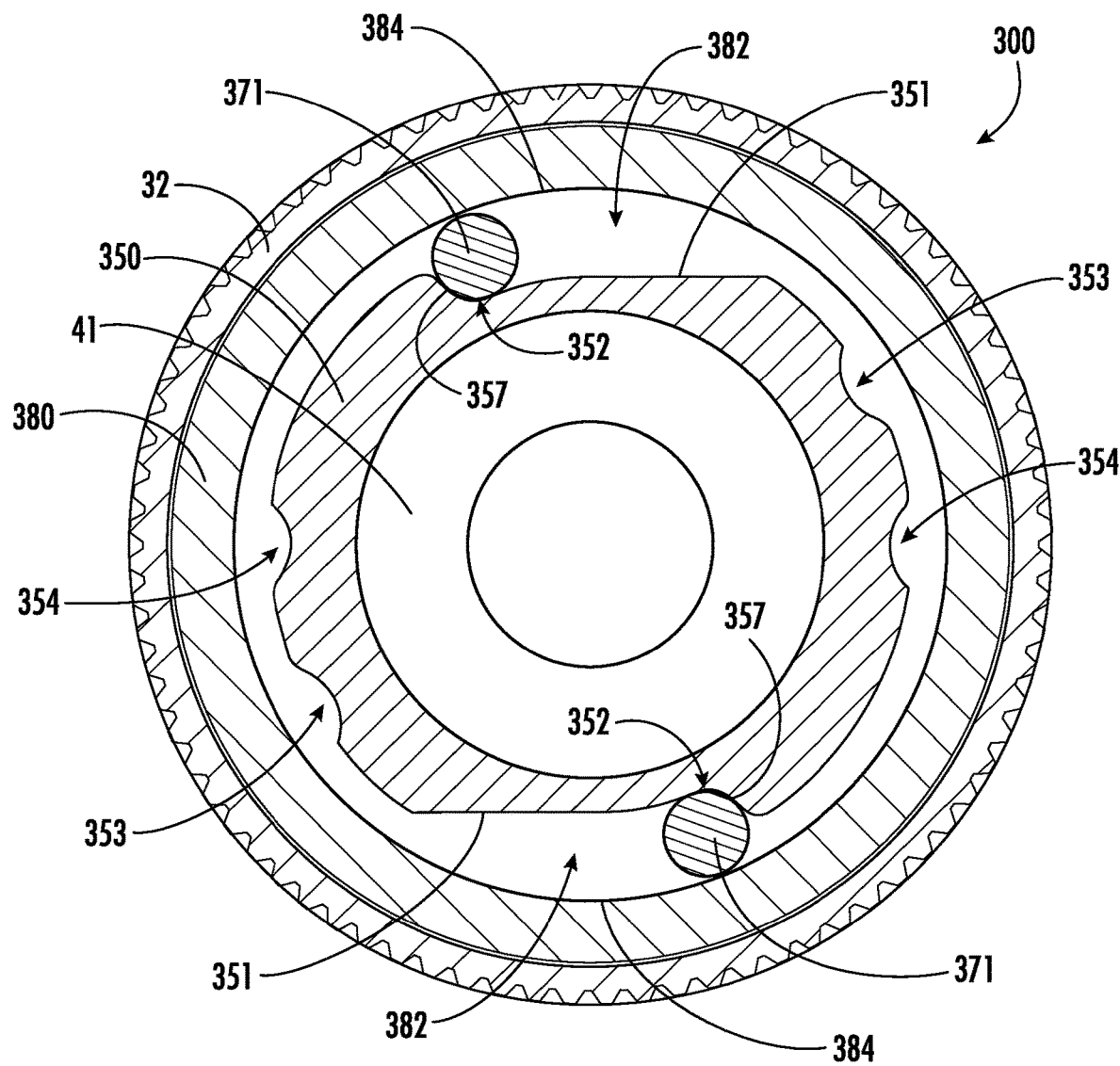
Figure 19B:
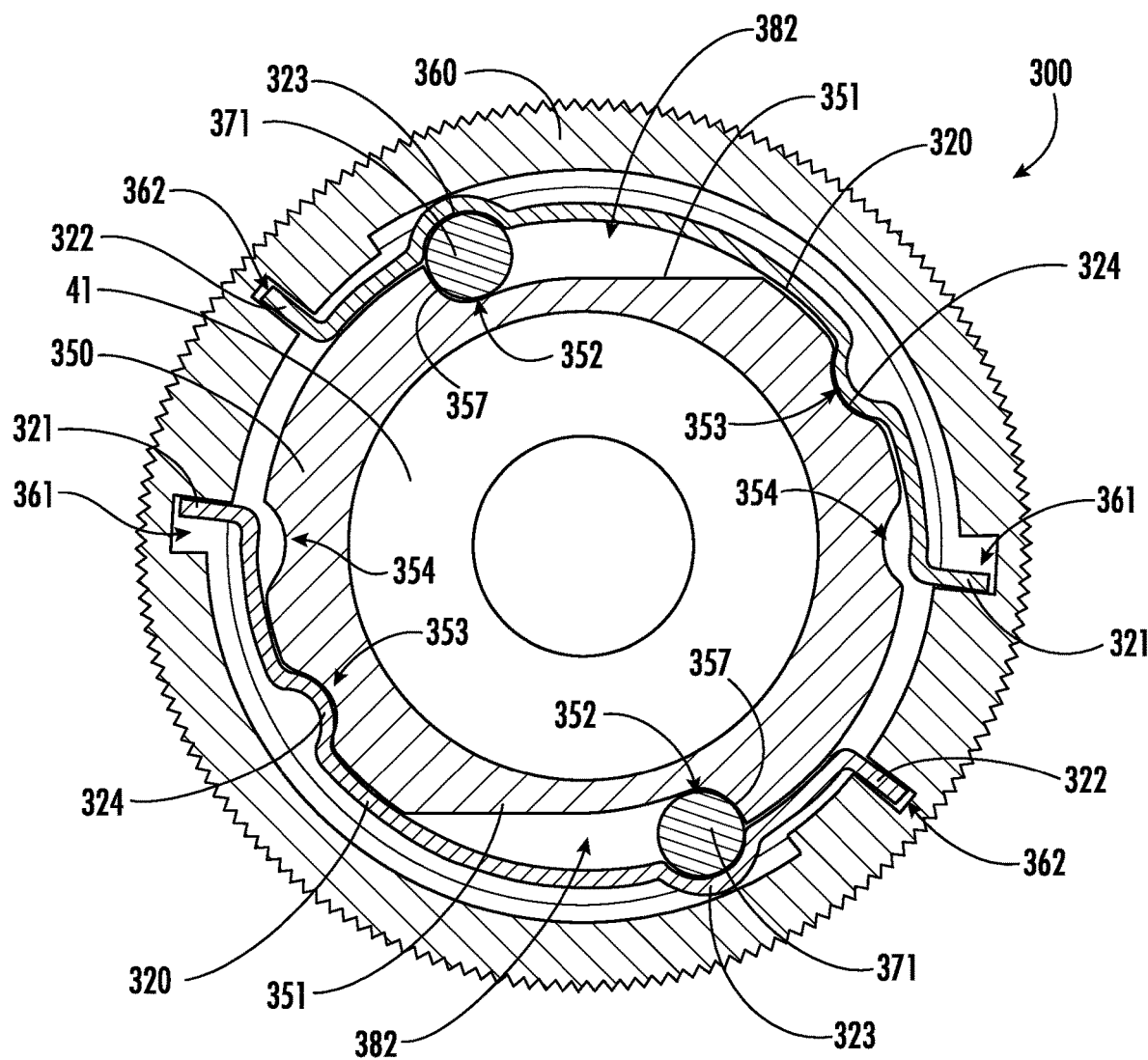
Figure 19C:
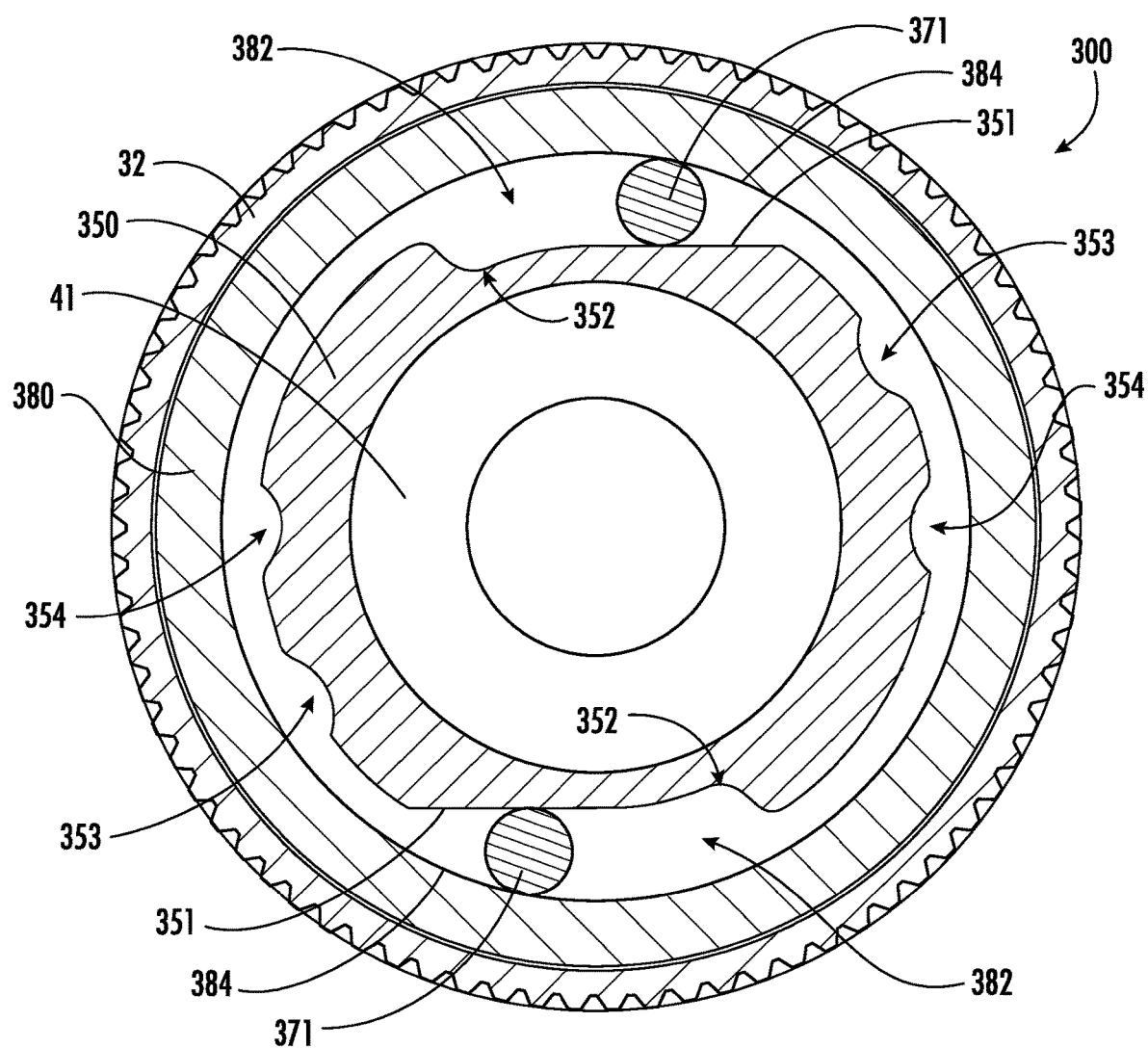
Figure 19D:
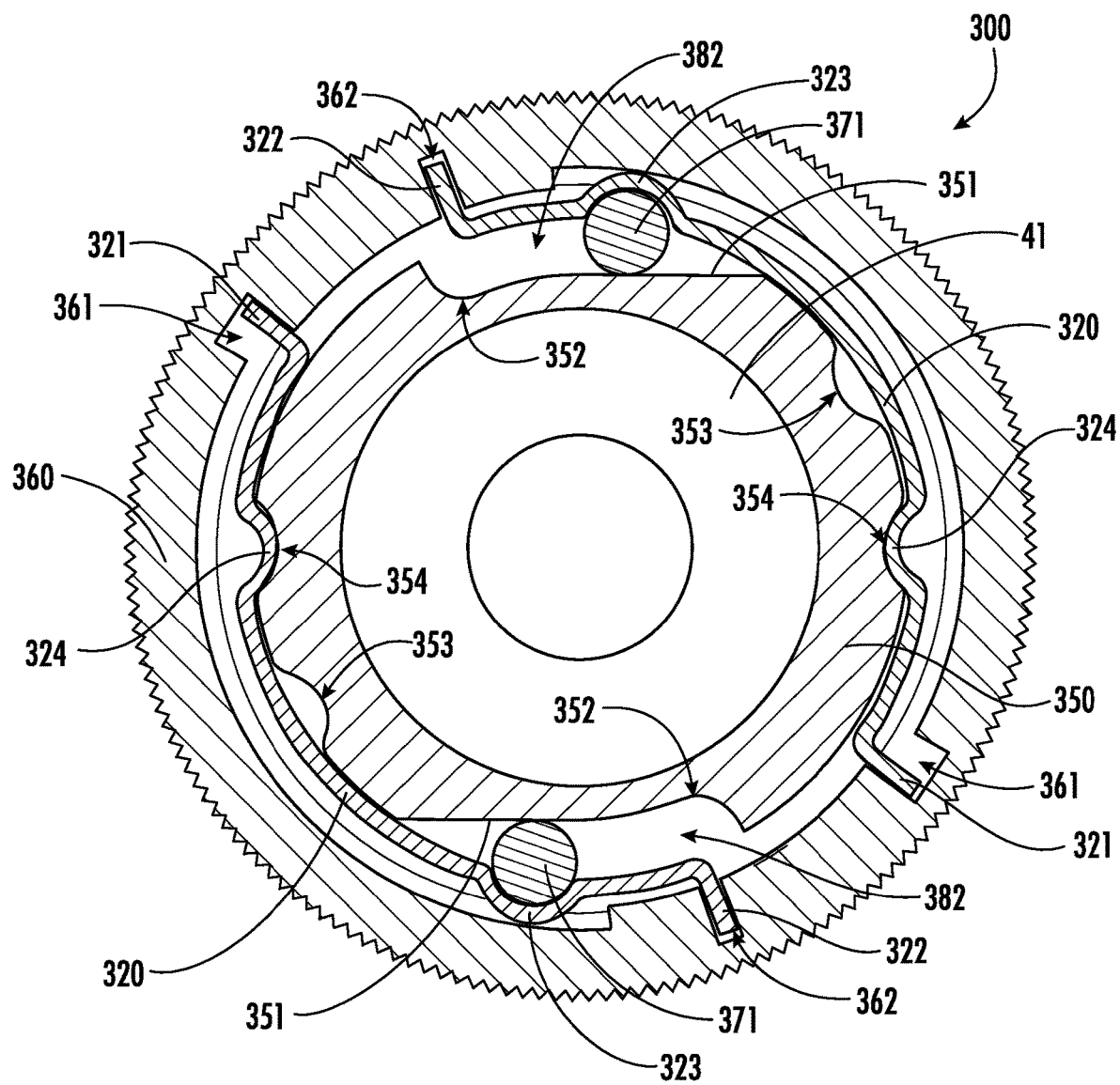
Figure 20A:
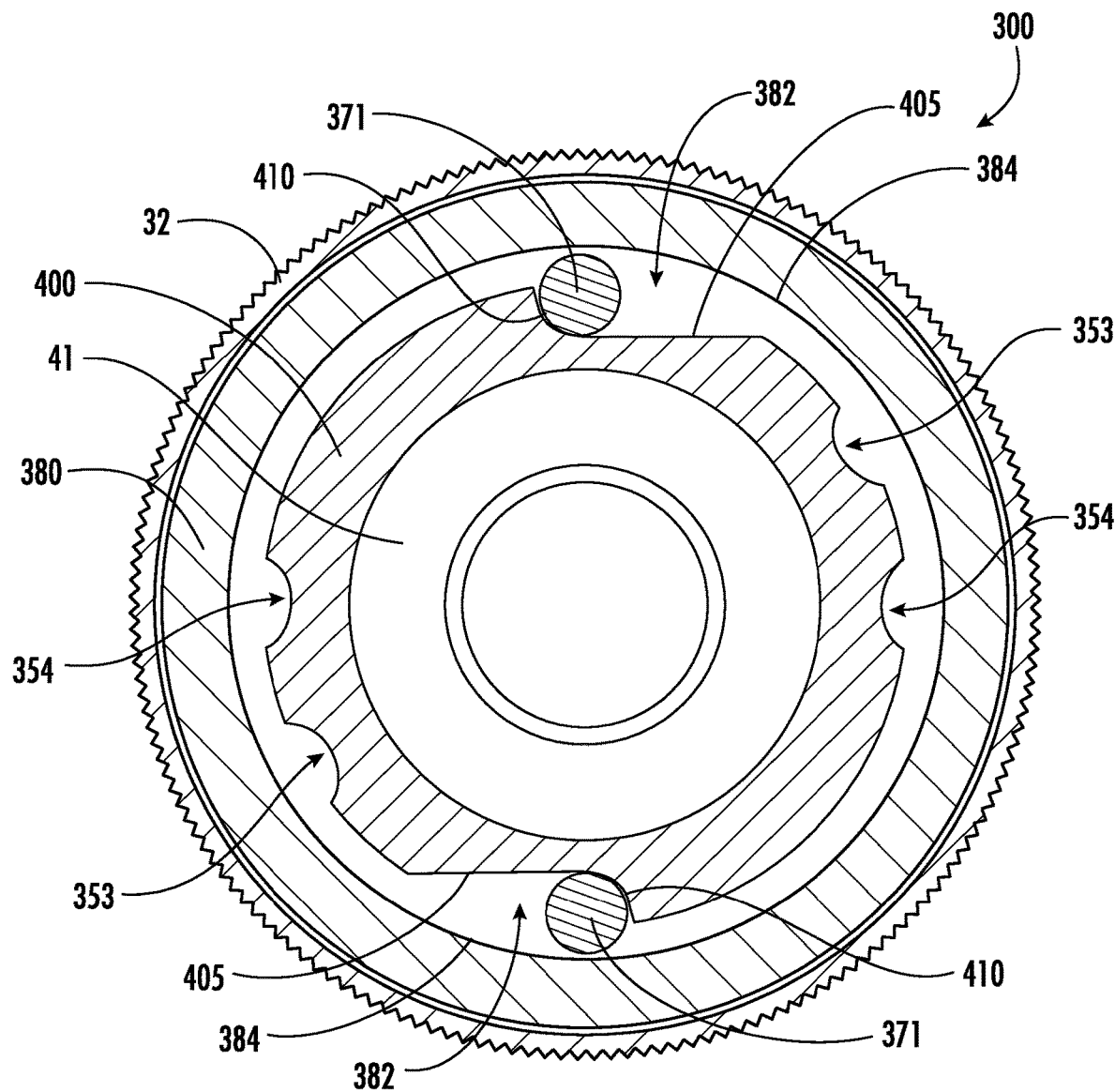
Figure 20B:
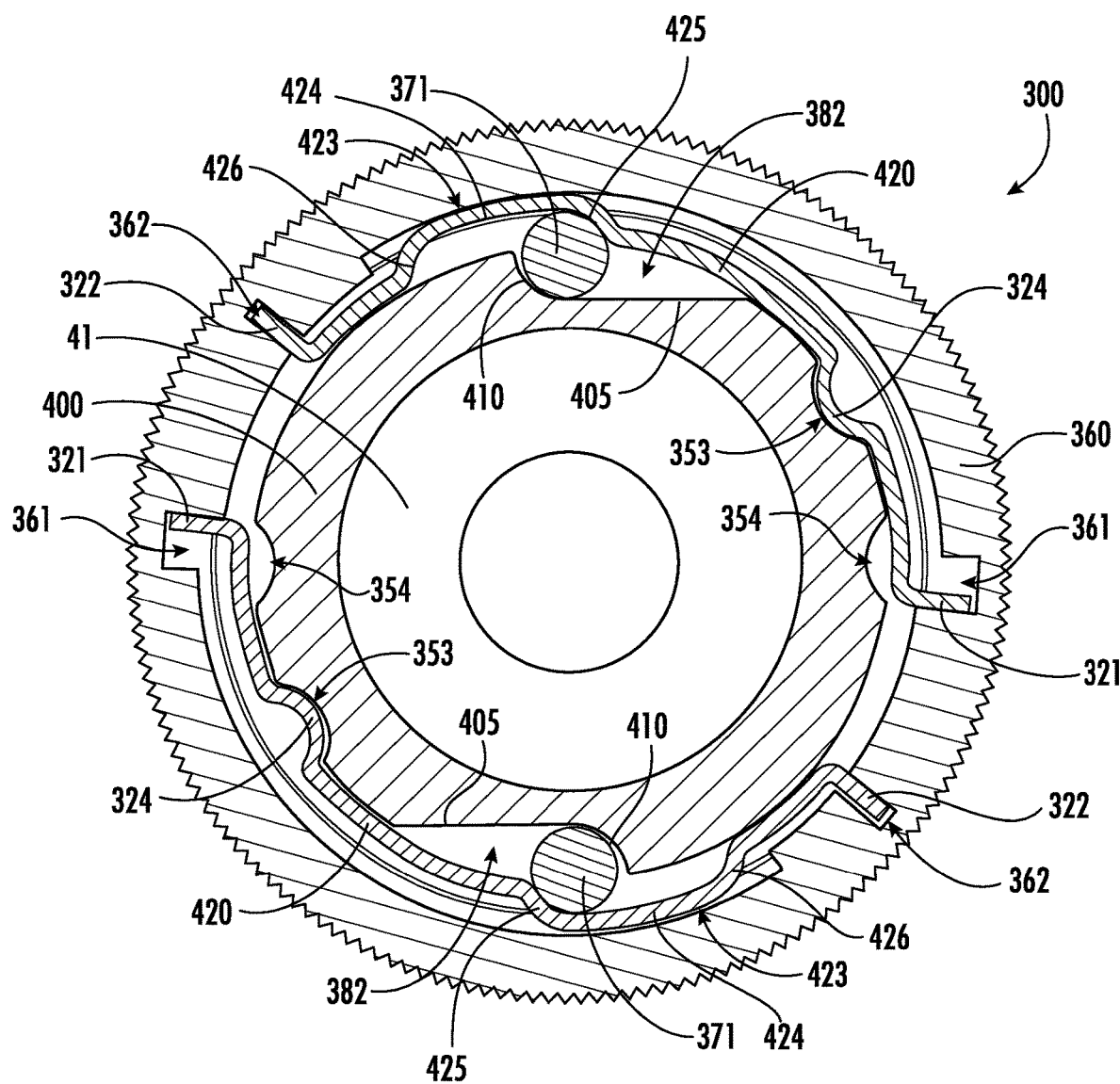
Figure 20C:
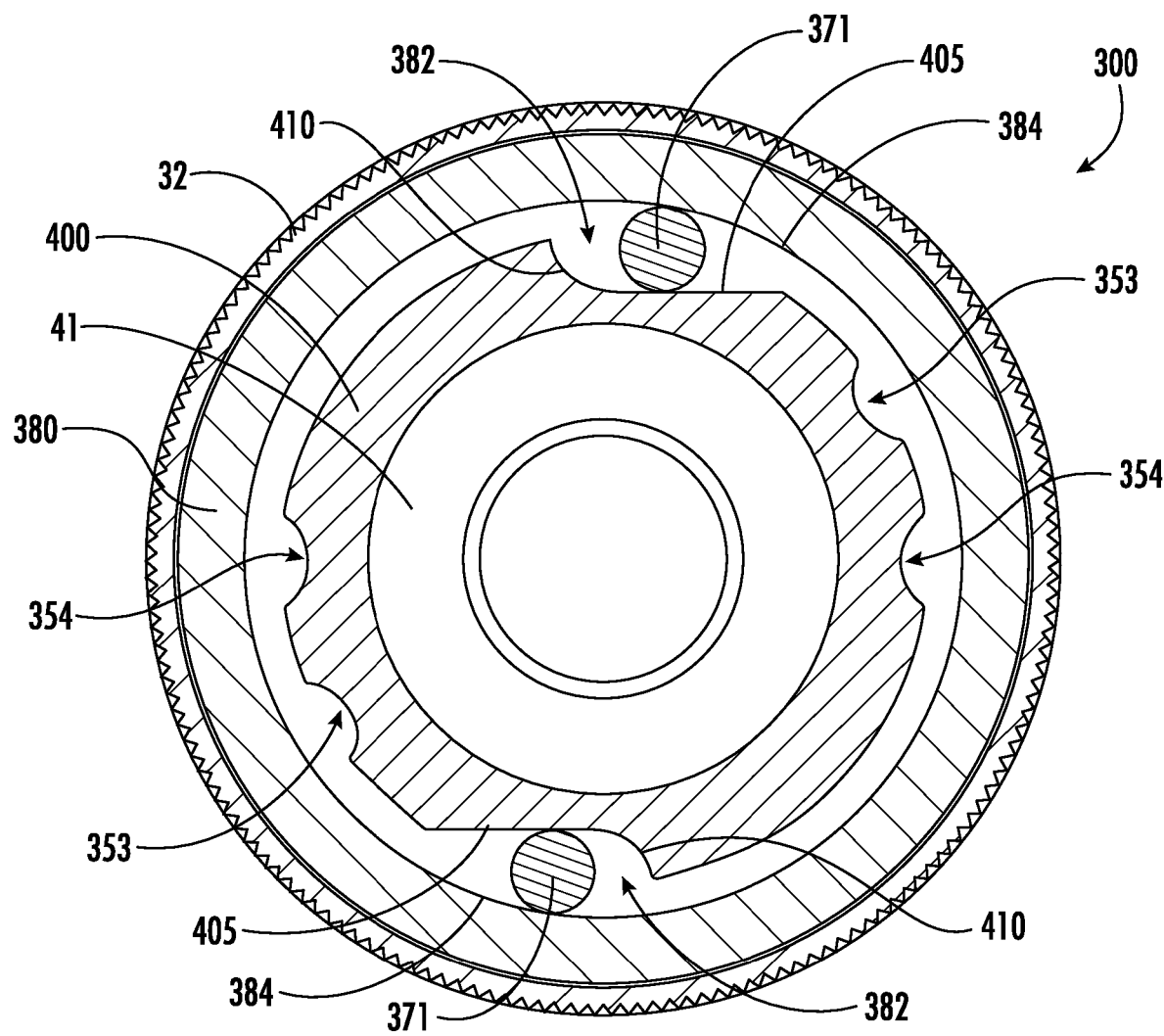
Figure 20D:
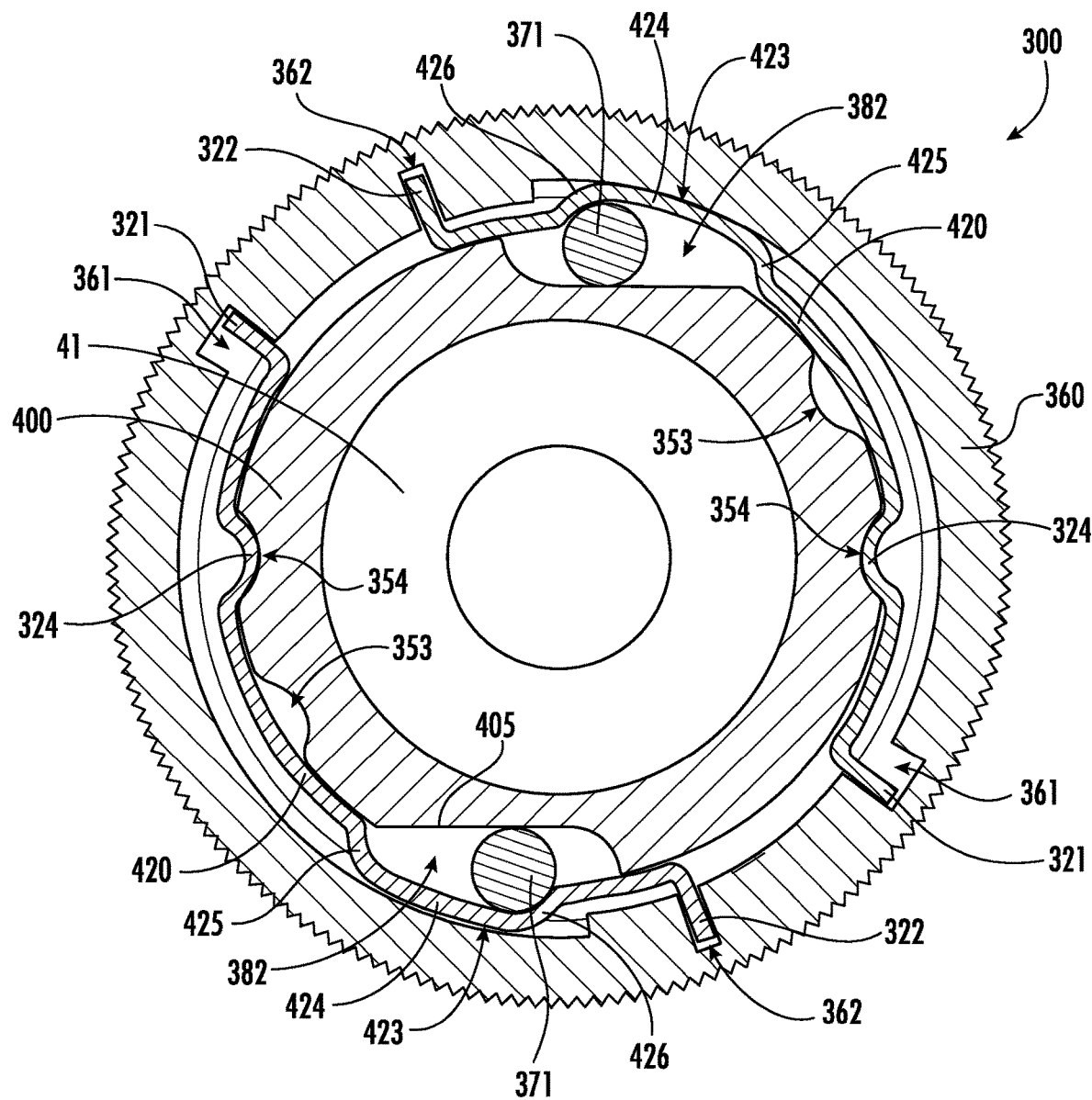
Figure 21A:
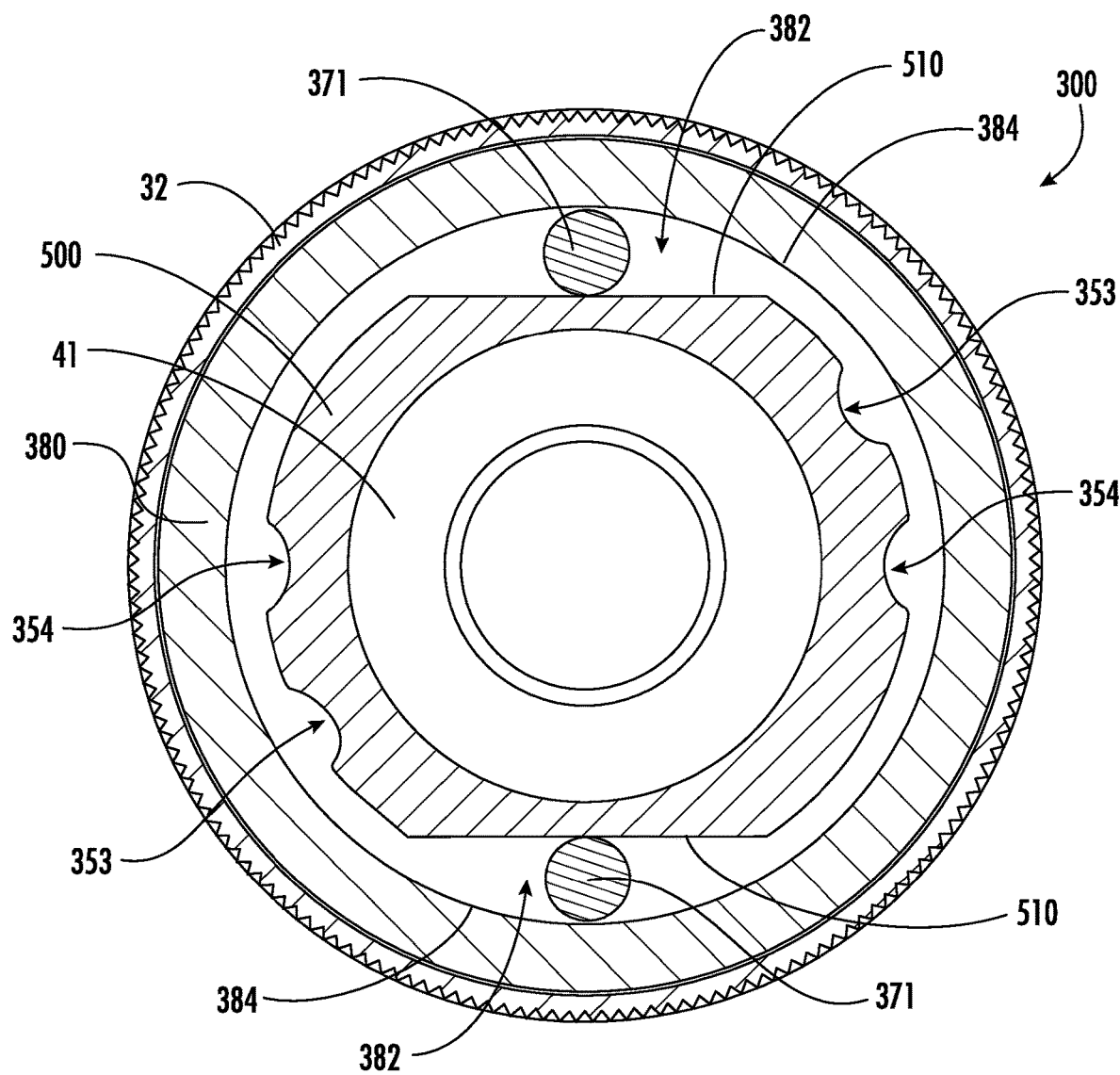
Figure 21B:
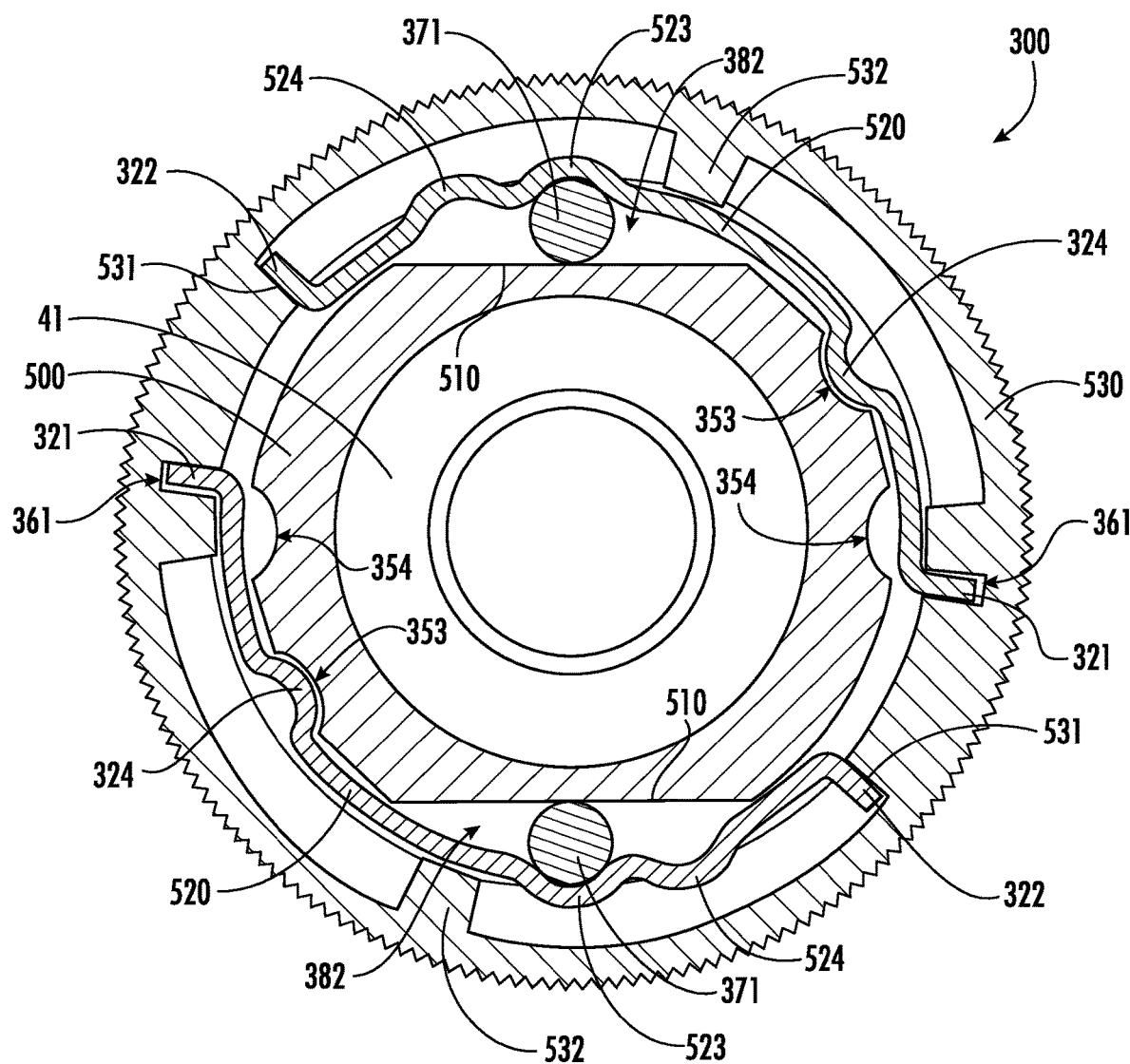
Figure 21C:
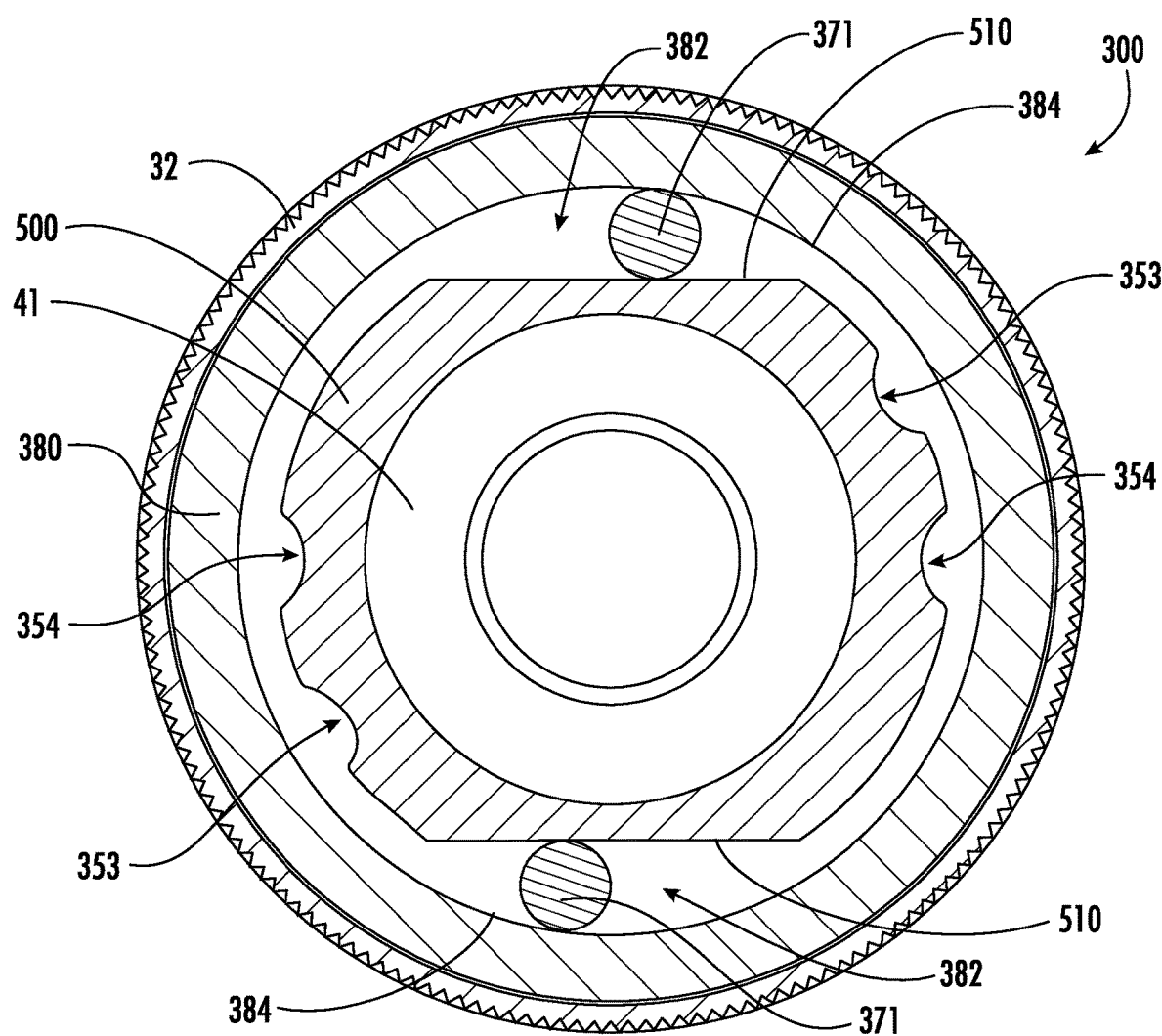
Figure 21D:
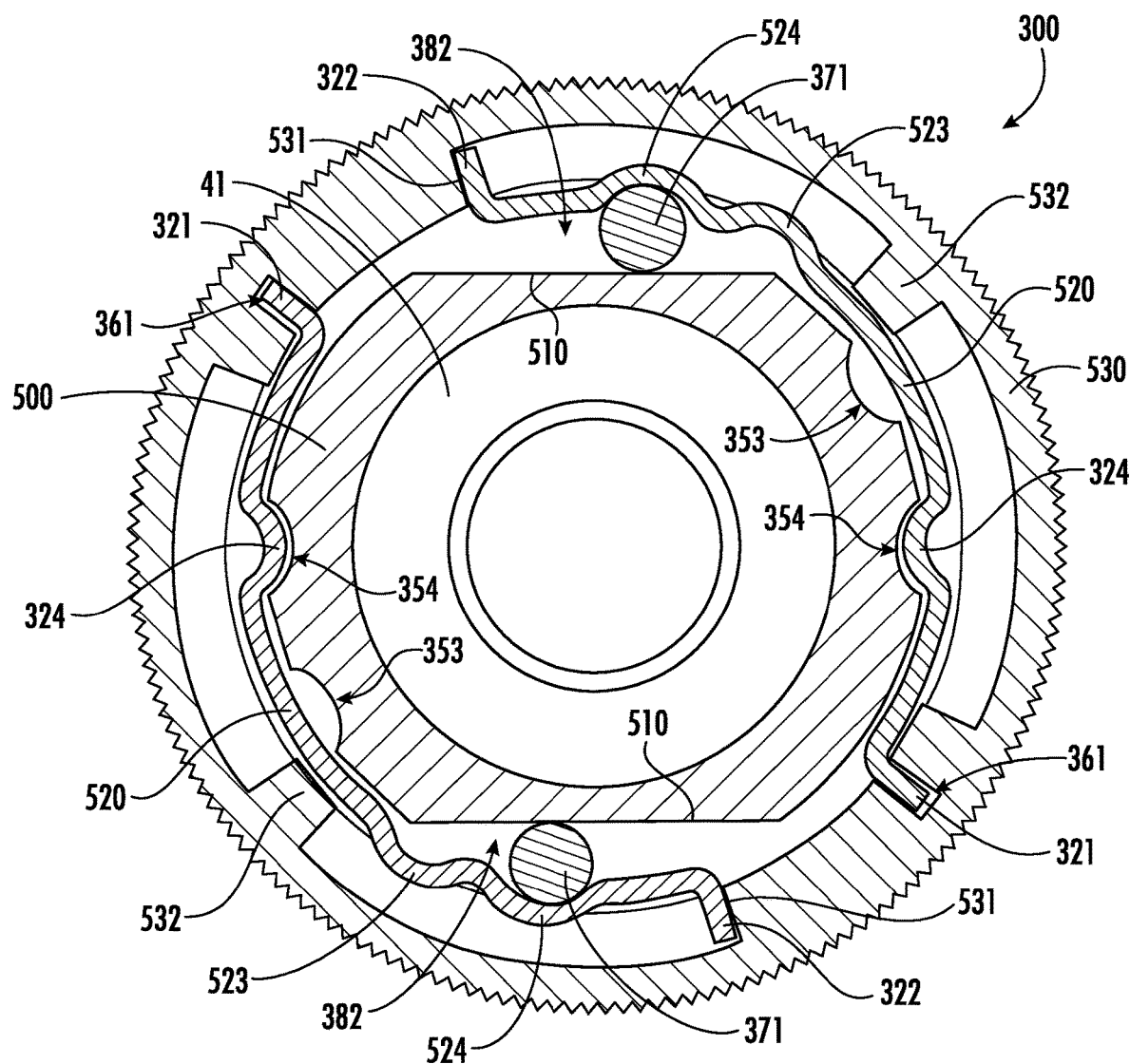

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates a front view of the chuck defining a cross-section A-A in accordance with an example embodiment;

FIG. 3 illustrates cross-section side view of an embodiment of the chuck of FIGS. 1 and 2 taken at the plane defined by A-A of FIG. 2 and defining cross-sections B-B, C-C, and D-D in accordance with an example embodiment;

FIG. 4 illustrates an exploded view of the chuck in accordance with an example embodiment;

FIGS. 5A and 5B illustrate forward and rearward perspective views of a ball retainer in accordance with an example embodiment;

FIG. 6 illustrates a perspective side view of a coupler ring and a guide ring in accordance with an example embodiment;

FIG. 7 illustrates a perspective rearward view of a lock sleeve in accordance with an example embodiment;

FIG. 8 illustrates a perspective side view of a lock ring, ball bearings, a tooth ring, and a tooth ring coupler in accordance with an example embodiment;

FIG. 9 illustrates a cross-section rear view of the chuck taken at the plane defined by B-B of FIG. 3 in accordance with an example embodiment;

FIG. 10 illustrates a cross-section rear view of the chuck taken at the plane defined by C-C of FIG. 3 in accordance with an example embodiment;

FIG. 11 illustrates a cross-section rear view of the chuck taken at the plane defined by D-D of FIG. 3 in accordance with an example embodiment;

FIG. 12A illustrates a zoomed portion of a cross-section rear view of the chuck taken at the plane defined by C-C of FIG. 3 with the lock sleeve in a locked position in accordance with an example embodiment;

FIG. 12B illustrates a zoomed portion of a cross-section rear view of the chuck taken at the plane defined by D-D of FIG. 3 with the lock sleeve in a locked position in accordance with an example embodiment;

FIG. 13A illustrates a zoomed portion of a cross-section rear view of the chuck taken at the plane defined by C-C of FIG. 3 with the lock sleeve in an unlocked position in accordance with an example embodiment;

FIG. 13B illustrates a zoomed portion of a cross-section rear view of the chuck taken at the plane defined by D-D of FIG. 3 with the lock sleeve in an unlocked position in accordance with an example embodiment;

FIG. 14 illustrates cross-section side view of an embodiment of the chuck of FIGS. 1 and 2 taken at the plane defined by A-A of FIG. 2 having an alternative bearing and locking assembly in accordance with an example embodiment;

FIG. 15 illustrates cross-section side view of an embodiment of the chuck of FIGS. 1 and 2 taken at the plane defined by A-A of FIG. 2 and defining cross-sections E-E and F-F in accordance with an example embodiment;

FIG. 16 illustrates an exploded view of a locking assembly in accordance with an example embodiment;

FIGS. 17A and 17B illustrate forward and rearward perspective views of a ball retainer in accordance with an example embodiment;

FIG. 18 illustrates a perspective view of a lock disk in accordance with an example embodiment;

FIG. 19A illustrates a cross-section rear view of a chuck taken at the plane defined by F-F of FIG. 15, with the chuck in an unlocked state in accordance with an example embodiment;

FIG. 19B illustrates a cross-section rear view of a chuck taken at the plane defined by E-E of FIG. 15, with the chuck in an unlocked state in accordance with an example embodiment;

FIG. 19C illustrates a cross-section rear view of a chuck taken at the plane defined by F-F of FIG. 15, with the chuck in a locked state in accordance with an example embodiment;

FIG. 19D illustrates a cross-section rear view of a chuck taken at the plane defined by E-E of FIG. 15, with the chuck in a locked state in accordance with an example embodiment;

FIG. 20A illustrates a cross-section rear view of a chuck taken at the plane defined by F-F of FIG. 15, with the chuck in an unlocked state in accordance with an example embodiment;

FIG. 20B illustrates a cross-section rear view of a chuck taken at the plane defined by E-E of FIG. 15, with the chuck in an unlocked state in accordance with an example embodiment;

FIG. 20C illustrates a cross-section rear view of a chuck taken at the plane defined by F-F of FIG. 15, with the chuck in a locked state in accordance with an example embodiment;

FIG. 20D illustrates a cross-section rear view of a chuck taken at the plane defined by E-E of FIG. 15, with the chuck in a locked state in accordance with an example embodiment;

FIG. 21A illustrates a cross-section rear view of a chuck taken at the plane defined by F-F of FIG. 15, with the chuck in an unlocked state in accordance with an example embodiment;

FIG. 21B illustrates a cross-section rear view of a chuck taken at the plane defined by E-E of FIG. 15, with the chuck in an unlocked state in accordance with an example embodiment;

FIG. 21C illustrates a cross-section rear view of a chuck taken at the plane defined by F-F of FIG. 15, with the chuck in a locked state in accordance with an example embodiment; and FIG. 21D illustrates a cross-section rear view of a chuck taken at the plane defined by E-E of FIG. 15, with the chuck in a locked state in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, chuck loosening can be caused by high potential energy in the form of inertia stored in, for example, a sleeve of a chuck. This inertia may be generated by the rotation of a power driver when performing working operations (e.g., drilling a hole, tightening a fastener, or the like), which also rotates the sleeve. Particularly in instances where the sleeve is formed of a heavy material, such as a metal (e.g., steel), the inertia of the sleeve can be substantial. Also, the sudden stops of the power driver can result in the inertia being converted into high forces applied by the sleeve onto other components of the chuck. In this regard, since the sleeve is typically coupled to a threaded nut that engages with jaws or the body of the chuck, the force applied by the sleeve can be transferred to the nut, which can cause unintended loosening (or in some instances tightening, depending on the direction of rotation) of the nut and therefore the jaws. As mentioned above, unintended loosening can result in unintended release of the working bit and the working bit may fall from the power driver.

To overcome these challenges, various example embodiments of a chuck are provided that permit a user to lock the sleeve into a fixed position during operation to prevent the inertia of the sleeve from being transferred to the nut. According to some example embodiments, a lock pawl, operably coupled to the nut, may be engaged with a ratchet tooth to hold the nut in a fixed position relative to a body of the chuck when the inertial forces generated by rotation of the chuck would otherwise tend to cause the nut to loosen. Further, the sleeve may be operably coupled to the lock pawl to also hold the sleeve in a fixed position relative to the body of the chuck. As such, when, for example, the spindle of a power driver is stopped, the inertia of the sleeve is not transferred only to the nut because the sleeve and the nut are, for example, in a locked engagement with the body and the spindle via the lock pawl and the ratchet tooth.

However, in order to operate the chuck to permit opening and closing of the jaws for insertion and removal of a working bit, example embodiments include a control or lock sleeve that permits a user to transition the chuck between a locked mode (i.e., loosening is not permitted, but tightening may be permitted) and an unlocked mode (i.e., loosening and tightening are permitted). The lock sleeve may include internal features that operate to control engagement of the lock pawl with ratchet teeth of a tooth ring that is rotationally coupled to the body. In an alternative embodiment, the lock pawl may be rotationally coupled to the body and the ratchet teeth of the tooth ring may be rotationally coupled to the nut. In either case, the lock sleeve may be rotated into a first position (e.g., a locked position) that permits the lock pawl to be engaged with the plurality of ratchet teeth, which are angled to permit ratcheting rotation in the tightening direction and inhibit rotation in the loosening direction. The lock sleeve may also be rotated into a second position (e.g., an unlocked position) that permits free rotational movement in both the tightening and loosening rotational directions.

As such, according to some example embodiments, a mechanism may be incorporated into the chuck to integrate a locking feature that operates to lock the sleeve to prevent untended loosening while the chuck is in a working mode (e.g., drilling a hope, driving a fastener, or the like). However, the mechanism, as further described herein, also permits the sleeve to transition into an unlocked mode to permit rotational movement of the nut and the sleeve relative to the body a tightening direction or loosening direction.

In this regard, FIGS. 1 and 2 show an example chuck 1 according to some example embodiments. FIG. 1 is a perspective side view of the chuck 1 and FIG. 2 is a front view of the chuck 1. Generally, the chuck 1 may operate to secure a working bit (not shown) in the jaws 20 of the chuck 1 while the chuck 1, and a power driver affixed to the chuck 1, are working. The chuck 1 may also operate to permit working bits of varying sizes (e.g., diameters) to be installed and removed by moving the jaws 20 in an opening or closing direction. Further, the chuck 1 may be operably coupled with any type of power driver, including, for example, a pneumatic or electric powered tool (e.g., a drill) configured to rotate a drive spindle that is operably coupled to the chuck 1 in an opening on a rear side of the chuck 1.

The chuck 1 may define a center axis 11, about which the chuck 1 may rotate when in operation, due to rotation of the drive spindle of an attached power driver. For orientation purposes, the chuck 1 may have a forward end 13 and a rearward end 14. The chuck 1 may comprise, among other components, jaws 20, a forward sleeve 30, a lock sleeve 31, a rear sleeve 32, and a nose 21. According to some example embodiments, the forward sleeve 30 may be disposed adjacent to the forward end 13, the rear sleeve 32 may be disposed adjacent to the rearward end 14, and the lock sleeve 31 may be disposed between the forward sleeve 30 and the rear sleeve 32. As further described herein, the jaws 20 may be configured to move or translate within passageways in the nose 21 in a closing or opening direction to change the size of a jaw opening formed by the forward ends of the jaws 20.

The forward sleeve 30 may operate as a user interface for opening and closing the jaws 20. According to some example embodiments, the forward sleeve 30 may be rotationally coupled to the nose 21. In this regard, according to some example embodiments, the forward sleeve 30 may also be operably coupled to the nut 40, for example via the nose 21, such that rotation of the forward sleeve 30 also rotates the nut 40 to move the jaws 20. As such, rotation of the forward sleeve 30 may cause the nut 40 to move the jaws 20 such that the jaws 20 clamp onto a working bit or open to permit removal or installation of a working bit.

According to some example embodiments, rotation of the forward sleeve 30 in the direction 12 may cause the jaws 20, via rotation of a nut, to translate in an opening (loosening) direction to expand the jaw opening to receive a working bit. Further, rotation of the forward sleeve 30 in a direction opposite to direction 12 may cause the jaws 20, via rotation of the nut in an opposite direction, to translate in a closing (tightening) direction to reduce the jaw opening and clamp onto a working bit. According to some example embodiments, the rear sleeve 32, of chuck 1, may be fixed to the body 41 such that the rear sleeve 32 and the body 41 rotate together, and the rear sleeve 32 may operate as a dust cover to prevent debris from entering the internal component cavity of the chuck 1. The rear sleeve 32 may be secured to the body 41 via a snap ring 44 (FIG. 4).

Referring now to FIG. 3, an example embodiment of the chuck 1 is shown as chuck 10. To better understand the components and operation of the chuck 10, FIG. 3 provides a cross-section side view taken at the plane defined by A-A in FIG. 2. Additionally, FIG. 4 provides an exploded view of the various components of the chuck 10.

Referring to the order shown in FIG. 4, the chuck 10 may include the forward sleeve 30, jaws 20, a nose 21, a nut 40, a body 41, a ball retainer 50, balls 55, lock sleeve 31, coupler ring 51, guide ring 52, lock ring 70, ball bearings 73, tooth ring 72, tooth ring coupler 74, rear sleeve 32, and snap ring 44.

According to some example embodiments, the body 41, the nose 21, and the nut 40 may be components of the chuck 10 that may be operably coupled to the drive spindle of a power driver via a spindle cavity 43. The body 41 may operate to transfer rotation of the drive spindle, directly or indirectly, to the jaws 20 to drive the working bit held within the jaws 20. According to some example embodiments, the jaws 20 may be moveable relative to the body 41 via threading on the jaws 20 interfacing directly with a nut and the body may include passageways through which the jaws 20 pass as the jaws 20 are opened or closed. However, in the example embodiment of chuck 10, the jaws 20 interface with a jaw plate 140 of the nut 40 and the jaws 20 pass through jaw passageways 121 in the nose 21. The nose 21 may be affixed to the forward sleeve 30 such that the nose 21 and the forward sleeve 30 rotate together. The jaws 20 may be rotationally and translationally coupled via complementary engagement features of the jaws 20 and a jaw plate 140 of the nut 40. Since the jaws 20 may be rotationally constrained within the jaw passageways 121 in the nose 21, the jaws 20, and therefore the nut 40, may rotate with the nose 21 and the forward sleeve 30 relative to the body 41. However, the nut 40 may also translate relative to the nose 21 within a central opening of the nose 21. The chuck 10 may also comprise a threaded engagement 42 between the nut 40 and the body 41 such that, when the nut 40 rotates relative to the body 41, the nut 40 also translates in a direction parallel to the axis 11 within the nose 21 and the body 41. In this regard, when the nut 40 rotates relative to the body 41 in the closing or tightening direction, the nut 40 translates in a forward direction (i.e., toward the forward end 13 of the chuck 10) and, when the nut 40 rotates relative to the body 41 in the opening or loosening direction, the nut 40 translates in a rearward direction (i.e., toward the rearward end 14 of the chuck 10). As such, when the nut 40 translates forward, the jaws 20 may close and when the nut 40 translates rearward the jaws 20 may open due to angled engagement of complementary sliding features between the jaws 20 and the nose 21 and translational engagement between the jaws 20 and the jaw plate 121 of the nut 40.

The chuck 10 may also include a bearing and locking assembly 170 that, dependent upon the mode of operation, may provide for smooth, low friction rotation of the nut 40 relative to the body 41 via a bearing engagement and/or may provide for locking the nut 40 into a fixed rotational coupling with the body 41, in at least one direction, via a locking engagement. The bearing and locking assembly 170 may comprise the ball retainer 50, the lock sleeve 31, the coupler ring 51, the guide ring 52, the lock ring 70, the ball bearings 73, the tooth ring 72, and the tooth ring coupler 74. A first portion of the bearing and locking assembly 170 may be configured to rotate with the forward sleeve 30 and a second portion of the bearing and locking assembly 170 may be configured to rotate with the body 41. According to some example embodiments, these components may operate as a subsystem of the chuck 10 to perform the low friction relative rotation and locking functionalities described above and otherwise herein.

In this regard, the ball retainer 50, the coupler ring 51, the guide ring 52, and the lock ring 70 may be rotationally coupled with the forward sleeve 30. In this regard, the ball retainer 50, for example, may be affixed to the forward sleeve 30 and the ball retainer 50 may be operably coupled to the coupler ring 51, the guide ring 52 and the lock ring 70 as further described below. Balls 55 may be disposed between the stop lip 141 of the body 41 and an internal ledge 152 (FIG. 5A) to reduce friction in the rotation of the ball retainer 50 with the body 41. Similarly, the tooth ring 72 and the tooth ring coupler 74 may be rotationally coupled to the body 41. In this regard, the tooth ring coupler 74 may be rotationally engaged between the tooth ring 72 and the body 41 to cause the tooth ring 72 to rotate with the body 41.

Referring now to FIGS. 5A and 5B, an example embodiment of the ball retainer 50 is shown. More specifically, FIG. 5A shows a forward perspective view of the ball retainer 50, and FIG. 5B shows a rearward perspective view of the ball retainer 50. In this regard, the ball retainer 50 may include an internal opening within which the body 41 may be disposed. A forward portion of the ball retainer 50 may be affixed to the forward sleeve 30 or may be affixed to the nose 21 (which may be affixed to the forward sleeve 30). In either case, the ball retainer 50 may be rotationally coupled to the forward sleeve 30 either directly or indirectly. The ball retainer 50 may include an internal ledge 152 that retains the balls 55 for engagement with the stop lip 141 of the body 41 to prevent the ball retainer 50 from sliding forward and permit the ball retainer 50 to rotate relative to the body 41 in a low friction manner due to the coupling via the ball 55. The engagement between the stop lip 141, balls 55, and the internal ledge 152 forms a forward engagement point for the components that are coupled onto the body 41 rearward of the ball retainer 50. Similarly, the snap ring 44 may engage with a recess 143 on the body 41, which may form a rearward engagement point for the components that are coupled onto the body 41 forward of the snap ring 44 and rearward of the ball retainer 50. The ball retainer 50 may include cutouts 151 on a rear facing side of the ball retainer 50.

Now referring to FIG. 6, the coupler ring 51 and the guide ring 52 are shown, according to some example embodiments. The coupler ring 51 comprises protrusions 153 which are complementary to, and fit within, the cutouts 151 of the ball retainer 50. Via this engagement between the protrusions 153 and the cutouts 151, the coupler ring 51 may rotate with the ball retainer 50, and may therefore be rotationally coupled to the forward sleeve 30 and the nut 40. The protrusions 153 may, according to some example embodiments, be disposed on a coupler ring drive dog 163. In this regard, the coupler ring 51 may comprise a plurality of coupler ring drive dogs 163 that extend from a ring portion 161 of the coupler ring 51 in a forward direction as protrusions from the ring portion 161. The coupler ring drive dogs 163 may be disposed a distance apart around a circumference of the coupler ring 51 to form voids between the coupler ring drive dogs 163. These voids may be referred to as coupler ring drive dog voids 154, which are configured receive a lock sleeve drive dog 131 (FIG. 7) as further described below. The coupler ring drive dogs 163 may comprise drive surfaces 156 and 157 on the sides of the coupler ring drive dogs 163, and the drive surfaces 156 and 157 may form the boundaries of the coupler ring drive dog voids 154.

Additionally, the coupler ring 51 may comprise one or more coupler ring slots 155. According to some example embodiments, the coupler ring drive dogs 163 may each include a respective coupler ring slot 155. The coupler ring slots 155 may be configured to receive a lock ring drive tab 171 of the lock ring 70 (FIG. 8) as further described below. Via the engagement between the coupler ring slots 155 and the lock ring drive tab 171, the coupler ring 51 may be rotationally coupled to the lock ring 70.

According to some example embodiments, the guide ring 52 may be included to improve locking performance. However, in other example embodiments, the guide ring may be omitted and locking functionality may be maintained. The guide ring 52 may be configured to slide or otherwise couple onto a rearward portion of the coupler ring 51, for example, the ring portion 161. As such, an interior surface 162 of the guide ring 52 may interface with an exterior surface of the ring portion 161. The guide ring may be rotationally coupled to the coupler ring 51 or the guide ring 52 may be free to rotate relative to the coupler ring 51. The guide ring 52 may include a number of protruding features that operate to interface with features of the lock ring 70. In this regard, the guide ring 52 may include features that interface with features of the lock ring 70 on an interior (i.e., closer to the axis 11) side of the features of the lock ring 70. In this regard, the guide ring 52 may comprise a lock pawl control nub 158, lock latch control nub 159, and a lock pawl ramp 160. The lock pawl control nub 158 may, according to some example embodiments, limit an inward (i.e., towards the axis 11) deflection distance for the lock pawl control member 173 and thus limit fatigue (e.g., metal fatigue) on the lock pawl control member 173 and the lock pawl arm 180 of the lock ring 70 (FIG. 8). The lock latch control nub 159 may, according to some example embodiments, limit an inward (i.e., towards the axis 11) deflection distance for the lock latch control member 172 and thus limit fatigue (e.g., metal fatigue) on the lock latch control member 172 and the lock latch arm 181 of the lock ring 70 (FIG. 8). Finally, the lock pawl ramp 160 may, according to some example embodiments, limit an inward (i.e., towards the axis 11) deflection distance for the lock pawl 174 and thus limit fatigue (e.g., metal fatigue) on the lock pawl 174 and also the lock pawl arm 180 of the lock ring 70 (FIG. 8)

Referring now to FIG. 7, the lock sleeve 31 sleeve is shown in a perspective forward view revealing internal control features of the lock sleeve 31. In this regard, the lock sleeve 31 may be generally cylindrical in shape with an internal bore forming an opening and an internal surface. The internal surface may include a number of control features that interface with components of the coupler ring 51 and the lock ring 70 to control the chuck 10 to be in the locked state when the lock sleeve 31 is rotated into a locked position and an unlocked state when the lock sleeve 31 is rotated into an unlocked position.

In this regard, the lock sleeve 31 may comprise a plurality of lock sleeve drive dogs 131. The lock sleeve drive dogs 131 may be arc-shaped protrusions extending inwardly and spaced around an interior circumference of the lock sleeve 31. The lock sleeve drive dogs 131 may be positioned to align with the coupler ring drive dog voids 154. The lock sleeve drive dogs 131 may comprise drive surfaces 136 and 137 on opposite sides of the lock sleeve drive dogs 131 configured for engagement with the drive surfaces that may be configured to engage with the drive surfaces 156 and 157 of the coupler ring drive dogs 163.

Rearward of the lock sleeve drive dogs 131, the lock sleeve 31 may also include a plurality of lock ring engaging features disposed on the inner surface of the lock sleeve 31. In this regard, the lock sleeve 31 may include an unlock ledge 138, a latch ledge 132, and a latch void wall 133. The unlock ledge 138, the latch ledge 132, and the latch void wall 133 may be protrusions that extend from an inner surface of the lock sleeve 31 towards the axis 11 and may be aligned along a common circumferential line of the inner surface of the lock sleeve 31. The unlock ledge 138 may be configured to engage with a lock pawl control member 173 when the lock sleeve 31 is in an unlocked position to thereby move the lock pawl control member 173 inward and cause the lock pawl 174 to move out of engagement with the ratchet teeth 176 of the tooth ring 72 (FIG. 8). In this regard, since the lock pawl control member 173 may slide up an onto the unlock ledge 138, the unlock ledge 138 may comprise a ramped portion 139 that leads to a plateau portion of the unlock ledge 138. According to some example embodiments, a dimple 144 may be disposed on the plateau portion that may receive the lock pawl control member 173 when the lock sleeve 31 is in the unlocked position and the lock pawl 174 is disengaged from the ratchet teeth 176 of the tooth ring 72. According to some example embodiments, the lock pawl control member 173 may be positioned on the plateau portion when the lock sleeve 31 is in the unlocked position.

The lock sleeve 31 may also include a lock void 135 adjacent to the unlock ledge 138. According to some example embodiments, the lock void 135 may be disposed between the unlock ledge 138 and the latch ledge 132. The lock void 135 may be recessed relative to the unlock ledge 138. When the lock sleeve 31 is rotated into the locked position, lock pawl control member 173 may be disposed in the lock void 135, which permits the lock pawl 174 to be engaged with the ratchet teeth 176 of the tooth ring 72 as further described below.

The latch ledge 132 and the latch void wall 133 may configured to interface with the lock latch control member 172 of the lock ring 70. In this regard, the latch ledge 132 and the latch void wall 133 may form a void space there between that is the latch void 134. The lock latch control member 172 may be disposed in the latch void 134, which is recessed relative to the latch ledge 132, when the lock sleeve 31 is in the locked position. The latch ledge 132 may include a ramped portion adjacent to the latch void 134 and a ramped portion adjacent to the lock void 135. According to some example embodiments, the ramped portion adjacent to the latch void 134 may operate to create a mechanical resistance with the lock latch control member 172 that is, for example, necessary to overcome to rotate the lock sleeve 31 out of the locked position to the unlocked position. According to some example embodiments, the lock latch control member 172 may be disposed in the lock void 135 when the lock sleeve 31 is in the unlocked position. In this regard, the ramped portion of the latch ledge 132 adjacent to the lock void 135 may operate to create a mechanical resistance with the lock latch control member 172 that, for example, is necessary to overcome when rotating the lock sleeve 31 from the unlocked position into the locked position.

Now referring to FIG. 8, details of the lock ring 70, the ball bearings 73, the tooth ring 72, and the tooth ring coupler 74 are shown, according to some example embodiments. In this regard, the lock ring 70, according to some example embodiments, comprises a ring portion 175. A plurality of lock ring drive tabs 171 may extend in the forward direction from the ring portion 175. In this regard, as described above, the lock ring drive tabs 171 may be configured to engage with the coupler ring slots 155. According to some example embodiments, the lock ring 70 may also include a lock arm 180. The lock arm 180 may have a lock pawl 174 disposed at an end of the lock arm 180 and a lock pawl control member 173 disposed at the end of the lock arm 180. The lock arm 180 may be mechanically biased (e.g., spring biased) to be urged outward (i.e., away from the axis 11), and therefore the lock pawl control member 173 and lock pawl 174 may also be biased in an outward direction. The lock arm 180 may be affixed to the ring portion 175, or the lock arm 180 may extend from a side of a lock ring drive tab 171. The lock pawl control member 173 may be operably coupled to the lock pawl 174 such that movement of the lock pawl control member 173 causes the same movement to the lock pawl 174. The lock pawl control member 173 may have a curved or arcuate shape to facilitate sliding engagement with the unlock ledge 138, the ramped position 139, or the lock void 135. The lock pawl 174 may be an extended tab (e.g., metal tab) that is specifically angled for engagement with a locking face of the ratchet teeth 176 of the tooth ring 72. The biasing of the lock arm 180 may, according to some example embodiments, operate to facilitate the ratcheting engagement between the lock pawl 174 and the ratchet teeth 176.

Similarly, according to some example embodiments, the lock ring 70 may also include a latch arm 181. The latch arm 181 may have lock latch control member 172 disposed at the end of the latch arm 181. The latch arm 181 may also be mechanically biased to be urged outward (i.e., away from the axis 11), and therefore the lock latch control member 172 may also be biased in an outward direction. The latch arm 181 may be affixed to the ring portion 175, or the latch arm 181 may extend from a side of a lock ring drive tab 171. The lock latch control member 172 may have a curved or arcuate shape to facilitate sliding engagement with the latch void 134, the latch ledge 132, and the lock void 135. According to some example embodiments, the lock latch control member 172 may operate to create a mechanical resistance, in cooperation with the latch void 134, the latch ledge 132, and the lock void 135, to maintain the lock sleeve 31 in the locked position or the unlocked position.

The ball bearings 73 may be a plurality of balls that engage between the lock ring 70 and the tooth ring 72. As mentioned above, the lock ring 70 may be operably coupled to the nut 40 and the tooth ring 72 may be operably coupled to the body 41. As such, when the nut 40 is moved relative to the body 41, the ball bearings 73 may operate to reduce the frictional forces between the nut 40 and the body 41. In this regard, the lock ring 70 may comprise an arcuate rearwards side of the ring portion 175 to receive a forward portion of the ball bearings 73. Similarly, the tooth ring 72 may comprise an arcuate surface 182 on a forward side of a tooth ring ledge 183 for receiving a rearward portion of the ball bearings 73.

The tooth ring 72 may be comprise the tooth ring ledge 183 and a tooth ring side wall 184. The tooth ring ledge 183 may be a generally ring-shaped member that comprises engaging features for engagement with the tooth ring coupler 74 and the arcuate surface 182 for engagement with the ball bearings 73. The tooth ring side wall 184 may extend in a forward direction from the tooth ring ledge 183. An inner dimeter of the tooth ring side wall 184 may be larger than the diameter of the ring portion 175 of the lock ring 70 to permit the lock ring 70 to be inserted within the tooth ring side wall 184. The lock ring 70 may be inserted into the tooth ring 72 to a depth where the lock pawl 174 may engage with the inner surface of the tooth ring side wall 184, but the lock pawl control member 173 and lock latch control member 172 may be positioned forward of a forward rim of the tooth ring side wall 184 to permit the lock pawl control member 173 and the lock latch control member 172 to engage with the lock sleeve 31.

The inner surface of the tooth ring side wall 184 may comprise a plurality of ratchet teeth 176 disposed around a circumference of the tooth ring side wall 184. Each ratchet tooth 176, according to some example embodiments, may extend internally (i.e., toward the axis 11) and may comprise two angled surfaces that meet at a maximum, internally extending point. The two angled surfaces may comprise a ratcheting surface and a locking surface. The ratcheting surface may have a lesser slope (magnitude) than the locking surface. As mentioned above, the lock pawl 174 may be configured to engage with the ratchet teeth 176. When the lock sleeve 31 is in the locked position, the lock pawl 174 may be positioned to ride up and slide across the ratcheting surfaces of the ratchet teeth 176 in a ratcheting fashion when the forward sleeve 30 is rotated in the tightening direction. However, with the lock sleeve 31 in the locked position, the lock pawl 174 may engage with the locking surfaces in a manner that the engagement prevents movement lock pawl 174 in a direction towards the locking surfaces (i.e., in a nut loosening direction).

As mentioned above, the tooth ring 72 may be rotationally coupled to the body 41 via the tooth ring coupler 74. In this regard, the tooth ring 72 may include protrusions 177 that may engage with complementary grooves 178 in the tooth ring coupler 74. Via the engagement between the protrusions 177 and the grooves 178, the tooth ring 72 may be rotationally coupled to the tooth ring coupler 74 such that the tooth ring 72 and the tooth ring coupler 74 rotate together. Additionally, the tooth ring coupler 74 may comprise body engaging surfaces 179. In this regard, the tooth ring coupler 74 may comprise a central opening through which the body 41 may pass. As shown in FIG. 4, the body 41 may have a substantially cylindrical rearward portion. However, the rearward portion of the body 41 may also comprise flattened regions 142. These flattened regions 142 of the body 41 may be complementary to the linear body engaging surfaces 179 of the tooth ring coupler 74. Due to the engagement between the body engaging surfaces 179 and the flattened regions 142, the tooth ring coupler 74, and thus the tooth ring 72, may be rotationally coupled such that when the body 41 rotates, the tooth ring coupler 74 and the tooth ring 72 also rotate.

Having described the various structural features of the chuck 10, according to some example embodiments, FIGS. 9-13B will now be described, which illustrate the operation of the chuck 10. FIGS. 9-11 show rearward viewed cross-sections of the chuck 10 with the lock sleeve 31 in the locked position, and FIGS. 12A and 12B show zoomed views of the engagement between the lock ring 70, the lock sleeve 31, and the tooth ring 72 in the locked position. FIGS. 13A and 13B show zoomed views of the engagement between the lock ring 70, the lock sleeve 31, and the tooth ring 72 in the unlocked position.

In this regard, reference is now made to FIG. 9, which is a cross-section of the chuck 10 taken at B-B in FIG. 3. As can be seen in FIG. 9, the lock sleeve drive dogs 131 are disposed within the coupler ring drive dog voids 154 between the coupler ring drive dogs 163. The coupler ring drive dogs 163 are shown with the lock ring drive tabs 171 being engaged in the coupler ring slots 155. Also, the coupler ring drive dog voids 154 have a larger arcuate length than a length of the lock sleeve drive dogs 131 and therefore the lock sleeve drive dogs 131 may move some distance within the coupler ring drive dog voids 154 without rotating the coupler ring drive dogs 163. With the lock sleeve 31 in the locked position, the lock sleeve drive dogs 131 have been rotated such that the drive surfaces 137 of the lock sleeve drive dogs 131 abut the drive surfaces 157 of coupler ring drive dogs 163. According to some example embodiments, due to friction within the chuck 10, the user may hold the forward sleeve 30 stationary while the lock sleeve 31 is rotated to cause relative rotation between the forward sleeve 30 and the lock sleeve 31 to move the lock sleeve 31 into the locked position. As such, the engagement between the lock sleeve drive dogs 131 and the coupler ring drive dogs 163 may act as a stop since relative rotation between the forward sleeve 30 and the lock sleeve 31 cannot continue due to this engagement, thereby informing the user that the lock sleeve 31 is in the locked position and the chuck 10 is in the locked mode. To move the lock sleeve 31 to the unlocked position, where the drive surfaces 136 of the lock sleeve drive dogs 131 abut the drive surfaces 156 of the coupler ring drive dogs 163, the user may again hold the forward sleeve 30 stationary and rotate the lock sleeve 31 such that lock sleeve drive dogs 131 move within the coupler ring drive dog voids 154 to engage the drive surfaces 136 with the drive surfaces 156. Again the user would be prevented from performing further rotation of the lock sleeve 31 due to the engagement of the drive surfaces 136 with the drive surfaces 156 thereby informing the user that the lock sleeve 31 is in the unlocked position.

Now referring to FIG. 10, a cross-section of the chuck 10 taken at C-C in FIG. 3 is shown. Additionally, with reference to FIG. 12A, a zoomed view of the engagement between the control members of the lock ring 70 and the engagement features of the lock sleeve 31 are shown with the lock sleeve 31 in the locked position. With the lock sleeve 31 in the locked position, the lock pawl control member 173 is disposed in the lock void 135 and therefore the mechanical bias in the lock arm 180 is not inhibited from being urged by the mechanical bias outwards (i.e., away from the axis 11). With the lock sleeve 31 in the locked position, the lock latch control member 172 is disposed within the latch void 134 and the mechanical bias on the latch arm 181 urges the lock latch control member 172 outward and into the latch void 134. As such, the lock latch control member 172 may be operating to maintain the lock sleeve 31 in the locked position unless a threshold rotational force is applied to lock sleeve 31 to permit the lock latch control member 172 to slide up the ramp surface of the latch ledge 132 and onto the plateau portion of the latch ledge 132.

Now referring to FIG. 11, a cross-section of the chuck 10 taken at D-D in FIG. 3 is shown. Additionally, with reference to FIG. 12B, a zoomed view of the engagement between the lock pawl 174 and the ratchet teeth 176 of the tooth ring 72 is shown with the lock sleeve 31 in the locked position. In this regard, because lock pawl control member 173 is disposed in the lock void 135 and the mechanical bias in the lock arm 180 is permitted to urge the lock pawl 174 outward, the lock pawl 174 is engaged with a ratchet tooth 176 of the tooth ring 72. As can be seen, the slope of the ratcheting surfaces of the ratchet teeth 176 would permit the lock pawl 174 to rotate in a tightening direction (counterclockwise in FIG. 11). In this regard, the user may rotate the forward sleeve 30 to further tighten the nut 40 and the lock pawl 174 will ratchet across the ratcheting surfaces of the ratchet teeth 176. However, rotation of the forward sleeve 30 would not be permitted in the loosening direction (attempting to move the lock pawl 174 clockwise in FIG. 11) due to the larger magnitude slope of the locking surfaces causing the lock pawl 174 to catch and be prevented from rotation relative to the tooth ring 72 and the body 41.

Now with reference to FIGS. 13A and 13B, zoomed views of the cross-sections C-C and D-D of FIG. 3 are shown with the chuck 10 in the unlocked position. In this regard, the user has held the forward sleeve 30 stationary and rotated the lock sleeve 31 in a clockwise direction from the position shown in FIGS. 9-12B. Sufficient force was applied to overcome the mechanical resistance of the ramp portion of the latch ledge 132, and the lock sleeve 31 has rotated the lock latch control member 172 over the latch ledge 132 and into the lock void 135. In this position, movement of the lock sleeve 31 back into the locked position would require forcing the lock latch control member 172 up the ramp portion of the latch ledge 132, which operates as a mechanical resistance to maintain the lock sleeve 31 in the unlocked position. This rotational movement in the unlocked position has also caused the lock pawl control member 173 to ascend the ramp portion 139 of the unlock ledge 138 and move onto the plateau portion of the unlock ledge 138 and into the dimple 144. As such, the lock pawl control member 173 has been deflected inward by the height of the unlock ledge 138, against the mechanical bias in the lock arm 180.

Referring now to FIG. 13B, the deflection of the lock pawl control member 173 due to engagement with the unlock ledge 138 has also caused the lock pawl 174 to be deflected inward. Accordingly, the distance of the deflection (i.e., the height of the unlock ledge 138) is such that the lock pawl 174 is no longer engaged with the ratchet teeth 176 of the tooth ring 72. As such, the lock ring 70 is free to rotate relative to the tooth ring 72 in either a tightening or loosening direction. Accordingly, the forward sleeve 30 and the nut 40 are also free to rotate relative to the body 41 in either the tightening or loosening direction.

Referring now to FIG. 14, an example embodiment of the chuck 1 is shown as chuck 280. FIG. 14 illustrates a cross-section taken at A-A of FIG. 2 of the chuck 1 having an alternative bearing and locking assembly 270. In general, configuration of the bearing and locking assembly 270 exchanges the positions and operable couplings of the lock ring and the tooth ring. In this regard, the ball retainer 250 may be rotationally coupled to the forward sleeve 30 and the tooth ring 272 may be rotationally coupled to the ball retainer 250. The bearing and locking assembly 270 may comprise a lock ring coupler 274 (as opposed to a tooth ring coupler 74 as described above). The lock ring coupler 274 may be rotationally coupled to the body 41, for example, in the same manner as the tooth ring coupler 74 is rotationally coupled to the body 41. The lock ring coupler 274 may also be rotationally coupled to the lock ring 270. As such, the lock ring 270 may include complementary features with the lock ring coupler 274 that engage to cause the lock ring 270 to rotate when the lock ring coupler 274 and the body 41 rotate.

Similar to the lock ring 70 and the tooth ring 72, the lock ring 270 and the tooth ring 272 may be engaged via the ball bearings 73 and the controlled engagement of the lock pawl 274 of the lock ring 270 with the ratchet teeth 276 of the tooth ring 272. Also similar to the above, the lock pawl 274 may be moveably controlled via movement of a lock pawl control member 273 that is operably coupled to the lock pawl 274 due to being, for example, coupled to a common lock arm that is mechanically biased in an outward direction.

Similar to the lock sleeve 31, the lock sleeve 231 may include engagement features on an internal surface of the lock sleeve 231 to move the lock pawl control member 273 a threshold distance inward to bring the lock pawl 274 out of engagement with the ratchet teeth 276 in an unlocked position or outward to cause the lock pawl 274 to be engaged with the ratchet teeth 276 in a locked position for ratcheting in a tightening direction and preventing rotation in a loosening direction. According to some example embodiments, to rotate the lock sleeve 231, a user may hold the rear sleeve 32 stationary and rotate the lock sleeve 31 relative to the rear sleeve 32 to transition the lock sleeve 231 between the locked position and the unlocked position. Additionally, according to some example embodiments where the chuck 10 is coupled to a power driver having a spindle lock, the spindle lock may operate to hold the body 41 (and thus the rear sleeve 32) stationary. As such, the user need not hold the rear sleeve 32 stationary since the spindle lock would be holding the body 41 stationary, and therefore the user may simply rotate the lock sleeve 231, without the necessity of having to also hold the rear sleeve 32 stationary.

According to some example embodiments, an alternative to the locking pawls may be implemented to cause a chuck to operate in a locked state and an unlocked state as described herein. In this regard, an alternative wedge solution may be employed that involves one or more cylindrical or rounded wedge pins that are moved into, and out of, a wedged or jammed position to prevent unintended loosening of the nut and the jaws.

As described above, a lock sleeve may be employed that operates as a user interface to permit a user to transition the chuck between a locked mode (i.e., loosening is not permitted, but tightening may be permitted) and an unlocked mode (i.e., loosening and tightening are permitted). The lock sleeve may include internal features that operate to control a position of a wedge pin to transition between a wedged engagement position (i.e., a wedge pin locked position) disposed between a ball retainer and a lock disk, and a position where the pin is not in the wedged engagement (i.e., a wedge pin unlocked position). As such, when the wedge pin is in the wedge pin locked position, the wedge pin is positioned in a wedged or jammed engagement between the converging surfaces of the ball retainer and the lock disk to prevent further relative rotational movement in a direction of the wedge or jam (e.g., a loosening direction). Therefore, because the lock disk is rotationally coupled to the body and the ball retainer is rotationally coupled to the nut, the wedged engagement of the wedge pin causes the body and the nut to be in rotational engagement through the wedge pin to prevent relative rotation that would cause the jaws to loosen. However, according to some example embodiments, rotation of the nut relative to the body in a tightening direction, when the wedge pin is in the wedged engagement between the lock disk and the ball retainer, may be performed because such rotation urges the wedge pin out of the wedged engagement in a direction of diverging surfaces of the lock disk and the ball retainer to permit relative rotation.

Reference will now be made to FIGS. 15 to 21D, which illustrate various example embodiments of a chuck as described herein implementing a wedged solution. In this regard, referring now to FIG. 15, an example embodiment of the chuck 1 is shown as chuck 300, which operates using a wedge solution. FIG. 16 illustrates a locking assembly 310 of the chuck 300. FIGS. 17A and 17B illustrate views of a ball retainer 350 of the locking assembly 310, and FIG. 18 illustrates and example lock disk 380. Additionally, FIGS. 19A-D illustrate cross-sectional views showing the operation of an example embodiment of the chuck 300, FIGS. 20A-D illustrate cross-sectional views showing the operation of another example embodiment of the chuck 300, and FIGS. 21A-21D illustrate cross-sectional views showing the operation of yet another example embodiment of the chuck 300.

With reference to FIG. 15, some of the components of chuck 300 are the same or similar to chucks 1 or 10 and function in the same or similar manner. In this regard, the chuck 300 may include jaws 20, a nose 21, a forward sleeve 30, a rear sleeve 32, a nut 40 having a jaw plate 140, a body 41, and a snap ring 44. The nut 40 may be coupled to the body 41 via threaded engagement 42.

According to some example embodiments, the chuck 300 may comprise a locking assembly 310. The locking assembly 310 may comprise a ball retainer 311, a lock sleeve 312, a spring and pin assembly 313, and a lock disk 380. The locking assembly 310 may operate to transition the chuck 300 between a locked state and an unlocked state due to rotation of the lock sleeve 312 relative to the forward (or first) sleeve 30. According to some example embodiments, the ball retainer 311 may rotate with the forward sleeve 30. As such, the lock sleeve 312 may be rotatable relative to the ball retainer 311. Both the ball retainer 311 and the lock sleeve 312 may be separately rotatable relative to the body 41 and the lock disk 380, which is coupled to rotate with the body 41. As such, rotation of the lock sleeve 312 relative to the ball retainer 311 may operate to position a wedge pin in wedged engagement between the ball retainer 311 and the lock disk 380 as further described below. Having described an example embodiment of a locking assembly 310, various example embodiments of wedge-based locking assemblies will now be described that operate in a similar manner, however, having components with different structures.

Referring now to FIG. 16, an example embodiment of a locking assembly in the form of locking assembly 314 is shown in association with a body 41, a rear sleeve 32, and a snap ring 44. The body 41 is shown with stop lip 141, flattened regions 142, and snap ring recess 143 as described above. The rear sleeve 32 may include an internal cavity that may receive the lock disk 380, and the rear sleeve 32 may be keyed to engage with the flattened regions 142 of the body 41 to form a rotational coupling between the rear sleeve 32 and the body 41.

The locking assembly 314 may comprise a ball retainer 350, a lock sleeve 360, a spring and pin assembly 370, and the lock disk 380. As a unit, the locking assembly 314 may be secured to the body 41 between the balls 55, which engage with the stop lip 141 of the body, and the snap ring 44, which is engaged with the body 41 at the snap ring recess 143. Also referring to FIGS. 17A and 17B, the ball retainer 350, which may be similar to the ball retainer 50 in some respects, may include an internal ledge 352 that engages with the balls 55 which are disposed between the internal ledge 352 and the stop lip 141. This engagement restricts the ball retainer 350's forward axial movement and provides for a low friction engagement with body 41. The ball retainer 350 may include a forward portion 356 and a lock assembly engaging portion 355 (FIGS. 17A and 17B). The forward portion 356 may be coupled to a nose 21 or forward sleeve 30 to form a rotational coupling with the nose 21 or the forward sleeve 30. The lock assembly engaging portion 355 of the ball retainer 350 may include a plurality of features that facilitate operation of the locking assembly 314. According various example embodiments provided herein, the lock assembly engaging portion may take a number of different forms with respect to different example embodiments of a locking assembly as further described below.

The lock sleeve 360 may be an example lock sleeve that is disposed around the lock assembly engaging portion 355 of the ball retainer 350. The spring and pin assembly 370 may be coupled to an internal surface of the lock sleeve 360. Therefore, rotation of the lock sleeve 360 may also rotate the spring and pin assembly 370 relative to the lock assembly engaging portion 355 to position one or more wedge pins 371 of spring and pin assembly 370 in a desired operational position (i.e., in a wedged engagement or out of a wedged engagement). According to some example embodiments, as best seen in FIG. 16, wedge pins 371 may extend rearward from the lock sleeve 360 and into the lock disk 380.

The spring and pin assembly 370 may comprise at least one pin drive spring 320 and at least one wedge pin 371. It is contemplated that, while the example embodiment of the spring and pin assembly 370 includes two pin drive springs 320 and wedges pins 371, the spring and pin assembly 370 may comprise any number of pin drive springs 320 and associated wedge pins 371 that are configured to perform the functionalities described herein in association with corresponding surfaces of the ball retainer 350. The pin drive spring 320 may be coupled to the interior of the lock sleeve 360 such that the pin drive spring 320 moves with the lock sleeve 360. As further described below, the pin drive spring 320 may include features configured to couple with, and control the position of, the wedge pin 371. The pin drive spring 320 may be formed of a flexible material (e.g., a flexible metal) that may be coupled to the interior of the lock sleeve 360 in a compressed manner between two securing points to generate a spring force or bias directed at least partially toward a center axis of the chuck 300. As such, the lock sleeve 360 may include interior recesses that provide clearance for the pin drive spring 320 to flex. The pin drive spring 320 may tend to urge the wedge pin inward, against the ball retainer 350.

The wedge pin 371 may comprise a cylindrical slug that has a length that extends from a portion that is engaged with the pin drive spring 320 to a portion that is disposed within the lock disk 380. According to some example embodiments, the wedge pin 371 may be formed of metal. The exterior surface of the wedge pin 371 may have a coefficient of friction that permits the wedge pin 371 to be lodged between two converging metal surfaces (e.g., surfaces of the ball retainer 350 and the lock disk 380) and not tend permit the surfaces to slip relative to each other in the converging direction.

Referring to FIG. 18, the lock disk 380 may be rotationally coupled to the body 41 due to the engagement of keyed surfaces 383 of a central opening of the lock disk 380 with the flattened regions 142 of the body 41. The lock disk 380 may also comprise a lock disk wall 381, for example, disposed around a circumference of the outer edge of the lock disk 380. In this regard, the lock disk wall 381 may be raised from a base plate of the lock disk 380 to form an internal cavity 382. The lock disk wall 381 may comprise an interior wall surface 384 that selectively engages with the wedge pin 371. As such, the wedge pin 371 may extend rearward into the internal cavity 382 of the lock disk 380. Similarly, the lock disk 380 may be disposed within an internal cavity of the rear sleeve 32.

Having described the various components of the locking assembly 314, a discussion of the operation of the locking assembly 314 will now be provided with respect to FIGS. 19A to 19D. FIG. 19A is a cross-sectional view of an embodiment of the chuck 300 taken at the plane defined by F-F of FIG. 15, where the chuck 300 is in the unlocked state. FIG. 19B is a cross-sectional view of an embodiment of the chuck 300 taken at the plane defined by E-E of FIG. 15, where the chuck 300 is in the unlocked state.

With reference to FIG. 19A, the rear sleeve 32 is shown with the lock disk 380, and its interior wall surface 384, disposed therein. The body 41 and the ball retainer 350 are also shown. A cross-section of the architecture of the lock assembly engaging portion 355 of the ball retainer 350 can also be seen. In this regard, the lock assembly engaging portion 355 may comprise a pin engaging surface, and the wedge pin 371 may moveable along the pin engaging surface. For the ball retainer 350, the pin engaging surface, according to some example embodiments, may comprise an unlock stop wall 357, an unlock pin recess 352, and a wedge surface 351. According to some example embodiments, the wedge surface 351 may be linear. Additionally, the interior wall surface 384 of the lock disk 380 may be arcuate or circular. According to some example embodiments, the interior wall surface 384 of the lock disk 380 may converge with the wedge surface 351 of the ball retainer 350 to form a wedge space for the wedge pin 371 in one direction and diverge into a space with a width larger than the diameter of the wedge pin 371 in an opposite direction.

In FIG. 19A, the chuck 300 is in the unlocked state. As such, the wedge pin 371 is positioned such that the wedge pin 371 is not in a wedged engagement between the interior wall surface 384 and the wedge surface 351 (i.e., is disengaged). In this regard, according to some example embodiments, the wedge pin 371 may be positioned within the unlock pin recess 352 and against the unlock stop wall 357. The unlock stop wall 357 may be configured to restrict movement of the wedge pin 371 beyond the unlock stop wall 357 and prevent engagement with the lock disk 380 beyond the unlock stop wall 357. Additionally, the unlock pin recess 352 may be a depression on the surface of the ball retainer 350 that has a depth that prevents the wedge pin 371 from contacting the interior wall surface 384 of the lock disk 380 when the wedge pin 371 is positioned within the unlock pin recess 352. In this regard, the distance from the interior wall surface 384 to a bottom of the unlock pin recess 352 may be greater than a diameter of the wedge pin 371. Since the wedge pin 371 is not engaged between the pin engaging surface and the interior wall surface 384 of the lock disk 380, and the wedge pin 371 is in a wedge pin unlocked position, the forward sleeve 30 and the nut 40 are permitted to rotate in both the tightening direction (e.g., first direction) and a loosening direction (e.g., second direction).

Now referring to FIG. 19B, the cross-section of the chuck 300 is shown that includes the lock sleeve 360 and the pin drive spring 320 and the positioning of the same when the lock sleeve 360 is in the unlocked position. While two pin drive springs 320 are shown in FIG. 19B, the following is provided regarding a single pin drive spring, understanding that the description can be applied to any number of pin drive springs and associated components that may be implemented in accordance with some example embodiments. According to some example embodiments, the pin drive spring 320 may be strip of flexible metal that includes strategically placed features for controlling the movement of the wedge pin 371 and maintaining a position of the wedge pin 371, when desired. The pin drive spring 320 may be secured to the interior wall of the lock sleeve 360 under compression that urges a central portion of the pin drive spring 320 towards a center axis of the chuck 300, thereby creating an inward bias. To hold the pin drive spring 320 in place within the lock sleeve 360, the pin drive spring 320 may comprise securing tabs 321 and 322. Each of the securing tabs 321 and 322 may be disposed within respective recesses 361 and 362 within the interior wall of the lock sleeve 360 to hold the pin drive spring 320 in a flexed position.

The pin drive spring 320 may also include a pin engaging feature in the form of a pin drive recess 323. The pin drive recess 323 may be formed in the pin drive spring 320 to have an arcuate shape for receiving and maintaining engagement with the wedge pin 371. In this regard, the pin drive recess 323 may have a curvature that corresponds to the curvature of the external surface of the wedge pin 371. Due to the engagement between the wedge pin 371 and the pin drive recess 323, the wedge pin 371 may be moved by the pin drive recess 323 when the pin drive spring 320 and the lock sleeve 360 rotates. However, when the lock sleeve 360 is in the unlocked position, the pin drive spring 320 may apply an inward bias on the wedge pin 371 to force the wedge pin 371 into engagement with the pin engaging surface and, more specifically, the unlock pin recess 352 and the unlock stop wall 357.

The pin drive spring 320 or, according to some example embodiments another spring or member, may include a lock control feature. The lock control feature may be coupled to the lock sleeve 360 and engage, in a latching fashion, with a lock feature and an unlock feature of the ball retainer 350. According to some example embodiment, the lock control feature may alternatively be coupled to the ball retainer 350 and the lock feature and unlock feature may be disposed on the lock sleeve 360.

According to some example embodiments, the lock control feature may be an arcuate lock protrusion 324 on the pin drive spring 320. This lock control feature may operate to latch the wedge pin 371 into the wedge pin unlocked position, where the wedge pin 371 is disengaged, or into the wedge pin locked position, where the wedge pin 371 is engaged between the ball retainer 350 and the lock disk 380. In this regard, the arcuate lock protrusion 324 may interface with a lock feature or an unlock feature of the ball retainer 350 to latch the lock sleeve 360 and the wedge pin 371 in an unlocked position or a locked position. According to some example embodiments, the lock feature and the unlock feature may be an unlock recess 353 and a lock recess 354.

In FIG. 19B, because the lock sleeve 360 is in the unlocked position, the arcuate lock protrusion 324 is disposed within the unlock recess 353. The compression on the pin drive spring 320 may force the arcuate lock protrusion 324 in an inward direction and into engagement with the unlock recess 353. Due to the engagement between the arcuate lock protrusion 324 and the unlock recess 353, the wedge pin 371 may be held in position, unless sufficient force is applied to the lock sleeve 360 by a user to move the arcuate lock protrusion 324 out of engagement with the unlock recess 353.

FIGS. 19C and 19D will now be described which show the chuck 300 in the locked state. FIG. 19C is a cross-sectional view of an embodiment of the chuck 300 taken at the plane defined by F-F of FIG. 15, where the chuck 300 is in the locked state. FIG. 19D is a cross-sectional view of an embodiment of the chuck 300 taken at the plane defined by E-E of FIG. 15, where the chuck 300 is in the locked state.

FIG. 19C illustrates the positioning of the wedge pin 371 in a wedged engagement due to the lock sleeve 360 being positioned in the locked position. In this regard, the wedge pin 371 has moved out of the disengaged position (FIGS. 19A and 19B) along the pin engaging surface, and more specifically, along the wedge surface 351 into a position where the exterior surface of the wedge pin 371 is in contact with both the interior wall surface 384 of the lock disk 380 and the wedge surface 351 of the ball retainer 350. As such, rotation of the ball retainer 350, and thus the forward sleeve 30 and the nut 40, is prevented in the clockwise (i.e., loosening) direction, but would be permitted in the counterclockwise (i.e., tightening) direction. In this regard, attempted rotation of the ball retainer 350 in the clockwise direction would tend to force the wedge pin 371 into the converging surfaces of the wedge surface 351 and the interior wall surface 384, thereby increasing the wedge force and further securing the wedged engagement. However, attempted rotation of the ball retainer 350 in the counterclockwise direction would tend to force wedge pin 371 away from the converging surface (and toward the diverging surfaces). As further described below, despite the force applied by the pin drive spring 320 to maintain the wedge pin 371 in position, the flexibility of the pin drive spring 320 may permit enough movement of the wedge pin 371 when the forward sleeve 30 is rotated in the tightening direction to deload the wedge force and allow relative movement of the ball retainer 350 in the counterclockwise direction and movement of the wedge pin 371 along the interior wall surface 384 of the lock disk 380.

Now referring to FIG. 19D, the cross-section of the chuck 300 is shown that includes the lock sleeve 360 and the pin drive spring 320. In this regard, relative to the configuration shown in FIG. 19B, the lock sleeve 360 and the pin drive spring 320 have been rotated into the locked position, which caused movement of the wedge pin 371 along the wedge surface 351 and into the wedged engagement shown in FIG. 19C. Further, because the lock sleeve 360 is in the locked position, the arcuate lock protrusion 324 is now engaged with the lock recess 354. The compression on the pin drive spring 320 may force the arcuate lock protrusion 324 in an inward direction and into engagement with the lock recess 354. Due to the engagement between the arcuate lock protrusion 324 and the unlock recess 354, the wedge pin 371 may be held in position, unless sufficient force is applied to the lock sleeve 360 by a user to move the arcuate lock protrusion 324 out of engagement with the lock recess 354.

Having described the various components of the locking assembly 314, a discussion of the construction and operation of an alternative locking assembly will now be provided with respect to FIGS. 20A to 20D. FIG. 20A is a cross-sectional view of an embodiment of the chuck 300 taken at the plane defined by F-F of FIG. 15, where the chuck 300 is in the unlocked state. FIG. 20B is a cross-sectional view of an embodiment of the chuck 300 taken at the plane defined by E-E of FIG. 15, where the chuck 300 is in the unlocked state.

With reference to FIG. 20A, the rear sleeve 32 is shown with the lock disk 380 having its interior wall surface 384 disposed therein. The body 41 and an alternative ball retainer 400 are also shown. A cross-section of the architecture of the lock assembly engaging portion of the ball retainer 400 can also be seen. In this regard, the lock assembly engaging portion may comprise a pin engaging surface, and the wedge pin 371 may moveable along the pin engaging surface. For the ball retainer 400, the pin engaging surface, according to some example embodiments, may comprise an unlock stop wall 410 and a wedge surface 405. According to some example embodiments, the wedge surface 405 may be linear. Additionally, the interior wall surface 384 of the lock disk 380 may be arcuate or circular. According to some example embodiments, the interior wall surface 384 of the lock disk 380 may converge with the wedge surface 351 of the ball retainer 350 to form a wedge space for the wedge pin 371 in one direction and diverge into a space with a width larger than the diameter of the wedge pin 371 in an opposite direction.

In FIG. 20A, the chuck 300 is in the unlocked state. As such, the wedge pin 371 is positioned such that the wedge pin 371 is not in a wedged engagement between the interior wall surface 384 and the wedge surface 351 (i.e., is disengaged). In this regard, according to some example embodiments, the wedge pin 371 may be positioned against the unlock stop wall 410. The unlock stop wall 410 may be configured to restrict movement of the wedge pin 371 beyond the unlock stop wall 410 and prevent engagement with the lock disk 380 beyond the unlock stop wall 410. Additionally, the wedge pin 371 may be positioned on the pin engaging surface where there is a maximum distance between the interior wall surface 384 of the lock disk 380 and the pin engaging surface of the ball retainer 400. The wedge pin 371 may be positioned where the distance between the interior wall surface 384 and the pin engaging surface is larger than the diameter of the wedge pin 371, and therefore the wedge pin 371 does not contact the interior wall surface 384 of the lock disk 380. Since the wedge pin 371 is not engaged between the pin engaging surface (e.g., the wedge surface 351) and the interior wall surface 384 of the lock disk 380, the forward sleeve 30 and the nut 40 are permitted to rotate in both the tightening direction (e.g., first direction) and a loosening direction (e.g., second direction).

Now referring to FIG. 20B, the cross-section of the chuck 300 is shown that includes the lock sleeve 360 and the pin drive spring 420 and the positioning of the same when the lock sleeve 360 is in the unlocked position. While two pin drive springs 420 are shown in FIG. 20B, the following describes a single pin drive spring understanding that the description can be applied to any number of pin drive springs that may be implemented in accordance with some example embodiments. According to some example embodiments, the pin drive spring 420 may be strip of flexible metal that includes strategically placed features for controlling the movement of the wedge pin 371 and maintaining a position of the wedge pin 371, when desired. The pin drive spring 420 may be secured to the interior wall of the lock sleeve 360 under compression such that the pin drive spring 420 urges a central portion of the pin drive spring 420 towards a center axis of the chuck 300, thereby creating an inward bias. To hold the pin drive spring 420 in place, the pin drive spring 320 may comprise securing tabs 321 and 322. Each of the securing tabs 321 and 322 may be disposed within respective recesses 361 and 362 within the interior wall of the lock sleeve 360. Each of the securing tabs 321 and 322 may be disposed within respective recesses 361 and 362 within the interior wall of the lock sleeve 360 to hold the pin drive spring 320 in a flexed position.

The pin drive spring 420 may also include a pin engaging feature in the form of a pin drive recess 423. The pin drive recess 423 may be formed in the pin drive spring 420 to have an elongated shape for receiving and maintaining engagement with the wedge pin 371. In this regard, the pin drive recess 423 may take the form of an extended indentation with a flattened region 424 between sidewalls 425 and 426, where a length of the pin drive recess 323 between the sidewalls 425 and 426 is longer than the diameter of the wedge pin 371. Due to the length of the pin drive recess 423, the wedge pin 371 may roll or travel within the pin drive recess 423 along the flattened region 424 between the sidewalls 425 and 426, when the pin drive spring 420 is repositioned by the lock sleeve 360.

As shown in FIG. 20B, the wedge pin 371 is in the wedge pin unlocked position due to the positioning of the lock sleeve 360. When the lock sleeve 360 is in the unlocked position, the pin drive spring 420 may apply an inward bias on the wedge pin 371 to force the wedge pin 371 into engagement with the pin engaging surface and, more specifically, the wedge surface 405. The engagement between the sidewall 425 and the wedge pin 371 may force the wedge pin 371 into engagement with the unlock stop wall 410.

The pin drive spring 420 or, according to some example embodiments another spring or member, may include a lock control feature. The lock control feature may be coupled to the lock sleeve 360 and engage, in a latching fashion, with a lock feature and an unlock feature of the ball retainer 450. According to some example embodiment, the lock control feature may alternatively be coupled to the ball retainer 450 and the lock feature and unlock feature may be disposed on the lock sleeve 360.

According to some example embodiments, the lock control feature of the pin drive spring 420 may be the arcuate lock protrusion 324, which may operate to latch the wedge pin 371 into the wedge pin unlocked position, where the wedge pin 371 is disengaged from the lock disk 380, or into the wedge pin locked position, where the wedge pin 371 is engaged between the ball retainer 350 and the lock disk 380. In this regard, the arcuate lock protrusion 324 may interface with a lock feature or an unlock feature of the ball retainer 450 to latch the lock sleeve 360 and the wedge pin 371 in an unlocked position or a locked position. According to some example embodiments, the lock feature and the unlock feature may be the unlock recess 353 and the lock recess 354 of the ball retainer 400.

In FIG. 20B, because the lock sleeve 360 is in the unlocked position, the arcuate lock protrusion 324 is disposed within the unlock recess 353. The compression on the pin drive spring 420 may force the arcuate lock protrusion 324 in an inward direction and into engagement with the unlock recess 353. Due to the engagement between the arcuate lock protrusion 324 and the unlock recess 353, the wedge pin 371 may be held in position, unless sufficient force is applied to the lock sleeve 360 by a user to move the arcuate lock protrusion 324 out of engagement with the unlock recess 353.

FIGS. 20C and 20D will now be described which show an embodiment of the chuck 300 in the locked state. FIG. 20C is a cross-sectional view of an embodiment of the chuck 300 taken at the plane defined by F-F of FIG. 15, where the chuck 300 is in the locked state. FIG. 20D is a cross-sectional view of an embodiment of the chuck 300 taken at the plane defined by E-E of FIG. 15, where the chuck 300 is in the locked state.

FIG. 20C illustrates the positioning of the wedge pin 371 in a wedged engagement due to the lock sleeve 360 being positioned in the locked position. In this regard, the wedge pin 371 has moved out of the unlocked or disengaged position (FIGS. 20A and 20B) along the pin engaging surface, and more specifically, along the wedge surface 405 into a position where the exterior surface of the wedge pin 371 is in contact with both the interior wall surface 384 of the lock disk 380 and the wedge surface 405 of the ball retainer 400. As such, rotation of the ball retainer 400, and thus the forward sleeve 30 and the nut 40, is prevented in the clockwise (i.e., loosening) direction, but would be permitted in the counterclockwise (i.e., tightening) direction due to the wedged engagement of the wedge pin 371. In this regard, attempted rotation of the ball retainer 400 in the clockwise direction would tend to force the wedge pin 371 into the converging surfaces of the wedge surface 405 and the interior wall surface 384, thereby increasing the wedge force and further securing the wedged engagement. However, attempted rotation of the ball retainer 400 in the counterclockwise direction would tend to force wedge pin 371 away from the converging surface (and toward the diverging surfaces). As further described below, despite the force applied by the pin drive spring 420 to maintain the wedge pin 371 in position, the flexibility of the pin drive spring 420 may permit enough movement of the wedge pin 371 to deload the wedge force when the forward sleeve 30 is rotated in the tightening direction to allow relative movement of the ball retainer 400 in the counterclockwise direction and movement of the wedge pin 371 along the interior wall surface 384 of the lock disk 380.

Now referring to FIG. 20D, the cross-section of the chuck 300 is shown that includes the lock sleeve 360 and the pin drive spring 420. In this regard, relative to the configuration shown in FIG. 20B, the lock sleeve 360 and the pin drive spring 420 have been rotated into the locked position, which caused movement of the wedge pin 371 along the wedge surface 405 and into the wedged engagement (i.e., the wedge pin locked position) shown in FIG. 20C. To move into the wedge pin locked position, the wedge pin 371 moved from a position engaged with the sidewall 425 of the pin drive recess 423 along the flattened region 424 and into engagement with the sidewall 426. Because the wedge pin 371 was able to move relative to the pin drive spring 420, the lock sleeve 360 and the pin drive spring 320 may move a further distance than the (e.g., radial distance) than the wedge pin 371 in the transition from the unlocked state to the locked state.

Further, because the lock sleeve 360 is in the locked position, the arcuate lock protrusion 324 is now engaged with the lock recess 354. The compression on the pin drive spring 420 may force the arcuate lock protrusion 324 in an inward direction and into engagement with the lock recess 354. Due to the engagement between the arcuate lock protrusion 324 and the unlock recess 354, the wedge pin 371 may be held in position by the sidewall 426, unless sufficient force is applied to the lock sleeve 360 by a user to move the arcuate lock protrusion 324 out of engagement with the lock recess 354.

Having described the various components of some example embodiments of a locking assembly, a discussion of the construction and operation of yet another alternative locking assembly will now be provided with respect to FIGS. 21A to 21D. FIG. 21A is a cross-sectional view of an embodiment of the chuck 300 taken at the plane defined by F-F of FIG. 15, where the chuck 300 is in the unlocked state. FIG. 21B is a cross-sectional view of an embodiment of the chuck 300 taken at the plane defined by E-E of FIG. 15, where the chuck 300 is in the unlocked state.

With reference to FIG. 21A, the rear sleeve 32 is shown with the lock disk 380 having its interior wall surface 384 disposed therein. The body 41 and an alternative ball retainer 500 are also shown. A cross-section of the architecture of the lock assembly engaging portion of the ball retainer 500 can also be seen. In this regard, the lock assembly engaging portion may comprise a pin engaging surface, and the wedge pin 371 may moveable along the pin engaging surface. For the ball retainer 500, the pin engaging surface, according to some example embodiments, may comprise a wedge surface 510. According to some example embodiments, the wedge surface 510 may be linear. Additionally, the interior wall surface 384 of the lock disk 380 may be arcuate or circular. According to some example embodiments, the interior wall surface 384 of the lock disk 380 may converge with the wedge surface 351 of the ball retainer 350 to form a wedge space for the wedge pin 371 in either direction and diverge into a central space with a width larger than the diameter of the wedge pin 371.

In FIG. 21A, the chuck 300 is in the unlocked state. As such, the wedge pin 371 is positioned such that the wedge pin 371 is not in a wedged engagement between the interior wall surface 384 and the wedge surface 351 (i.e., is disengaged). In this regard, according to some example embodiments, the wedge pin 371 may be positioned in a central location on the pin engaging surface or the wedge surface 351, for example, where the clearance or distance between the wedge surface 351 and the interior wall surface 384 of the lock disk 380 is greater than a diameter of the wedge pin 371. Additionally, the wedge pin 371 may be positioned on the pin engaging surface where there is a maximum distance between the interior wall surface 384 of the lock disk 380 and the pin engaging surface of the ball retainer 400. The wedge pin 371 may be positioned where the wedge pin 371 does not contact the interior wall surface 384 of the lock disk 380. Since the wedge pin 371 is not engaged between the pin engaging surface (e.g., the wedge surface 351) and the interior wall surface 384 of the lock disk 380, the forward sleeve 30 and the nut 40 are permitted to rotate in both the tightening direction (e.g., first direction) and a loosening direction (e.g., second direction).

Now referring to FIG. 21B, the cross-section of the chuck 300 is shown that includes an alternative lock sleeve 530 and an alternative pin drive spring 520 and the positioning of the same when the lock sleeve 530 is in the unlocked position. While two pin drive springs 530 are shown in FIG. 21B, the following describes a single pin drive spring understanding that the description can be applied to any number of pin drive springs that may be implemented in accordance with some example embodiments. According to some example embodiments, the pin drive spring 520 may be strip of flexible metal that includes strategically placed features for controlling the movement of the wedge pin 371 and maintaining a position of the wedge pin 371, when desired. The pin drive spring 520 may be secured to the interior wall of the lock sleeve 530 under compression such that the pin drive spring 520 urges a central portion of the pin drive spring 520 towards a center axis of the chuck 300, thereby creating an inward bias. Additionally, the lock sleeve 530 may include an interior post 532 that may further support the pin drive spring 520 and create increased biasing areas between the securing points of the pin drive spring 520. In this regard, to hold the pin drive spring 520 in place, the pin drive spring 520 may comprise securing tabs 321 and 322. The securing tabs 321 may be disposed within a recess 361, and the securing tab 322 may be held by compression of the pin drive spring 520 against the securing wall 531 of the lock sleeve 530. Secured in this manner, the pin drive spring 520 may be held by the lock sleeve 530 in a flexed position.

The pin drive spring 520 may also include two pin engaging features in the form of an unlocked pin drive recess 523 and a locked pin drive recess 524. The unlocked pin drive recess 523 and the locked pin drive recess 524 may be formed in the pin drive spring 520 to provide secured and precise positioning of the wedge pin 371 in both the wedge pin unlocked position and the wedge pin locked position, while also facilitating movement between these positions. According to some example embodiments, the wedge pin 371 may travel along the wedge surface 351 and within one of the unlocked pin drive recess 523 or the locked pin drive recess 524, when the lock sleeve 530 is rotated.

As shown in FIG. 21B, the wedge pin 371 is in the wedge pin unlocked position due to the positioning of the lock sleeve 530. When the lock sleeve 530 is in the unlocked position, the pin drive spring 520, with the assistance of the post 532, may apply an inward bias on the wedge pin 371 to force the wedge pin 371 into engagement with the pin engaging surface and, more specifically, the wedge surface 510. Due to the positioning of the wedge pin 371 within the unlocked pin drive recess 523, the wedge pin 371 (and the lock control feature as described below), the wedge pin 371 is maintained in a position where the wedge pin 371 is not in contact with the interior wall surface 384 of the lock disk 380. In this case, the position is centrally located on the linear wedge surface 351.

The pin drive spring 520 or, according to some example embodiments another spring or member, may include a lock control feature. The lock control feature may be coupled to the lock sleeve 530 and engage, in a latching fashion, with a lock feature and an unlock feature of the ball retainer 500. According to some example embodiment, the lock control feature may alternatively be coupled to the ball retainer 500 and the lock feature and unlock feature may be disposed on the lock sleeve 530.

According to some example embodiments, the lock control feature of the pin drive spring 520 may be the arcuate lock protrusion 324, which may operate to latch the wedge pin 371 into the wedge pin unlocked position, where the wedge pin 371 is disengaged from the lock disk 380, or into the wedge pin locked position, where the wedge pin 371 is engaged between the ball retainer 500 and the lock disk 380. In this regard, the arcuate lock protrusion 324 may interface with a lock feature or an unlock feature of the ball retainer 500 to latch the lock sleeve 530 and the wedge pin 371 in an unlocked position or a locked position. According to some example embodiments, the lock feature and the unlock feature may be the unlock recess 353 and the lock recess 354 of the ball retainer 500.

In FIG. 21B, because the lock sleeve 530 is in the unlocked position, the arcuate lock protrusion 324 is disposed within the unlock recess 353. The compression on the pin drive spring 530, with the assistance of the post 532, may force the arcuate lock protrusion 324 in an inward direction and into engagement with the unlock recess 353. Due to the engagement between the arcuate lock protrusion 324 and the unlock recess 353, the wedge pin 371 may be held in position, unless sufficient force is applied to the lock sleeve 530 by a user to move the arcuate lock protrusion 324 out of engagement with the unlock recess 353.

FIGS. 21C and 21D will now be described which show an embodiment of the chuck 300 in the locked state. FIG. 21C is a cross-sectional view of an embodiment of the chuck 300 taken at the plane defined by F-F of FIG. 15, where the chuck 300 is in the locked state. FIG. 21D is a cross-sectional view of an embodiment of the chuck 300 taken at the plane defined by E-E of FIG. 15, where the chuck 300 is in the locked state.

FIG. 21C illustrates the positioning of the wedge pin 371 in a wedged engagement due to the lock sleeve 530 being positioned in the locked position. In this regard, the wedge pin 371 has moved out of the unlocked or disengaged position (FIGS. 21A and 21B) along the pin engaging surface, and more specifically, along the wedge surface 510 into a position where the exterior surface of the wedge pin 371 is in contact with both the interior wall surface 384 of the lock disk 380 and the wedge surface 510 of the ball retainer 400. As such, rotation of the ball retainer 500, and thus the forward sleeve 30 and the nut 40, is prevented in the clockwise (i.e., loosening) direction, but would be permitted in the counterclockwise (i.e., tightening) direction due to the wedged engagement of the wedge pin 371. In this regard, attempted rotation of the ball retainer 500 in the clockwise direction would tend to force the wedge pin 371 into the converging surfaces of the wedge surface 510 and the interior wall surface 384, thereby increasing the wedge force and further securing the wedged engagement to prevent relative rotation of the ball retainer 500. However, attempted rotation of the ball retainer 500 in the counterclockwise direction would tend to force wedge pin 371 away from the converging surface (and toward the diverging surfaces and the center of the wedge surface 351). As further described below, despite the force applied by the pin drive spring 520 to maintain the wedge pin 371 in position, the flexibility of the pin drive spring 520 may permit enough movement of the wedge pin 371 to deload the wedge force when the forward sleeve 30 is rotated in the tightening direction and permit relative movement of the ball retainer 500 in the counterclockwise direction and movement of the wedge pin 371 along the interior wall surface 384 of the lock disk 380.

Now referring to FIG. 21D, the cross-section of the chuck 300 is shown that includes the lock sleeve 530 and the pin drive spring 520. In this regard, relative to the configuration shown in FIG. 21B, the lock sleeve 530 and the pin drive spring 520 have been rotated into the locked position, which caused movement of the wedge pin 371 along the wedge surface 510 and into the wedged engagement (i.e., the wedge pin locked position) shown in FIG. 20C. To move into the wedge pin locked position, the wedge pin 371 was moved within the unlocked pin drive recess 523 until the wedge pin 371 engaged with the interior wall surface 384 of the lock disk 380. At that point, the arcuate lock protrusion 324 was not yet disposed within the lock recess 354. However, the lock sleeve 530 and the pin drive spring 520 continued to rotate causing the unlocked pin drive recess 523 to move out of engagement with the wedge pin 371. Upon further rotational movement, the pin drive spring 520 moved relative to the wedge pin 371 such that the locked pin drive recess 524 moved into engagement with the wedge pin 371 (already in the wedged engagement) and the arcuate lock protrusion 324 moved into lock recess 354. In this configuration, the locked pin drive recess 524, with the assistance of the engaged arcuate lock protrusion 324, may hold the wedge pin 371 into the wedge pin locked position in wedged engagement between the wedge surface 351 and the interior wall surface 384. Because the wedge pin 371 was able to move relative to the pin drive spring 520, the lock sleeve 530 and the pin drive spring 520 may move a further distance than the (e.g., radial distance) than the wedge pin 371 in the transitions between the unlocked state and the locked state. Additionally, the compression on the pin drive spring 520 may force the arcuate lock protrusion 324 in an inward direction and into engagement with the lock recess 354. Due to the engagement between the arcuate lock protrusion 324 and the unlock recess 354, the wedge pin 371 may be held in position by the locked pin drive recess 524, unless sufficient force is applied to the lock sleeve 530 by a user to move the arcuate lock protrusion 324 out of engagement with the lock recess 354.

Referring back to FIG. 21, to move from the wedge pin locked position to the wedge pin unlocked position, the wedge pin 371 may be moved within the locked pin drive recess 524 until the wedge pin 371 engages with the interior wall surface 384 of the lock disk 380 (on an opposite side of the wedge surface 351 from the wedge pin locked position relative to a center of the wedge surface 351). At that point, the arcuate lock protrusion 324 was not yet disposed within the unlock recess 353. However, the lock sleeve 530 and the pin drive spring 520 continued to rotate causing the locked pin drive recess 523 to move out of engagement with the wedge pin 371. Upon further rotational movement, the pin drive spring 520 moves relative to the wedge pin 371 such that the unlocked pin drive recess 523 moves into engagement with the wedge pin 371 and the arcuate lock protrusion 324 moves into unlock recess 354 and possibly slightly passed the unlock recess 354. In this configuration, the unlocked pin drive recess 524, with the assistance of the engaged arcuate lock protrusion 324, may move the wedge pin 371 into the wedge pin unlocked position, possibly with a slight recoil, such that the wedge pin 371 is not engaged with the lock disk 380. The wedge pin 371 may then be held in the wedge pin unlocked position by the pin drive spring 520, as described above.

According to some example embodiments, a first chuck embodiment for use with a power driver having a rotatable drive spindle is provided. The first chuck embodiment may comprise a plurality of jaws, a body, a nut, a first sleeve, a lock ring, a tooth ring, and a lock sleeve. The body may be configured to rotate with the drive spindle. The plurality of jaws may be configured to rotate with the body about a center axis of the first chuck embodiment. The plurality of jaws may also be configured to move relative to the body in an opening or closing direction. A nut may be operably coupled to the jaws such that rotation of the nut relative to the body moves the jaws relative to the body in the opening or closing direction. The first sleeve may be operably coupled to the nut to rotate the nut when the first sleeve is rotated, and the lock ring may be operably coupled to the first sleeve. The lock ring may comprise a lock pawl and a lock pawl control member. The lock pawl may be operably coupled to the lock pawl control member. The tooth ring may be operably coupled to the body such that the tooth ring rotates with the body. The tooth ring may comprise a plurality of ratchet teeth. The lock sleeve may comprise an unlock ledge and a lock void. The lock sleeve may be rotatable relative to the lock ring into a locked position and an unlocked position. When the lock sleeve is disposed in the locked position, the lock pawl control member may be disposed in the lock void to permit a first mechanical bias on the lock pawl to urge the lock pawl into engagement with a ratchet tooth of the plurality of ratchet teeth to prevent rotation of the first sleeve and the nut relative to the body in the a first rotational direction but permit ratcheting rotation of the first sleeve and the nut in a second rotational direction. The first rotational direction may be opposite the second rotational direction. When the lock sleeve is disposed in the unlocked position, the lock pawl control member may be engaged with the unlock ledge against a force of the first mechanical bias to move the lock pawl out of engagement with a ratchet tooth of the plurality of ratchet teeth to permit rotation of the first sleeve and the nut in the first rotational direction and second rotational direction.

According to some example embodiments, the first chuck embodiment may include the lock ring further comprising a lock latch control member. The lock sleeve may further comprise a latch void. When the lock sleeve is disposed in the locked position, the lock latch control member is disposed in the latch void to form a releasable rotational coupling between the lock sleeve and the lock ring such that the lock sleeve rotates with the first sleeve.

According to some example embodiments of the first chuck embodiment, the lock latch control member may be subjected to a second mechanical bias that urges the lock latch control member into the latch void. The lock ring may be configured to be rotated, relative to the lock ring, out of the locked position by overcoming the second mechanical bias to move the lock latch control member out of the latch void.

According to some example embodiments, the first chuck embodiment may also comprise a coupler ring operably coupled to the first sleeve to rotate with the first sleeve and the lock ring. The coupler ring may comprise a coupler ring drive dog void that receives a lock sleeve drive dog of the lock sleeve. According to some example embodiments, the lock sleeve drive dog may be movable within the coupler ring drive dog void between the locked position and the unlocked position without rotating the coupler ring. According to some example embodiments, the first sleeve may be operably coupled to the lock ring via the coupler ring.

According to some example embodiments of the first chuck embodiment, the first sleeve may be a front sleeve disposed at an end of the chuck adjacent to the jaws, and the lock sleeve may be disposed adjacent to and rearward of the first sleeve.

According to some example embodiments of the first chuck embodiment, the first chuck embodiment may further comprise a rear sleeve disposed at an end of the chuck adjacent to a socket opening in the body, and the lock sleeve may be disposed adjacent to and forward of the rear sleeve.

According to some example embodiments of the first chuck embodiment, the lock sleeve may be configured to be moveable relative to the first sleeve by rotating the lock sleeve while a user holds the first sleeve stationary.

According to some example embodiments, the first chuck embodiment may also comprise a plurality of ball bearings that are disposed between the lock ring and the tooth ring.

According to some example embodiments, a second chuck embodiment for use with a power driver having a rotatable drive spindle is provided. The second chuck embodiment may comprise a plurality of jaws, a nut, a first sleeve, a lock ring, a tooth ring, and a lock sleeve. The nut may be operably coupled to the jaws such that rotation of the nut moves the jaws in the opening or closing direction. The first sleeve may be operably coupled to the nut to rotate the nut when the first sleeve is rotated. The lock ring may comprise a lock pawl and a lock pawl control member. The lock pawl may be operably coupled to the lock pawl control member. The tooth ring may comprise a plurality of ratchet teeth, and the lock sleeve may comprising an unlock ledge and a lock void. The lock sleeve may be rotatable relative to the lock ring into a locked position and an unlocked position. When the lock sleeve is disposed in the locked position, the lock pawl control member may be disposed in the lock void to permit a first mechanical bias on the lock pawl to urge the lock pawl into engagement with a ratchet tooth of the plurality of ratchet teeth to prevent rotation of the first sleeve and the nut in the a first rotational direction but permit ratcheting rotation of the first sleeve and the nut in a second rotational direction. The first rotational direction may be opposite the second rotational direction. When the lock sleeve is disposed in the unlocked position, the lock pawl control member may be engaged with the unlock ledge against a force of the first mechanical bias to move the lock pawl out of engagement with the plurality of ratchet teeth and permit rotation of the first sleeve and the nut in the first rotational direction and second rotational direction.

According to some example embodiments of the second chuck embodiment, the lock ring may further comprise a lock latch control member, and the lock sleeve may further comprise a latch void. When the lock sleeve is disposed in the locked position, the lock latch control member may be disposed in the latch void to form a releasable rotational coupling between the lock sleeve and the lock ring such that the lock sleeve rotates with the first sleeve. According to some example embodiments, the lock latch control member may be subjected to a second mechanical bias that urges the lock latch control member into the latch void. Additionally, according to some example embodiments, the lock ring may be configured to be rotated, relative to the lock ring, out of the locked position by overcoming the second mechanical bias to move the lock latch control member out of the latch void.

According to some example embodiments, the second chuck embodiment may also comprise a coupler ring operably coupled to the first sleeve to rotate with the first sleeve and the lock ring. The coupler ring may comprise a coupler ring drive dog void that receives a lock sleeve drive dog of the lock sleeve. According to some example embodiments, the lock sleeve drive dog may be movable within the coupler ring drive dog void between the locked position and the unlocked position without rotating the coupler ring. According to some example embodiments, the first sleeve may be operably coupled to the lock ring via the coupler ring.

According to some example embodiments of the second chuck embodiment, the first sleeve may be a front sleeve disposed at an end of the chuck adjacent to the jaws, and the lock sleeve may be disposed adjacent to and rearward of the first sleeve.

According to some example embodiments of the second chuck embodiment, The second chuck embodiment may comprise a rear sleeve disposed at an end of the chuck adjacent to a socket opening in the chuck, and the lock sleeve may be disposed adjacent to and forward of the rear sleeve.

According to some example embodiments of the second chuck embodiment, the lock sleeve may be configured to be moveable relative to the first sleeve by rotating the lock sleeve while a user holds the first sleeve stationary.

According to some example embodiments, a third chuck embodiment for use with a power driver having a rotatable drive spindle is provided. The third chuck embodiment may comprise a plurality of jaws, a body, a nut, a first sleeve, a second sleeve, a lock ring, a tooth ring, and a lock sleeve. The body may be configured to rotate with the drive spindle, and the plurality of jaws may be configured to rotate with the body about a center axis of the third chuck embodiment. The plurality of jaws may be also configured to move relative to the body in an opening or closing direction. The nut may be operably coupled to the jaws such that rotation of the nut relative to the body moves the jaws relative to the body in the opening or closing direction. The first sleeve may be operably coupled to the nut to rotate the nut when the first sleeve is rotated. The second sleeve may be disposed adjacent to a spindle opening in the body at a rear end of the third chuck embodiment. The lock ring may be operably coupled to the second sleeve. The lock ring may comprise a lock pawl and a lock pawl control member. The lock pawl may be operably coupled to the lock pawl control member. The tooth ring may be operably coupled to first sleeve such that the tooth ring rotates with the first sleeve. The tooth ring may comprise a plurality of ratchet teeth. The lock sleeve may comprise an unlock ledge and a lock void. The lock sleeve may be rotatable relative to the lock ring into a locked position and an unlocked position. When the lock sleeve is disposed in the locked position, the lock pawl control member may be disposed in the lock void to permit a first mechanical bias on the lock pawl to urge the lock pawl into engagement with a ratchet tooth of the plurality of ratchet teeth to prevent rotation of the first sleeve and the nut relative to the body in the a first rotational direction but permit ratcheting rotation of the first sleeve and the nut in a second rotational direction. The first rotational direction may be opposite the second rotational direction. When the lock sleeve is disposed in the unlocked position, the lock pawl control member may be engaged with the unlock ledge against a force of the first mechanical bias to move the lock pawl out of engagement with the plurality of ratchet teeth to permit rotation of the first sleeve and the nut in the first rotational direction and second rotational direction.

According to some example embodiments, a fourth chuck embodiment is provided. The fourth chuck embodiment may be used with a power driver having a rotatable drive spindle is provided. The fourth chuck embodiment may comprise a plurality of jaws, a body configured to rotate with the drive spindle, and a nut. The nut may be operably coupled to the jaws such that rotation of the nut relative to the body moves the jaws relative to the body in an opening or closing direction. The fourth chuck embodiment may also comprise a first sleeve operably coupled to the nut to rotate with the nut in response to the first sleeve being rotated, and a lock disk coupled to the body such that the lock disk rotates with the body. The lock disk may comprise a lock disk wall. The fourth chuck embodiment may further comprise a ball retainer coupled to the first sleeve such that the ball retainer rotates with the first sleeve. In this regard, the ball retainer may comprise a pin engaging surface. The fourth chuck embodiment may also comprise a lock sleeve that is rotatable relative to the ball retainer into a locked position and an unlocked position, and a wedge pin in contact with the pin engaging surface of the ball retainer. Further, the fourth chuck embodiment may comprise a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. In this regard, when the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the body in the a first rotational direction, but permit rotation of the first sleeve and the nut relative to the body in a second rotational direction. The first rotational direction may be opposite the second rotational direction. Further, when the lock sleeve is disposed in the unlocked position, the wedge pin may be positioned by the pin drive spring such that the wedge pin is not in the wedged engagement to permit rotation of the first sleeve and the nut in the first rotational direction and second rotational direction.

According to some example embodiments, the fourth chuck embodiment may be altered in accordance with further example embodiments. In this regard, the ball retainer of the fourth chuck embodiment may comprise a lock feature and an unlock feature. A lock control feature may be coupled to the lock sleeve. In the locked position, the lock control feature may be disposed in a biased engagement with the lock feature of the ball retainer to maintain the wedge pin in the wedged engagement. Further, in the unlocked position, the lock control feature may be disposed in a biased engagement with the unlock feature of the ball retainer to maintain the wedge pin in a position that is not in the wedged engagement.

Additionally or alternatively, for the fourth chuck embodiment or for alternations of the fourth chuck embodiment, the pin drive spring may comprise the lock control feature and the lock control feature may be an arcuate lock protrusion. The lock feature and the unlock feature may be recesses configured to receive the arcuate lock protrusion.

Additionally or alternatively, for the fourth chuck embodiment or for alternations of the fourth chuck embodiment, the pin drive spring comprises a pin drive recess. The wedge pin may be received within the pin drive recess such that movement of the pin drive spring relative to the ball retainer causes corresponding movement of the wedge pin.

Additionally or alternatively, for the fourth chuck embodiment or for alternations of the fourth chuck embodiment, the pin drive spring may comprise a pin drive recess. The wedge pin may be received within the pin drive recess, and the pin drive spring may be moveable relative to the wedge pin until the wedge pin engages with a sidewall of the of the pin drive recess.

Additionally or alternatively, for the fourth chuck embodiment or for alternations of the fourth chuck embodiment, the pin engaging surface may comprise a unlock stop wall. The wedge pin may be in contact with the unlock stop wall when the lock sleeve is in the unlocked position.

Additionally or alternatively, for the fourth chuck embodiment or for alternations of the fourth chuck embodiment, the lock disk wall may be arcuate and the pin engaging surface may be linear such that the lock disk wall and the pin engaging surface converge to form a wedge space for receipt of the wedge pin when the lock sleeve is in the locked position.

Additionally or alternatively, for the fourth chuck embodiment or for alternations of the fourth chuck embodiment, the pin drive spring comprises a locked pin drive recess and an unlocked pin drive recess.

Additionally or alternatively, for the fourth chuck embodiment or for alternations of the fourth chuck embodiment, the wedge pin may be received within the locked pin drive recess when the lock sleeve is in the locked position and the wedge pin is in the wedged engagement. The wedge pin may be received within the unlocked pin drive recess when the lock sleeve is in the unlocked position and the wedge pin is in not in the wedged engagement.

Additionally or alternatively, for the fourth chuck embodiment or for alternations of the fourth chuck embodiment, the pin engaging surface may be linear and the wedge pin may be positioned at a center of the pin engaging surface when the lock sleeve is in the unlocked position.

According to some example embodiments, a fifth chuck embodiment is provided. According to some example embodiments, the fifth chuck embodiment may be used with a power driver having a rotatable drive spindle is provided. The fifth chuck embodiment may comprise a plurality of jaws, a lock disk comprising a lock disk wall, and a nut operably coupled to the jaws such that rotation of the nut relative to the lock disk moves the jaws in the opening or closing direction. The fifth chuck embodiment may further comprise a first sleeve operably coupled to the nut, a ball retainer operably coupled to the first sleeve such that the ball retainer rotates with the first sleeve. The ball retainer may comprise a pin engaging surface. The fifth chuck embodiment may further comprise a lock sleeve that is rotatable relative to the ball retainer into a locked position and an unlocked position, a wedge pin in contact with the pin engaging surface of the ball retainer, and a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. When the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the lock disk in the a first rotational direction, but permit rotation of the first sleeve and the nut relative to the lock disk in a second rotational direction. The first rotational direction may be opposite the second rotational direction. Further, when the lock sleeve is disposed in the unlocked position, the wedge pin is positioned by the pin drive spring such that the wedge pin is not in the wedged engagement to permit rotation of the first sleeve and the nut in the first rotational direction and second rotational direction.

Additionally, for the fifth chuck embodiment or for alternations of the fifth chuck embodiment, the ball retainer may comprise a lock feature and an unlock feature. A lock control feature may be coupled to the lock sleeve. In the locked position, the lock control feature may be disposed in a biased engagement with the lock feature of the ball retainer to maintain the wedge pin in the wedged engagement. In the unlocked position, the lock control feature may be disposed in a biased engagement with the unlock feature of the ball retainer to maintain the wedge pin in a position that is not in the wedged engagement.

Additionally or alternatively, for the fifth chuck embodiment or for alternations of the fifth chuck embodiment, the pin drive spring may comprise the lock control feature and the lock control feature may be an arcuate lock protrusion. The lock feature and the unlock feature may be recesses configured to receive the arcuate lock protrusion.

Additionally or alternatively, for the fifth chuck embodiment or for alternations of the fifth chuck embodiment, the pin drive spring may comprise a pin drive recess. The wedge pin may be received within the pin drive recess such that movement of the pin drive spring relative to the ball retainer causes corresponding movement of the wedge pin.

Additionally or alternatively, for the fifth chuck embodiment or for alternations of the fifth chuck embodiment, the pin drive spring may comprise a pin drive recess. The wedge pin may be received within the pin drive recess, and the pin drive spring may be moveable relative to the wedge pin until the wedge pin engages with a sidewall of the of the pin drive recess.

Additionally or alternatively, for the fifth chuck embodiment or for alternations of the fifth chuck embodiment, the pin engaging surface may comprise a unlock stop wall. The wedge pin may be in contact with the unlock stop wall when the lock sleeve is in the unlocked position.

Additionally or alternatively, for the fifth chuck embodiment or for alternations of the fifth chuck embodiment, the lock disk wall may be arcuate and the pin engaging surface may be linear such that the lock disk wall and the pin engaging surface converge to form a wedge space for receipt of the wedge pin when the lock sleeve is in the locked position.

Additionally or alternatively, for the fifth chuck embodiment or for alternations of the fifth chuck embodiment, the pin drive spring may comprise a locked pin drive recess and an unlocked pin drive recess. The wedge pin may be received within the locked pin drive recess when the lock sleeve is in the locked position and the wedge pin is in the wedged engagement. The wedge pin may be received within the unlocked pin drive recess when the lock sleeve is in the unlocked position and the wedge pin is in not in the wedged engagement.

Additionally or alternatively, for the fifth chuck embodiment or for alternations of the fifth chuck embodiment, the pin engaging surface may be linear and the wedge pin may be positioned at a center of the pin engaging surface when the lock sleeve is in the unlocked position.

According to some example embodiments, a sixth chuck embodiment is provided. According to some example embodiments, the sixth chuck embodiment may be used with a power driver having a rotatable drive spindle is provided. The sixth chuck embodiment may comprise a plurality of jaws, a body configured to rotate with the drive spindle, and a nut operably coupled to the jaws and in threaded engagement with an interior cavity of the body such that rotation of the nut relative to the body moves the jaws relative to the body in an opening or closing direction. The sixth chuck embodiment may also comprise a first sleeve operably coupled to the nut to rotate the nut when the first sleeve is rotated, and a lock disk coupled to the body such that the lock disk rotates with the body. The lock disk may comprise a lock disk wall. The sixth chuck embodiment may further comprise a ball retainer coupled to the first sleeve such that the ball retainer rotates with the first sleeve. The ball retainer may comprise a pin engaging surface. The sixth chuck embodiment may also comprise a lock sleeve that is rotatable relative to the ball retainer into a locked position and an unlocked position. The wedge pin may be in contact with the pin engaging surface of the ball retainer. The sixth chuck embodiment may further comprise a pin drive spring coupled to the lock sleeve such that the pin drive spring rotates with the lock sleeve. The pin drive spring may be in contact with the wedge pin to move the wedge pin along the pin engaging surface in response to rotation of the lock sleeve. When the lock sleeve is disposed in the locked position, the wedge pin may be positioned by the pin drive spring in a wedged engagement between the pin engaging surface of the ball retainer and the lock disk wall of the lock disk to prevent rotation of the first sleeve and the nut relative to the body in the a first rotational direction but permit rotation of the first sleeve and the nut relative to the body in a second rotational direction. The first rotational direction may be opposite the second rotational direction. When the lock sleeve is disposed in the unlocked position, the wedge pin may be positioned by the pin drive spring such that the wedge pin is not in the wedged engagement to permit rotation of the first sleeve and the nut in the first rotational direction and second rotational direction.

Many modifications and other embodiments of the chucks set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
    a plurality of jaws;
    a body configured to rotate with the drive spindle;
    a nut operably coupled to the jaws such that rotation of the nut relative to the body moves the jaws relative to the body in an opening or closing direction;
    a first sleeve operably coupled to the nut to rotate with the nut in response to the first sleeve being rotated;
    a lock disk coupled to the body such that the lock disk rotates with the body, the lock disk comprising a lock disk wall;
    a ball retainer coupled to the first sleeve such that the ball retainer rotates with the first sleeve, the ball retainer comprising a pin engaging surface;
    a lock sleeve that is rotatable relative to the ball retainer into a locked position and an unlocked position;
    a wedge pin in contact with the pin engaging surface of the ball retainer;
    a pin drive spring coupled to the lock sleeve such that the pin drive spring rotates with the lock sleeve, the pin drive spring being in contact with the wedge pin to move the wedge pin along the pin engaging surface in response to rotation of the lock sleeve;
    wherein, when the lock sleeve is disposed in the locked position, the wedge pin is positioned by the pin drive spring in a wedged engagement between the pin engaging surface of the ball retainer and the lock disk wall of the lock disk to prevent rotation of the first sleeve and the nut relative to the body in the a first rotational direction but permit rotation of the first sleeve and the nut relative to the body in a second rotational direction, the first rotational direction being opposite the second rotational direction; and
    wherein, when the lock sleeve is disposed in the unlocked position, the wedge pin is positioned by the pin drive spring such that the wedge pin is not in the wedged engagement to permit rotation of the first sleeve and the nut in the first rotational direction and second rotational direction.

2. The chuck of claim 1, wherein the ball retainer comprises a lock feature and an unlock feature;
    wherein a lock control feature is coupled to the lock sleeve;
    wherein, in the locked position, the lock control feature is disposed in a biased engagement with the lock feature of the ball retainer to maintain the wedge pin in the wedged engagement;
    wherein, in the unlocked position, the lock control feature is disposed in a biased engagement with the unlock feature of the ball retainer to maintain the wedge pin in a position that is not in the wedged engagement.

3. The chuck of claim 2, wherein the pin drive spring comprises the lock control feature and the lock control feature is an arcuate lock protrusion;

wherein the lock feature and the unlock feature are recesses configured to receive the arcuate lock protrusion.

4. The chuck of claim 1, wherein the pin drive spring comprises a pin drive recess; wherein the wedge pin is received within the pin drive recess such that movement of the pin drive spring relative to the ball retainer causes corresponding movement of the wedge pin.

5. The chuck of claim 1, wherein the pin drive spring comprises a pin drive recess;
wherein the wedge pin is received within the pin drive recess;
wherein the pin drive spring is moveable relative to the wedge pin until the wedge pin engages with a sidewall of the of the pin drive recess.

6. The chuck of claim 1, wherein the pin engaging surface comprises a unlock stop wall, wherein the wedge pin is in contact with the unlock stop wall when the lock sleeve is in the unlocked position.

7. The chuck of claim 1, wherein the lock disk wall is arcuate and the pin engaging surface is linear such that the lock disk wall and the pin engaging surface converge to form a wedge space for receipt of the wedge pin when the lock sleeve is in the locked position.

8. The chuck of claim 1, wherein the pin drive spring comprises a locked pin drive recess and an unlocked pin drive recess;
wherein the wedge pin is received within the locked pin drive recess when the lock sleeve is in the locked position and the wedge pin is in the wedged engagement;
wherein the wedge pin is received within the unlocked pin drive recess when the lock sleeve is in the unlocked position and the wedge pin is in not in the wedged engagement.

9. The chuck of claim 1, wherein the pin engaging surface is linear and the wedge pin is positioned at a center of the pin engaging surface when the lock sleeve is in the unlocked position.

10. The chuck of claim 1, wherein the wedge pin is rotatable relative to the ball retainer and the lock sleeve about a wedge pin axis that is parallel to the center axis of the chuck.

11. A chuck for use with a power driver having a rotatable drive spindle, the chuck comprising:
a plurality of jaws;
a lock disk comprising a lock disk wall;
a nut operably coupled to the jaws such that rotation of the nut relative to the lock disk moves the jaws in the opening or closing direction;
a first sleeve operably coupled to the nut;
a ball retainer operably coupled to the first sleeve such that the ball retainer rotates with the first sleeve, the ball retainer comprising a pin engaging surface;
a lock sleeve that is rotatable relative to the ball retainer into a locked position and an unlocked position;
a wedge pin in contact with the pin engaging surface of the ball retainer;
a pin drive spring coupled to the lock sleeve such that the pin drive spring rotates with the lock sleeve, the pin drive spring being in contact with the wedge pin to move the wedge pin along the pin engaging surface in response to rotation of the lock sleeve;
wherein, when the lock sleeve is disposed in the locked position, the wedge pin is positioned by the pin drive spring in a wedged engagement between the pin engaging surface of the ball retainer and the lock disk wall of the lock disk to prevent rotation of the first sleeve and the nut relative to the lock disk in the a first rotational direction but permit rotation of the first sleeve and the nut relative to the lock disk in a second rotational direction, the first rotational direction being opposite the second rotational direction; and
wherein, when the lock sleeve is disposed in the unlocked position, the wedge pin is positioned by the pin drive spring such that the wedge pin is not in the wedged engagement to permit rotation of the first sleeve and the nut in the first rotational direction and second rotational direction.

12. The chuck of claim 11, wherein the ball retainer comprises a lock feature and an unlock feature;
wherein a lock control feature is coupled to the lock sleeve;
wherein, in the locked position, the lock control feature is disposed in a biased engagement with the lock feature of the ball retainer to maintain the wedge pin in the wedged engagement;
wherein, in the unlocked position, the lock control feature is disposed in a biased engagement with the unlock feature of the ball retainer to maintain the wedge pin in a position that is not in the wedged engagement.

13. The chuck of claim 12, wherein the pin drive spring comprises the lock control feature and the lock control feature is an arcuate lock protrusion;
wherein the lock feature and the unlock feature are recesses configured to receive the arcuate lock protrusion.

14. The chuck of claim 12, wherein the pin drive spring comprises a pin drive recess;
wherein the wedge pin is received within the pin drive recess such that movement of the pin drive spring relative to the ball retainer causes corresponding movement of the wedge pin.

15. The chuck of claim 12, wherein the pin drive spring comprises a pin drive recess;
wherein the wedge pin is received within the pin drive recess;
wherein the pin drive spring is moveable relative to the wedge pin until the wedge pin engages with a sidewall of the of the pin drive recess.

16. The chuck of claim 11, wherein the pin engaging surface comprises a unlock stop wall, wherein the wedge pin is in contact with the unlock stop wall when the lock sleeve is in the unlocked position.

17. The chuck of claim 11, wherein the lock disk wall is arcuate and the pin engaging surface is linear such that the lock disk wall and the pin engaging surface converge to form a wedge space for receipt of the wedge pin when the lock sleeve is in the locked position.

18. The chuck of claim 11, wherein the pin drive spring comprises a locked pin drive recess and an unlocked pin drive recess;
wherein the wedge pin is received within the locked pin drive recess when the lock sleeve is in the locked position and the wedge pin is in the wedged engagement;
wherein the wedge pin is received within the unlocked pin drive recess when the lock sleeve is in the unlocked position and the wedge pin is in not in the wedged engagement.

19. The chuck of claim 11, wherein the pin engaging surface is linear and the wedge pin is positioned at a center of the pin engaging surface when the lock sleeve is in the unlocked position.

20. A chuck for use with a power driver having a rotatable drive spindle, the chuck comprising:
- a plurality of jaws;
- a body configured to rotate with the drive spindle;
- a nut operably coupled to the jaws and in threaded engagement with an interior cavity of the body such that rotation of the nut relative to the body moves the jaws relative to the body in an opening or closing direction;
- a first sleeve operably coupled to the nut to rotate the nut when the first sleeve is rotated; a lock disk coupled to the body such that the lock disk rotates with the body, the lock disk comprising a lock disk wall;
    - a ball retainer coupled to the first sleeve such that the ball retainer rotates with the first sleeve, the ball retainer comprising a pin engaging surface;
- a lock sleeve that is rotatable relative to the ball retainer into a locked position and an unlocked position;
    - a wedge pin being in contact with the pin engaging surface of the ball retainer; and
    - a pin drive spring coupled to the lock sleeve such that the pin drive spring rotates with the lock sleeve, the pin drive spring being in contact with the wedge pin to move the wedge pin along the pin engaging surface in response to rotation of the lock sleeve;
- wherein, when the lock sleeve is disposed in the locked position, the wedge pin is positioned by the pin drive spring in a wedged engagement between the pin engaging surface of the ball retainer and the lock disk wall of the lock disk to prevent rotation of the first sleeve and the nut relative to the body in the a first rotational direction but permit rotation of the first sleeve and the nut relative to the body in a second rotational direction, the first rotational direction being opposite the second rotational direction; and
- wherein, when the lock sleeve is disposed in the unlocked position, the wedge pin is positioned by the pin drive spring such that the wedge pin is not in the wedged engagement to permit rotation of the first sleeve and the nut in the first rotational direction and second rotational direction.

* * * * *